(12) United States Patent
Petty

(10) Patent No.: US 12,005,982 B2
(45) Date of Patent: Jun. 11, 2024

(54) ADJUSTABLE SADDLE

(71) Applicant: Jon A Petty, St. George, UT (US)

(72) Inventor: Jon A Petty, St. George, UT (US)

( * ) Notice: Subject to any disclaimer, the term of this patent is extended or adjusted under 35 U.S.C. 154(b) by 0 days.

(21) Appl. No.: 17/693,277

(22) Filed: Mar. 11, 2022

(65) Prior Publication Data

US 2022/0289325 A1    Sep. 15, 2022

Related U.S. Application Data

(60) Provisional application No. 63/159,577, filed on Mar. 11, 2021.

(51) Int. Cl.
  B62J 1/10    (2006.01)
  B62J 1/00    (2006.01)

(52) U.S. Cl.
  CPC .................. B62J 1/10 (2013.01); B62J 1/005 (2013.01)

(58) Field of Classification Search
  CPC ................. B62J 1/10; B62J 1/005
  USPC ........................................ 297/201
  See application file for complete search history.

(56) References Cited

U.S. PATENT DOCUMENTS

| | | | | |
|---|---|---|---|---|
| 593,331 | A * | 11/1897 | Noirit ................ | B62J 1/005 297/207 |
| 872,124 | A * | 11/1907 | Hammaren ........ | B62J 1/005 297/201 |
| 5,823,618 | A | 10/1998 | Fox et al. | |
| 6,209,954 | B1 * | 4/2001 | Bombardier ....... | B62J 1/005 297/214 |
| 6,575,529 | B1 * | 6/2003 | Yu ..................... | B62J 1/005 297/201 |
| 10,118,658 | B2 * | 11/2018 | Petty ................. | B62J 1/08 |
| 2007/0123401 | A1 | 5/2007 | Ozawa et al. | |
| 2008/0179925 | A1 * | 7/2008 | Chuang ............. | B62J 1/005 297/214 |
| 2017/0274950 | A1 | 9/2017 | Holt et al. | |
| 2020/0079452 | A1 | 3/2020 | Shabsigh | |
| 2020/0385077 | A1 | 12/2020 | Petty | |

OTHER PUBLICATIONS

International Search Report and Written Opinion dated Aug. 11, 2022 for corresponding International Application No. PCT/US2022/020077.

* cited by examiner

*Primary Examiner* — Milton Nelson, Jr.
(74) *Attorney, Agent, or Firm* — Maywood IP Law

(57) ABSTRACT

An adjustable saddle may include a first saddle half that may be slidably adjustable to a front mounting assembly and slidably adjustable to a rear mounting assembly. An adjustable saddle may further include a second saddle half that may be slidably adjustable to a front mounting assembly and slidably adjustable to a rear mounting assembly. Additionally, the attachment features may be configured to be releasably securable to the mounting assemblies. The first saddle half and the second saddle half may be adjusted independently of each other to adapt to a given sit bone width and riding position to achieve maximum comfort.

17 Claims, 35 Drawing Sheets

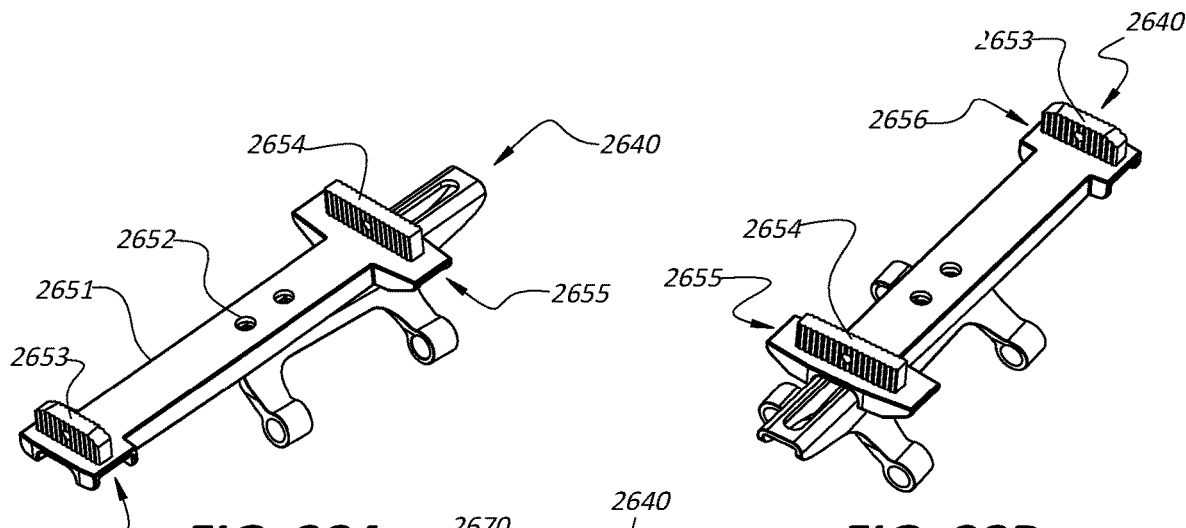
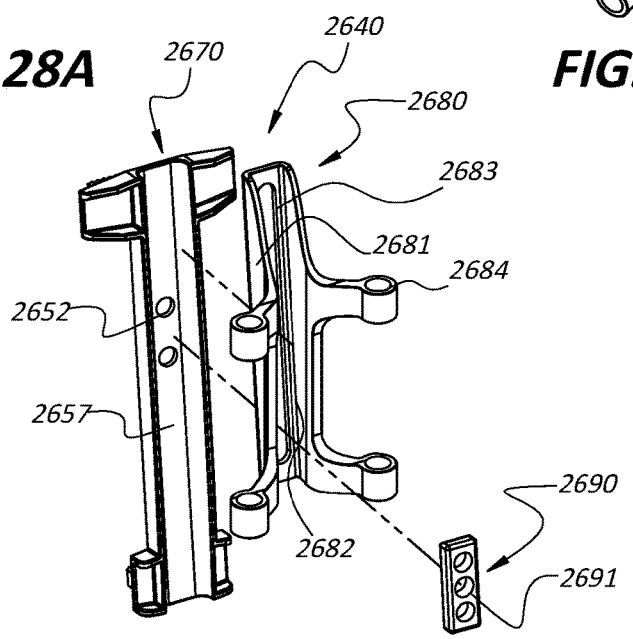
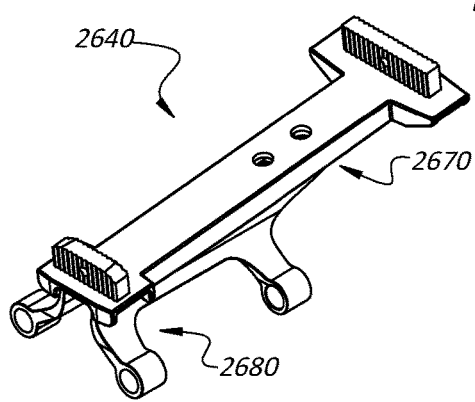
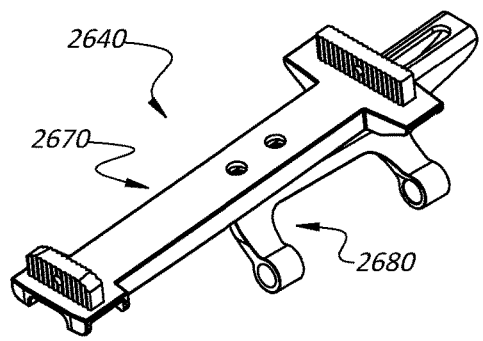
FIG. 28A  FIG. 28B  FIG. 28C  FIG. 28D  FIG. 28E

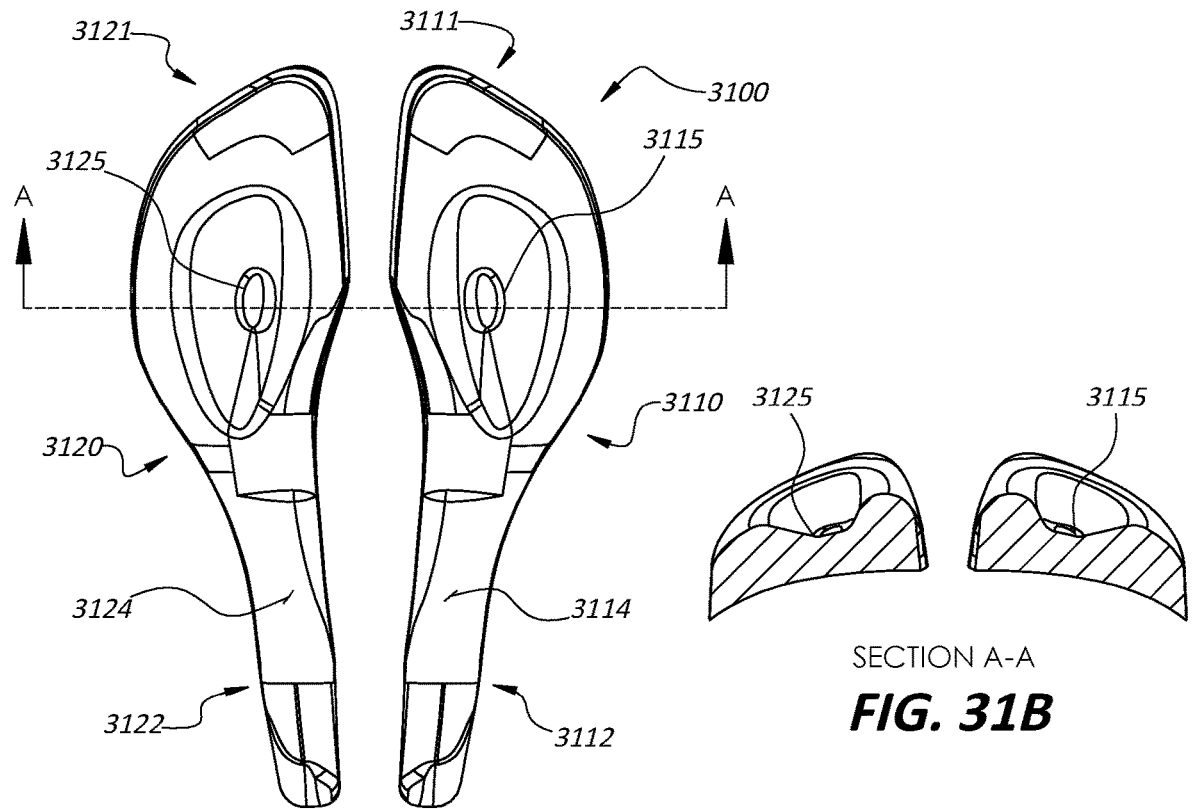
FIG. 31B
FIG. 31A
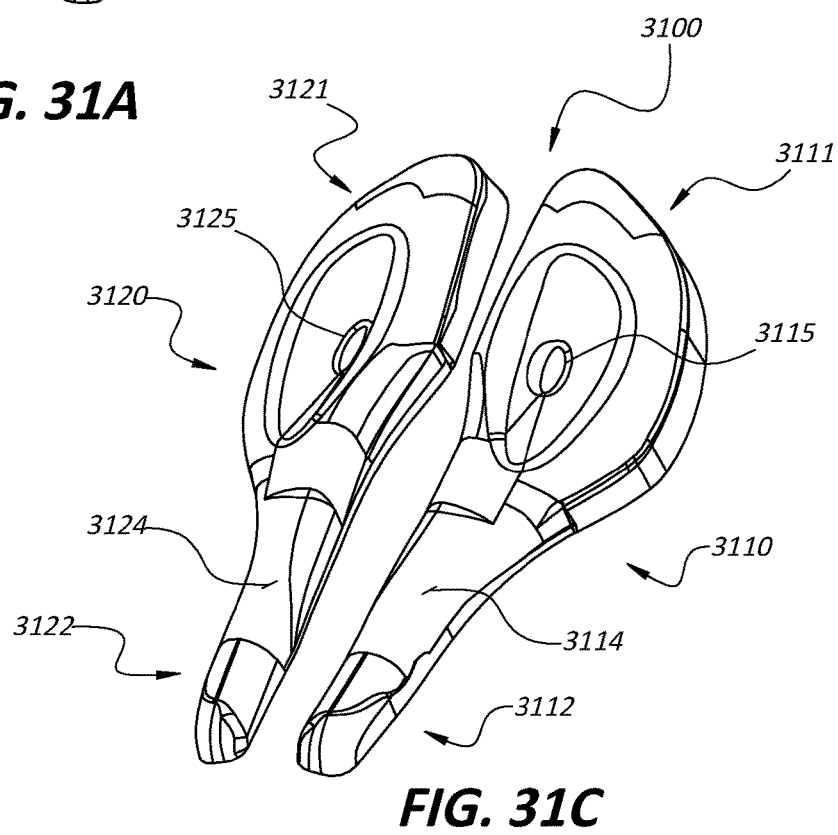
FIG. 31C

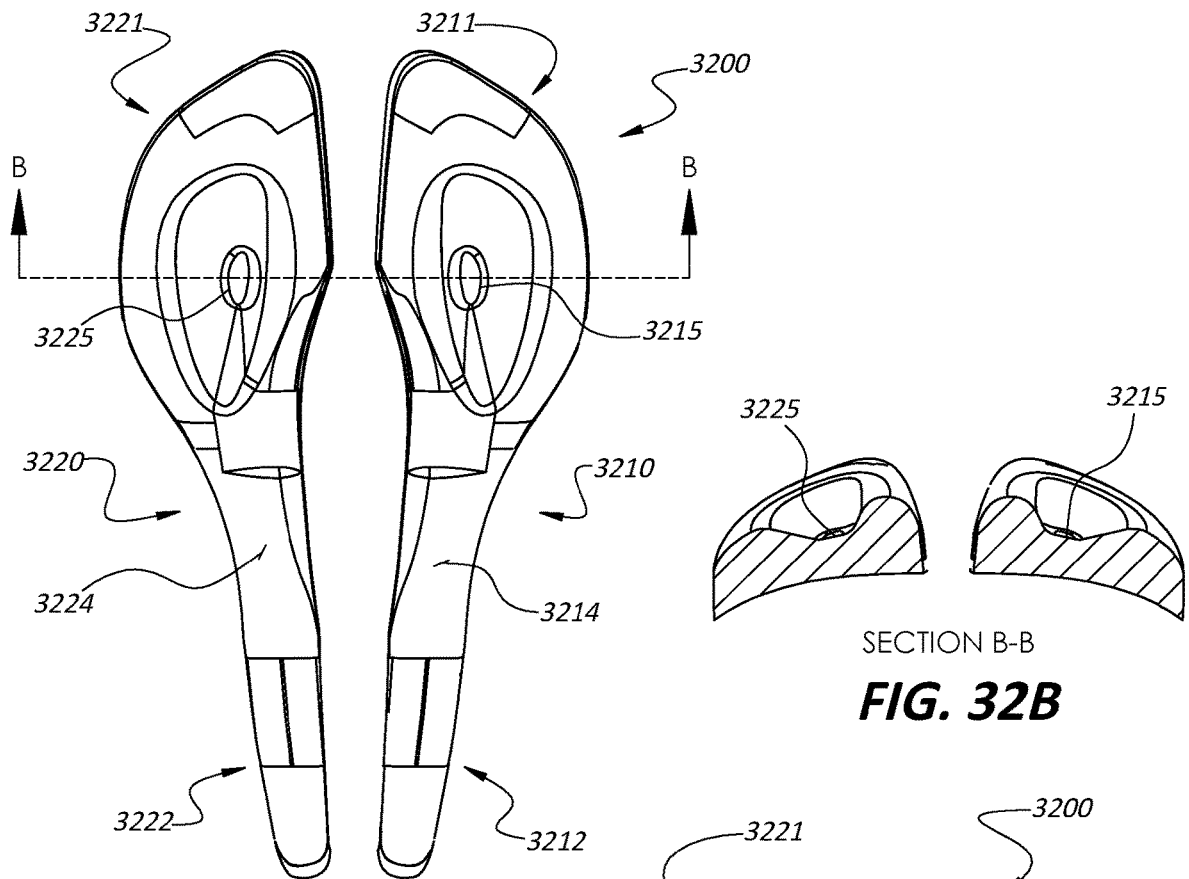
FIG. 32A
SECTION B-B
FIG. 32B
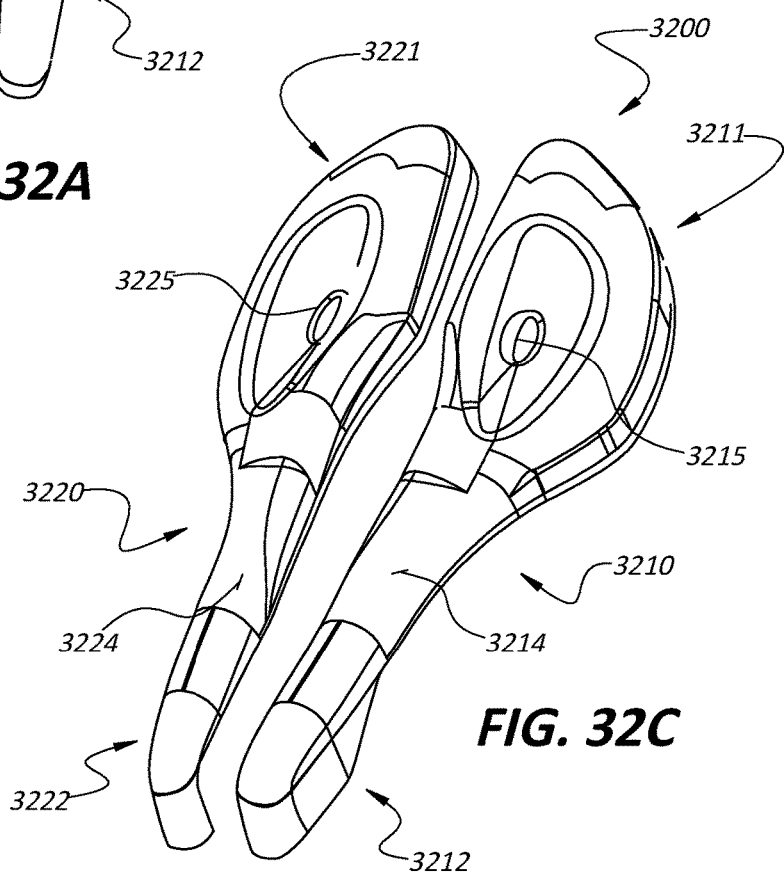
FIG. 32C

Road Racer-Aggression Position

Road Rider-Relaxed Position

Triathlon/Time Trial-Aerodynamic Position

Road Rider-Relaxed Position

ADJUSTABLE SADDLE

CROSS-REFERENCE TO RELATED APPLICATIONS

The present application claims the benefit of U.S. Provisional Patent Application Ser. No. 63/159,577, entitled ADJUSTABLE BICYCLE SADDLE, which was filed on Mar. 11, 2021. The foregoing is incorporated by reference as though set forth herein in its entirety

TECHNICAL FIELD

The present disclosure relates to adjustable saddles. More specifically, the present disclosure relates to an adjustable saddle that supports the ischial tuberosities, ischiopubic rami, and nearby regions of those who use the adjustable saddle.

BACKGROUND

Saddle seats may be used in a variety of applications including but not limited to: chairs, sit/stand chairs, stationary exercise equipment, bicycles, scooters, motorcycles, motorized vehicles, and in various other applications where an individual may desire to assume a seated, or at least partially seated, position. Although the adjustable saddle design disclosed herein is described in the context of bicycle use, it will be understood that the adjustable saddle design disclosed herein may also be used in any other suitable applications where an individual may desire to assume a seated, or at least partially seated, position.

The conventional single platform saddle design is commonly used on bicycles and other equipment throughout the world. These conventional single platform bicycle saddles include a forward protruding horn that exerts pressure on soft tissue, arteries, veins, and associated nerves often resulting in numbness, pain, and/or erectile dysfunction in individuals. Conventional single platform saddles do not provide specific support for the ischial tuberosities, ischiopubic rami, and nearby regions of those who use single platform bicycle saddles. Additionally, conventional single platform saddles do not adjust to variations in the size and shape of ischiopubic rami of different individuals.

SUMMARY

In some embodiments, an adjustable saddle may include a front mounting assembly with first and second apertures that receive first and second fasteners and a rear mounting assembly with third and fourth apertures that receive third and fourth fasteners. The adjustable saddle may also include first and second saddle half bases that each pivotally attach to the front mounting assembly and slidably translate relative to the rear mounting assembly via first and second arcuate adjustment channels.

In other embodiments, an adjustable saddle may include first and second upper rails, a front mounting assembly with first and second apertures that receive first and second fasteners, and a rear mounting assembly with third and fourth apertures that receive third and fourth fasteners. The adjustable saddle may also include first and second saddle half bases that each pivotally attach to the front mounting assembly and slidably translate relative to the rear mounting assembly through first and second arcuate adjustment channels.

In yet other embodiments, a method of adjusting an adjustable saddle may include slidably positioning at least one saddle half base relative to a rear mounting assembly. The back end of the at least one saddle half base may have an arcuate adjustment channel that receives a rear fastener. The method may also include engaging the rear fastener to prevent the back end of the at least one saddle half base from sliding relative to the rear mounting assembly.

In still other embodiments, an adjustable saddle may have a mounting frame with a front mounting assembly and a rear mounting assembly. The adjustable saddle may further have a first saddle half with a first saddle half base with a first front end having a first attachment feature configured to be slidably adjustably coupled to the front mounting assembly, a first back end with a second attachment feature configured to be slidably adjustably coupled to the rear mounting assembly, and a second saddle half with a second saddle half base having a second front end with a third attachment feature configured to be slidably adjustably coupled to the front mounting assembly, and a second back end with a fourth attachment feature configured to be slidably adjustably coupled to the rear mounting assembly. The first attachment feature and the third attachment feature may be releasably securable to the front mounting assembly and the second attachment feature and the fourth attachment feature may be releasably securable to the rear mounting assembly to secure a position of the second saddle half base relative to the first saddle half base.

Each of the first saddle half base and the second saddle half base may have a dual density lattice structure.

Each of the first attachment feature, the second attachment feature, the third attachment feature, and the fourth attachment feature may have a locking interface configured to mate with a corresponding locking interface of the front mounting assembly or the rear mounting assembly.

Each of the locking interfaces may have a first plurality of ridges. Each of the corresponding locking interfaces may have a second plurality of ridges. In a locked configuration, the first plurality of ridges may intermesh with the second plurality of ridges to prevent the first attachment feature, the second attachment feature, the third attachment feature, and the fourth attachment feature from translating relative to the front mounting assembly and the rear mounting assembly.

Each of the first attachment feature, the second attachment feature, the third attachment feature, and the fourth attachment feature may have a first hole. Each of the first mounting assembly and the second mounting assembly may have a second hole. The first holes and the second holes may cooperate to receive fasteners that secure each locking interface and corresponding locking interface in the locked configuration.

In yet other embodiments, an adjustable saddle may have a front mounting assembly, a rear mounting assembly, a first saddle half with a first saddle half base having a first front end configured to be coupled to the front mounting assembly and a first back end configured to be slidably adjustably coupled to the rear mounting assembly, and a first flexural section between the first front end and the first back end, wherein the first flexural section allows the first back end to move relative to the first front end. The adjustable saddle may further have a second saddle half with a second saddle half base having a second front end configured to be coupled to the front mounting assembly, a second back end configured to be slidably adjustably coupled to the rear mounting assembly, and a second flexural section between the second front end and the second back end, wherein the second flexural section allows the second back end to move relative to the second front end.

Each of the first flexural section and the second flexural section may include a narrow portion that acts as a living hinge.

Each of the first saddle half and the second saddle half may include a plurality of apertures that receive a plurality of fasteners to secure each of the first saddle half and second saddle half to the front mounting assembly and the rear mounting assembly in a locked position.

The first back end and the second back end may be adjusted and locked in position independently of each other.

In still other embodiments, an adjustable saddle may have a front mounting assembly, a rear mounting assembly, a saddle mounting frame, a seat mounting base that is configured to be secured to a bicycle frame and slidably adjustably coupled to the saddle mounting frame, and a first saddle half with a first saddle half base having a first front end configured to be slidably adjustably coupled to the front mounting assembly and a first back end configured to be slidably adjustably coupled to the rear mounting assembly. The adjustable saddle may further have a second saddle half with a second saddle half base having a second front end configured to be slidably adjustably coupled to the front mounting assembly, and a second back end configured to be slidably adjustably coupled to the rear mounting assembly.

The saddle mounting frame may have a slidable mounting portion, a channel that slidably engages the seat mounting base, and a plurality of apertures configured to receive one or more fasteners to secure the slidable mounting portion to the saddle mounting frame, thereby locking a position of the saddle mounting frame with respect to the seat mounting base.

The seat mounting base may have a slot that receives the one or more fasteners securing the slidable mounting portion to the saddle mounting frame.

The seat mounting base may have at least two generally parallel mounting rods.

In still other embodiments, an adjustable saddle may have a first saddle half with a first saddle half base having a first front end configured to be slidably adjustably coupled to a front mounting assembly, a first back end configured to be slidably adjustably coupled to a rear mounting assembly, and a first seat surface including a first depression configured to receive a sit bone. The adjustable saddle may further have a second saddle half with a second saddle half base having a second front end configured to be slidably adjustably coupled to a front mounting assembly, a second back end configured to be slidably adjustably coupled to a rear mounting assembly, and a second seat surface including a second depression configured to receive a sit bone. The adjustable saddle may further have a mounting frame couplable to the first saddle half and the second saddle half.

Each of the first depression and the second depression may have a depth between 0.1 inches and 1.0 inches.

Each of the first depression and the second depression may have a height, above a lowest upward-facing surface of the first saddle half or the second saddle half, between 1.5 inches and 5.0 inches. Each of the first depression and the second depression may have a width between 0.7 inches and 3.0 inches. Each of the first depression and the second depression may taper inward and may have a bottom that measures between 0.3 inches and 1.2 inches deep and 0.1 inches and 1.0 inches wide.

In still other embodiments, an adjustable saddle may have a first saddle half with a first front end, a first back end, and a curved first seat surface extending from the first front end to the first back end, the curved first seat surface having a first apex, higher than the first front end and the first back end, located between the first front end and first back end. The adjustable saddle may further have a second saddle half having a second front end, a second back end, and a curved second seat surface extending from the second front end to the second back end, the curved second seat surface having a second apex, higher than the second front end and the second back end, located between the second front end and second back end.

The first apex may be located approximately ⅔ of a first distance from the first front end to the first back end. The second apex may be located approximately ⅔ a second distance from the second front end to the second back end.

Each of the curved first seat surface and the curved second seat surface may have a dual density lattice structure.

The adjustable saddle may further have a mounting frame having a front mounting assembly, and a rear mounting assembly. The first saddle half may have a first front end configured to be slidably adjustably coupled to the front mounting assembly, and a first back end configured to be slidably adjustably coupled to the rear mounting assembly. The second saddle half may have a second front end configured to be slidably adjustably coupled to the front mounting assembly, and a second back end configured to be slidably adjustably coupled to the rear mounting assembly.

These and other features and advantages of the present disclosure will become more fully apparent from the following description and appended claims, or may be learned by the practice of the systems and methods set forth hereinafter.

BRIEF DESCRIPTION OF THE DRAWINGS

Exemplary embodiments of the disclosure will become more fully apparent from the following description and appended claims, taken in conjunction with the accompanying drawings. Understanding that these drawings depict only exemplary embodiments and are, therefore, not to be considered limiting of the disclosure's scope, the exemplary embodiments of the disclosure will be described with additional specificity and detail through use of the accompanying drawings in which:

FIG. 28A. is an isometric view of an adjustable mounting frame assembly of the adjustable saddle shown in FIG. 26A;

FIG. 28B is a second isometric view of an adjustable mounting frame assembly of the adjustable saddle shown in FIG. 26A;

FIG. 28C is an exploded view of an adjustable mounting frame assembly of the adjustable saddle shown in FIG. 26A;

FIG. 28D is an isometric view of an adjustable mounting frame assembly of the adjustable saddle shown in FIG. 26A in a rearward adjustment configuration;

FIG. 28E is an isometric view of an adjustable mounting frame assembly of the adjustable saddle shown in FIG. 26A in a forward adjustment configuration;

FIG. 31A is a top view of an adjustable saddle seat cushion according to another embodiment of the present disclosure;

FIG. 31B is a section view of an adjustable saddle seat cushion shown in FIG. 31A;

FIG. 31C is an isometric view of an adjustable saddle seat cushion in FIG. 31A;

FIG. 32A is a top view of an adjustable saddle seat cushion according to another embodiment of the present disclosure;

FIG. 32B is a section view of an adjustable saddle seat cushion shown in FIG. 32A;

FIG. 32C is an isometric view of an adjustable saddle seat cushion in FIG. 32A;

DETAILED DESCRIPTION

Figure 1:
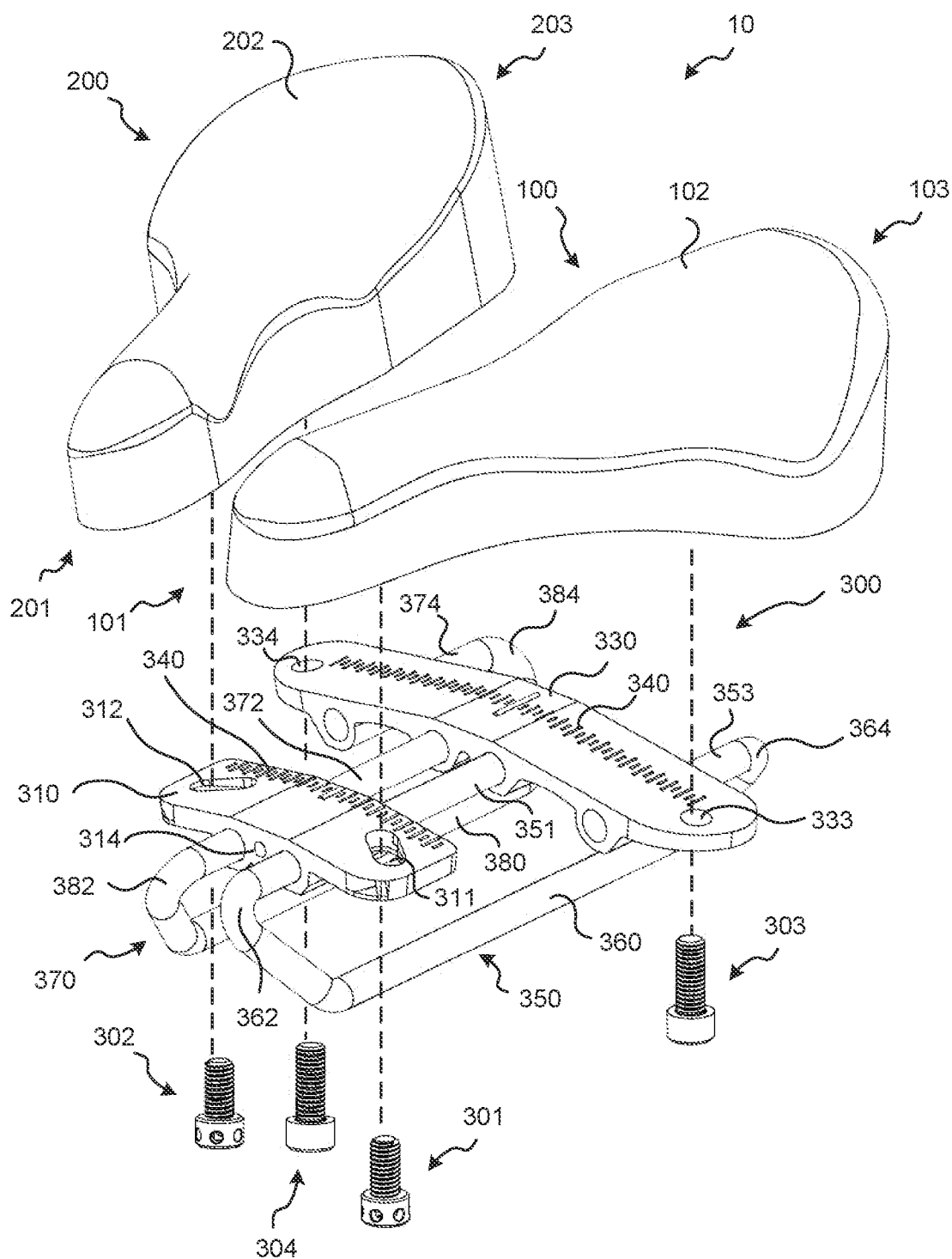
FIG. 1 illustrates an exploded view of an adjustable saddle, according to one embodiment of the present disclosure.

Exemplary embodiments of the present disclosure will be best understood by reference to the drawings, wherein like parts are designated by like numerals throughout. It will be readily understood that the components of the present disclosure, as generally described and illustrated in the Figures herein, could be arranged and designed in a wide variety of different configurations. Thus, the following more detailed description of the embodiments of the apparatus and method, as represented in the figures, is not intended to limit the scope of the present disclosure, as claimed in this or any other application claiming priority to this application, but is merely representative of exemplary embodiments of the present disclosure.

The phrases "connected to," "coupled to," and "in communication with" refer to any form of interaction between two or more entities, including mechanical, electrical, magnetic, electromagnetic, fluid, and thermal interaction. Two components may be functionally coupled to each other even though they are not in direct contact with each other. The term "abutting" refers to items that are in direct physical contact with each other, although the items may not necessarily be attached together. The phrase "fluid communication" refers to two features that are connected such that a fluid within one feature is able to pass into the other feature.

The word "exemplary" is used herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

The adjustable saddles of the present disclosure may provide enhanced support for the ischial tuberosities, ischiopubic rami, and/or nearby regions of individuals. The adjustable saddles may allow an individual to personalize the position of two independently adjustable saddle halves, each saddle half comprising a plurality of surfaces and contours. In this disclosure, the term "half" is used loosely—each of the saddle halves may optionally include more or less than 50% of the surface area that supports the rider. Each saddle half may be pivotally connected at the front end of the adjustable saddle, which may allow for various width adjustments. Each saddle half may be angularly adjustable at the back end of the adjustable saddle to conform to angular variations in male and female ischiopubic rami. Thus, the rider's pelvic bones may ride atop the saddle halves while the soft tissue of the perineum area is untouched between each saddle half. The resulting saddle configuration may prevent problems such as soft tissue abrasions, numbness, pain, and/or erectile dysfunction for men by eliminating pressure and/or compression of the dorsal artery, veins, and nerves. The resulting saddle configuration may also eliminate pressure on women's mons pubis, clitoris, and urethra.

The adjustable saddles of the present disclosure may be used with different riding positions in order to change an angle of the pelvis in relation to the adjustable saddle. For example, given an "upright" riding position, a wider saddle adjustment may be desirable. On the other hand, given a more aggressive riding position (e.g., a "lower," or racing riding position) a narrower saddle adjustment may be more desirable. For upright riding positions, a desired saddle width may be chosen to properly support the sit bones. However, more aggressive riding positions may change the pelvis contact points relative to the saddle such that, as the riding angle becomes more aggressive, the saddle may be narrowed to properly support the pelvic structure. Thus, the front area of the saddle may be selected to be as wide as possible to achieve adequate pelvic support, while being as narrow as possible in order to achieve good pedaling dynamics. In aggressive, or stretched riding positions, the saddle contact point may move from the tip of the sit bones forward along the pubic arch to the pubic bone and, depending on the saddle design, the central perineal area may be used for load bearing for both genders. Women typically have a lower pubic arch which may result in higher pressures when riding in aggressive riding positions with a traditional saddle design. In aggressive riding positions, the manner in which pressure from the pubic bone is distributed to the saddle may be important for comfort and damage prevention to critical nerves and soft tissue. The sit bone and pubic bones tend to come together from their widest points into a "V" shape, such that more aggressive riding positions will generally benefit from a more narrow saddle adjustment.

Thus, in some embodiments, adjustable saddles of the present disclosure provide the ability to adjust both the front and rear section of a saddle independently to adapt to a given sit bone width and riding position to achieve maximum comfort. In some embodiments, the adjustable saddles of the present disclosure can be adjusted as wide as possible to achieve pelvic support as well as sufficiently narrow to achieve good pedaling dynamics. For example, in an aggressive triathlon riding position, both the front and rear sections of the adjustable saddle may be adjusted narrowly and angled inward to support the pelvis and pubic bone to minimize soft tissue contact. Conversely, in an upright position, both the front and rear sections can be adjusted wider and angled outward to support the pelvis and sit bones to minimize soft tissue contact. In addition, the rear portion of the saddle may be adjusted to be higher than the front to angle the adjustable saddle downward front-to-back to reduce and/or eliminate pressure on the perineal area and pelvis arch, improving comfort and safety.

To estimate a proper saddle width, a calculation may be used according to a distance between the centers of the sit bones and a typical riding position (e.g., upright, slightly bent, moderate, stretched, road race, etc.). As one non-limiting example, if a sit bone width for a cyclist is 120 mm, a distance may be added to or subtracted from the 120 mm width measurement depending on a desired riding position. In this example, if the rider's preferred riding position is upright, 20 mm may be added to the base 120 mm, yielding a 140 mm saddle width. If the riding style is aggressive road race triathlon, then 20 mm could be deducted for a 100 mm saddle width measurement. The method may be interpreted slightly differently.

FIGS. 1-7B illustrate various views of an adjustable saddle 10 according to one embodiment of the present disclosure. FIG. 1 illustrates an exploded view of the adjustable saddle 10. FIG. 2A shows an isometric view of the adjustable saddle 10 of FIG. 1 in assembled form and FIG. 2B shows a side view of the adjustable saddle 10 connected to a seat post 400. FIGS. 3A-4B illustrate various top views of the adjustable saddle 10 in different exemplary adjustment configurations and FIGS. 5A-7B and 9B illustrates how the adjustable saddle 10 may generally include rigid bases topped with foam padding which may be further covered with seat covers 102, 202 to protect the foam padding from weathering, abrasion, and general wear. In at least one embodiment, the seat covers 102, 202 may also include cords (not shown) and/or other attachment features configured to couple the seat covers to their respective rigid base, as will be discussed on more detail below.

Figure 2A:
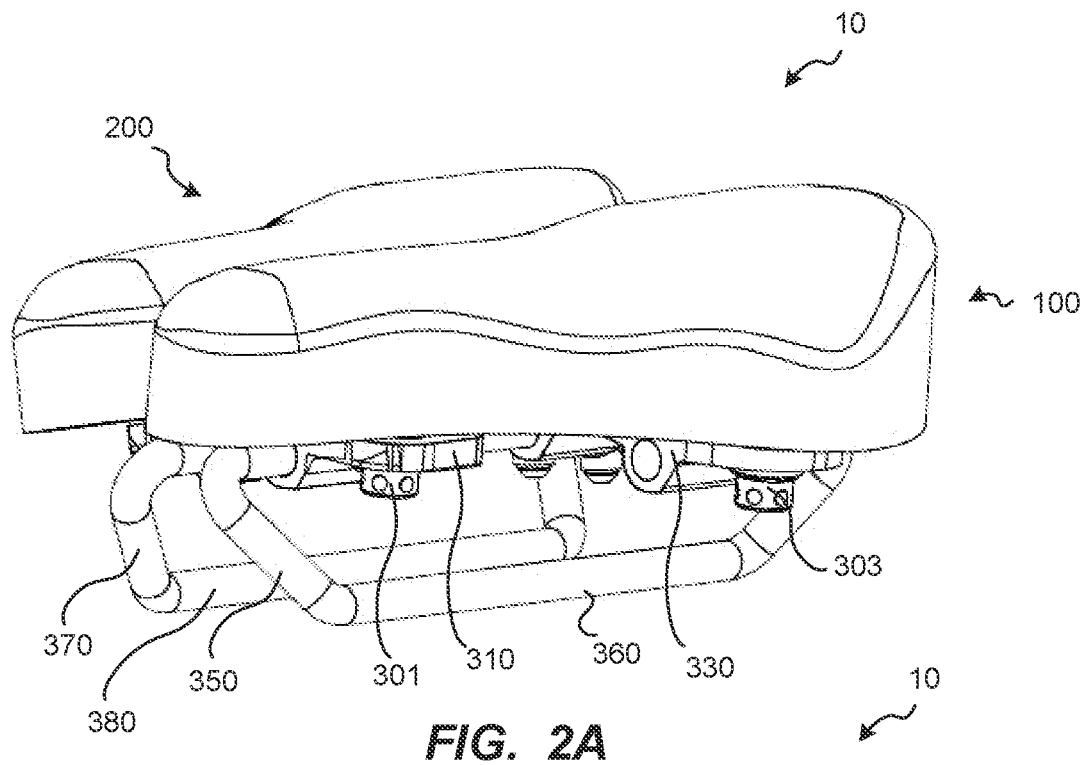
FIG. 2A illustrates an isometric view of the adjustable saddle of FIG. 1 in assembled form.
Figure 2B:
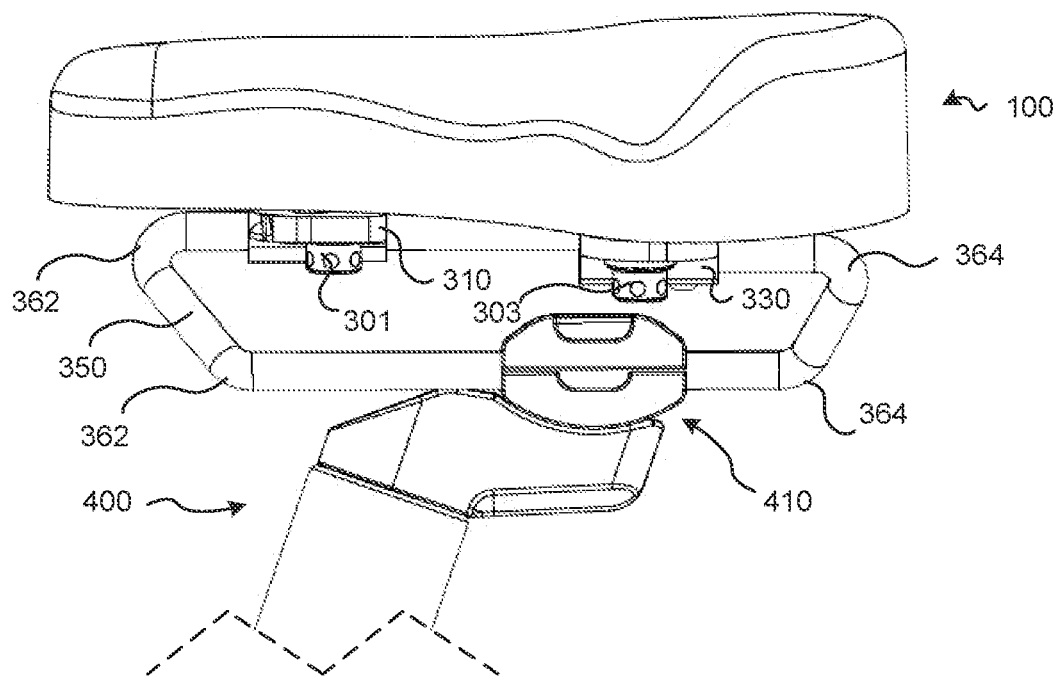
FIG. 2B illustrates a side view of the adjustable saddle of FIG. 2A connected to a seat post.

Continuing generally with FIGS. 1-2B, the adjustable saddle 10 may include a first saddle half 100, a second saddle half 200, and a chassis 300. The first and second saddle halves 100, 200 may be adjustably attached to the chassis 300 via a first fastener 301, a second fastener 302, a third fastener 303, and a fourth fastener 304. The first and second fasteners 301, 302 may also be referred to herein as front fasteners because they attach the front ends 101, 201 of the saddle halves 100, 200 to the chassis 300. Likewise, the third and fourth fasteners 303, 304 may also be referred to herein as rear fasteners because they attach the back ends 103, 203 of the saddle halves 100, 200 to the chassis 300.

The first, second, third, and fourth fasteners 301, 302, 303, 304 may be any suitable fastener style, including but not limited to: threaded screws, bolts, quick release fasteners, and the like. In one embodiment, at least one of the first, second, third, and fourth fasteners 301, 302, 303, 304 may have a cross drilled head to facilitate rotation of the fastener from the side for easier and quicker operation. For example, an individual (not shown) may use a small elongate tool, such as a 2 mm Allen wrench (not shown) to rotate the fastener from the side by inserting one end of the small elongate tool into the cross drilled threaded screws and applying a rotational torque force.

The chassis 300 may generally include a front mounting assembly 310, a rear mounting assembly 330, a first rail 350, and a second rail 370. The front mounting assembly 310 may include a first aperture 311 configured to receive the first fastener 301 to attach the front end 101 of the first saddle half 100 to the front mounting assembly 310, as well as a second aperture 312 configured to receive the second fastener 302 to attach the front end 201 of the second saddle half 200 to the front mounting assembly 310. The front mounting assembly 310 may also include a front attachment aperture 314, as will be described in more detail with reference to FIGS. 7A-9A. Likewise, the rear mounting assembly 330 may include a third aperture 333 configured to receive the third fastener 303 to attach the back end 103 of the first saddle half 100 to the rear mounting assembly 330, as well as a fourth aperture 334 configured to receive the fourth fastener 304 to attach the back end 203 of the second saddle half 200 to the rear mounting assembly 330.

In other embodiments, the front mounting assembly 310 and the rear mounting assembly 330 may be coupled together to form a unified bracket (not shown). The unified bracket may include a front mounting assembly, a rear mounting assembly, and an intermediate piece that couples the front mounting assembly and the rear mounting assembly together. In one embodiment, the front mounting assembly, the rear mounting assembly, and the intermediate piece may be integrally formed together as a single unified bracket. However, in other embodiments, the front mounting assembly, the rear mounting assembly, and the intermediate piece may be configured to detachably couple to each other. In this manner, different intermediate pieces with different lengths, widths, and/or shapes may be used to couple the front mounting assembly to the rear mounting assembly to vary the relative distance between the front mounting assembly and the rear mounting assembly. Moreover, the unified bracket may include any number of apertures that are configured to receive any number of corresponding fasteners to mount the saddle halves 100, 200 to the unified bracket. Each mounting assembly may be a bracket, clip, clamp, or any other mounting device known in the art.

In at least one embodiment, the first and second apertures 311, 312 may be angled slots that allow pivotal and translational adjustment of the front ends 101, 201 of the saddle halves 100, 200. However, in other embodiments (not shown), the first and second apertures 311, 312 may be circular shaped holes that allow pivotal adjustment of the front ends 101, 201 of the saddle halves 100, 200. The third and fourth apertures 333, 334 may be circular shaped holes that allow pivotal adjustment of the back ends 103, 203 of the saddle halves 100, 200. However, in other embodiments (not shown), the third and fourth apertures 333, 334, may also be angled slots that allow pivotal and translational adjustment of the back ends 103, 203 of the saddle halves 100, 200. In these embodiments, the addition of angled slots may increase the potential range of motion of the saddle halves 100, 200.

In at least one embodiment, the front mounting assembly 310 and/or the rear mounting assembly 330 may include adjustment markings 340. The adjustment markings 340 may generally indicate the degree to which each saddle half 100, 200 is positionally adjusted with respect to the front mounting assembly 310 and/or the rear mounting assembly 330. In the embodiment shown in FIG. 1, the adjustment markings 340 include simple line markings spaced apart at regular intervals. However, in other embodiments (not shown), the adjustment markings 340 may include numbers or other symbols that indicate various information, such as angular or translational displacement of the saddle halves 100, 200 with respect to the front and rear mounting assemblies 310, 330, preferred saddle half 100, 200 positions based on riding style, a rider's personal position preference, etc. The adjustment markings 340 may be formed by any known process including, but not limited to: laser etching, stamping, integral formation during molding/casting, and the like.

In addition to adjustment markings 340, the first rail 350 and/or the second rail 370 may also include additional adjustment markings (not shown) to indicate translational displacement of the chassis 300 with respect to a seat post 400, a seat post mounting assembly 410 (see FIG. 2B), and/or to indicate translational displacement of the front and/or rear mounting assemblies 310, 330 with respect to the first and second rails 350, 370. The first rail 350 may have a first lower rail portion 360 and the second rail 370 may have a second lower rail portion 380. The seat post mounting assembly 410 may detachably couple to and/or slidably attach to the first lower rail portion 360 and the second lower rail portion 380 of the first and second rails 350, 370.

The first rail 350 may include at least one first upper rail portion 351 and the second rail 370 may include at least one second upper rail portion 372. The front mounting assembly 310 and/or the rear mounting assembly 330 may be slidably attached to the at least one first upper rail portion 351 of the first rail 350 and the at least one second upper rail portion 372 of the second rail 370. The front and rear mounting assemblies 310, 330 may also be held in place along the first and second upper rail portions 351, 372 by any suitable method including simple frictional forces, retainer screws, or the like.

In at least one embodiment, the first rail 350 may include the first upper rail portion 351 and a third upper rail portion 353 and the second rail 370 may include the second upper rail portion 372 and a fourth upper rail portion 374. The front mounting assembly 310 and/or the rear mounting assembly 330 may be slidably attached to the first, second, third, and fourth upper rail portions 351, 372, 353, 374. Likewise, the front and rear mounting assemblies 310, 330 may be held in place along the first, second, third, and fourth upper rail portions 351, 372, 353, 374 by any suitable method such as frictional forces, retainer screws, and the like. It is also understood that any or all of the upper rail portions 351, 372, 353, 374 or the lower rail portions 360, 380 may be varied in length to adjust the overall length of the chassis 300 to any desired value.

The first and second rails 350, 370 may include one or more front bends 362, 382 and one or more rear bends 364, 384. The one or more front bends 362, 382 and one or more rear bends 364, 384 may be configured to help absorb mechanical shocks to provide a smoother, more comfortable ride. The one or more front bends 362, 382 and the one or more rear bends 364, 384 may be shaped and/or spaced apart in any manner to vary the clearance, height, width, or angle between any of the upper rail portions 351, 372, 353, 374 and the lower rail portions 360, 380. The one or more front bends 362, 382 and the one or more rear bends 364, 384 may also be shaped and/or spaced apart in any manner to vary the height, forward/backward angle, and side-to-side slope of each saddle half 100, 200. The first and second rails 350, 370 may be formed from any suitable material, or combination of materials including, but not limited to: metals, metal alloys, anodized metals and alloys, steel, titanium, composite materials, carbon fiber, plastic materials, Zytel®, rubber materials, and the like.

Figure 3A:
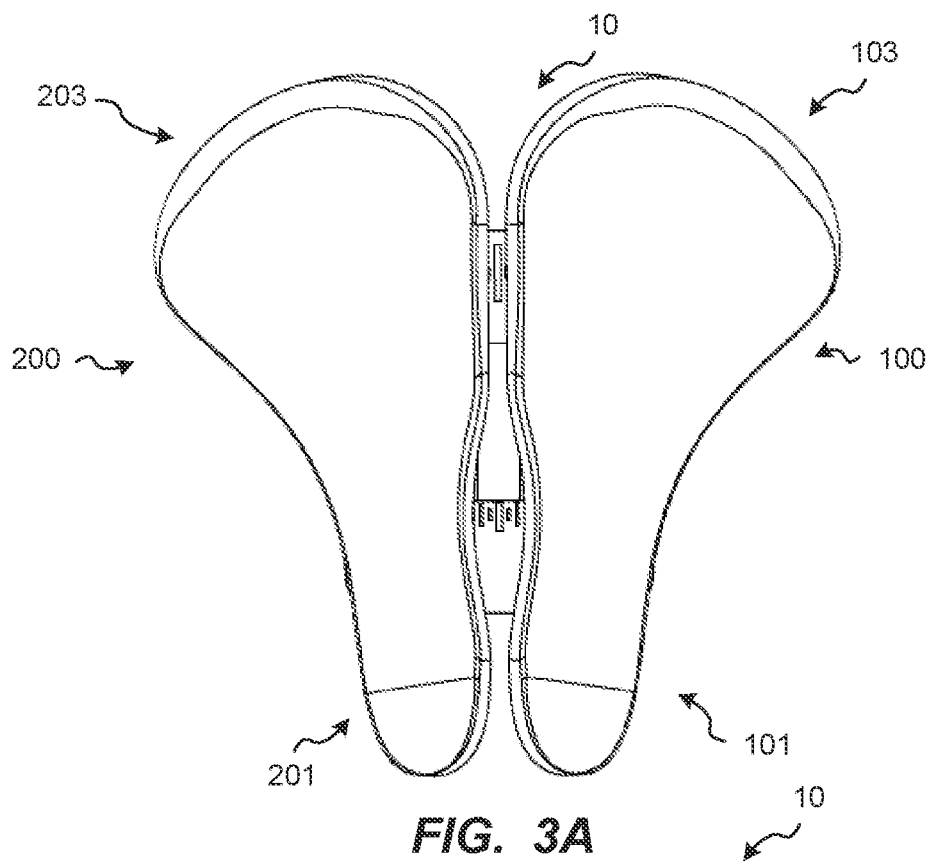
FIGS. 3A-4B show top views of the adjustable saddle of FIG. 2A in various adjustment configurations.
Figure 3B:
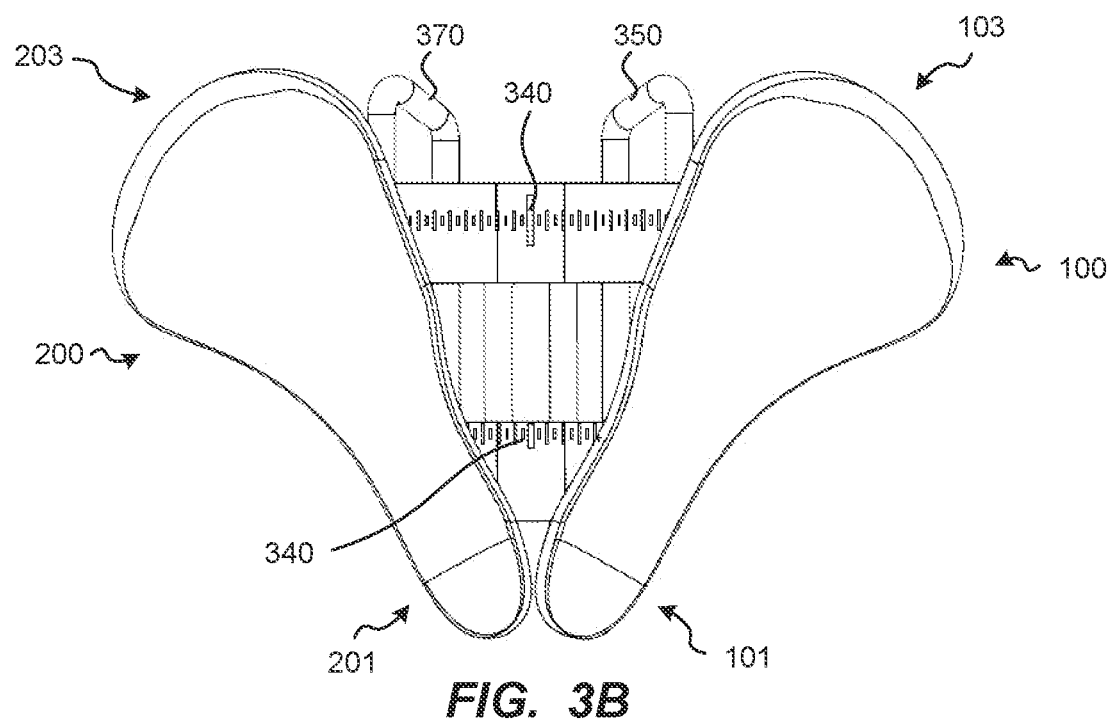
Figure 4A:
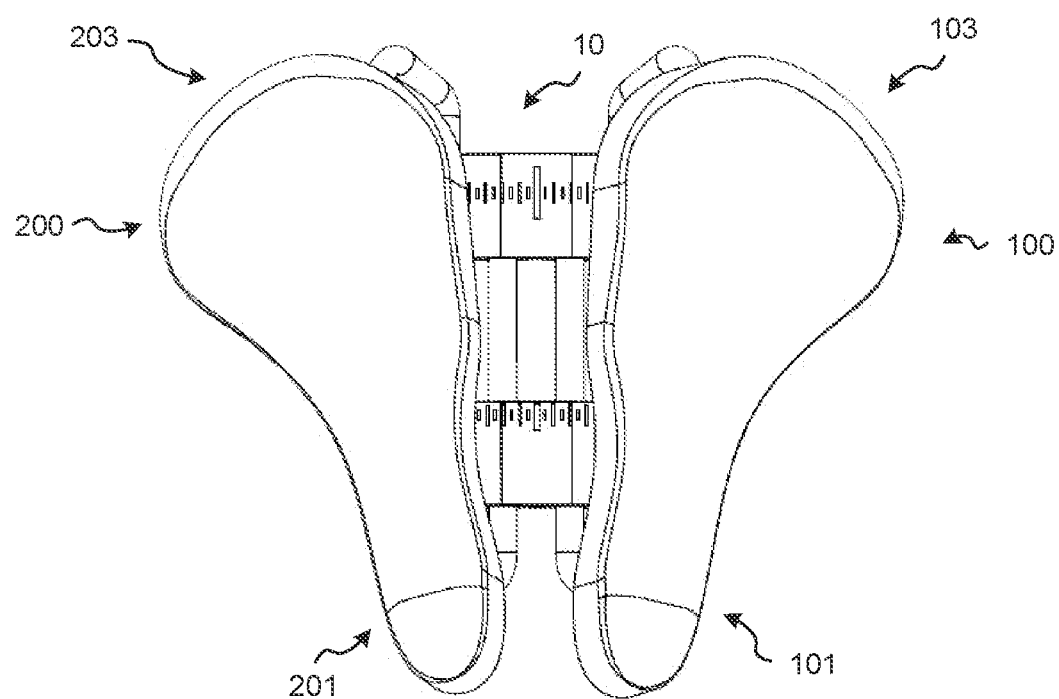
Figure 4B:
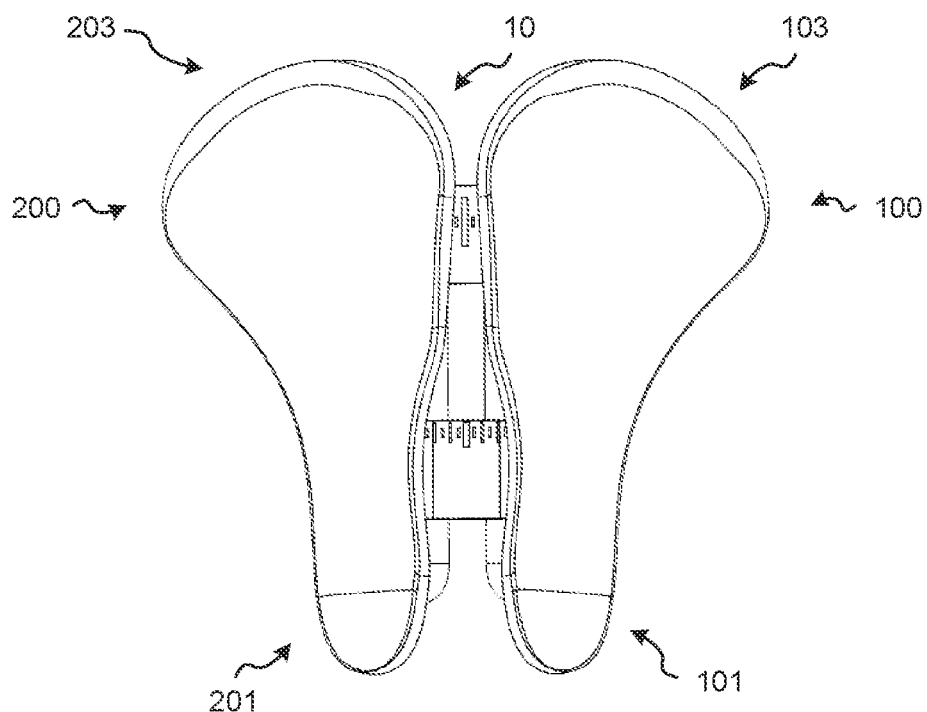
Figure 5A:
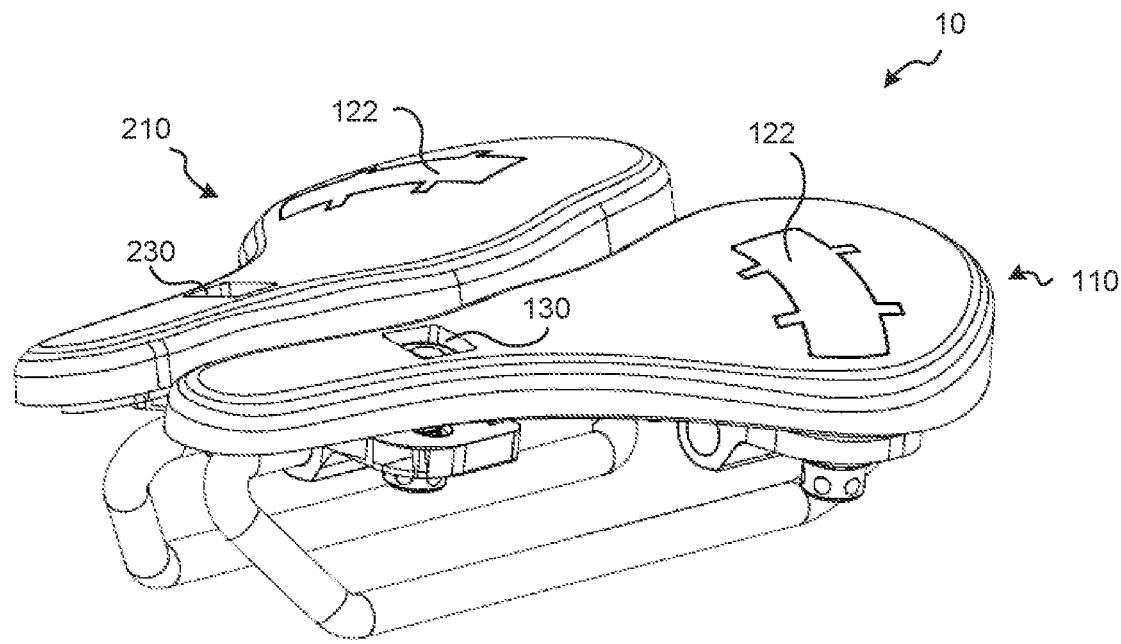
FIG. 5A illustrates an isometric view of the adjustable saddle of FIG. 2A with the foam padding and seat covers removed.
Figure 5B:
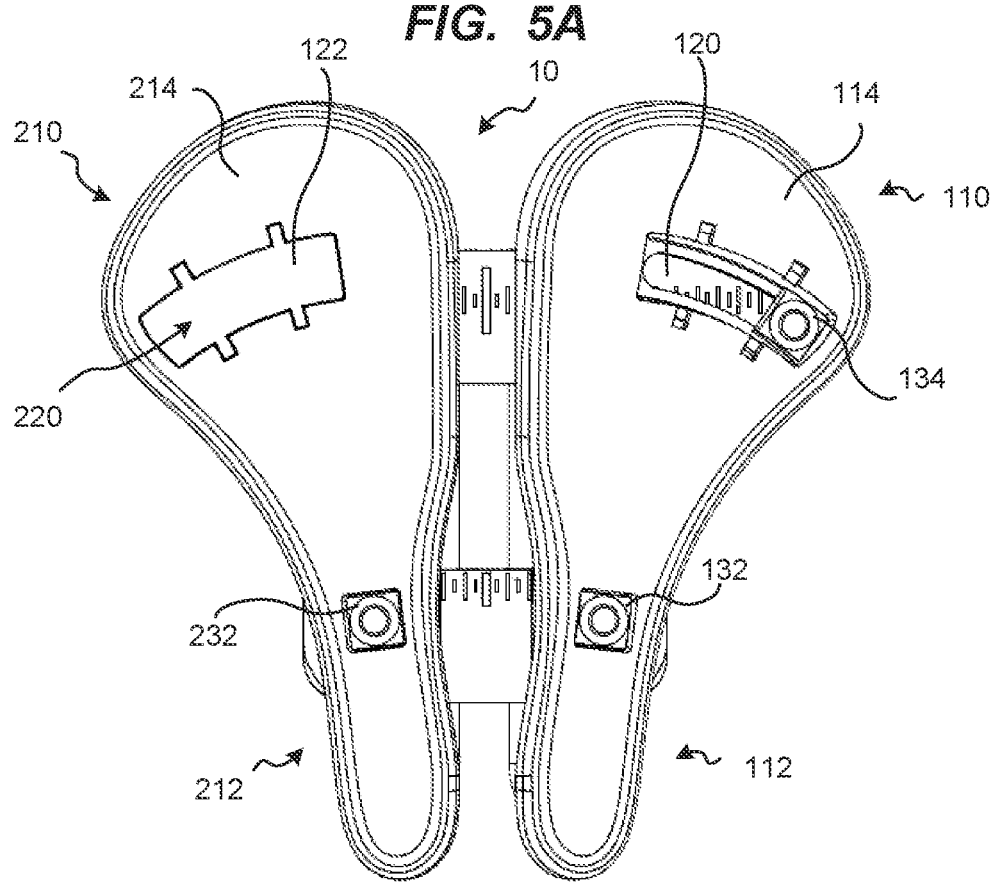
FIG. 5B illustrates a top view of the adjustable saddle of FIG. 5A.

FIGS. 3A-4B illustrate various top views of the adjustable saddle 10 in different exemplary adjustment configurations. FIG. 3A shows the adjustable saddle 10 with the back ends 103, 203 of the saddle halves 100, 200 adjusted close together and the front ends 101, 201 of the saddle halves 100, 200 adjusted close together. FIG. 3B shows the adjustable saddle 10 with the back ends 103, 203 of the saddle halves 100, 200 adjusted far apart from each other and the front ends 101, 201 of the saddle halves 100, 200 adjusted close together. FIG. 4A shows the adjustable saddle 10 with the back ends 103, 203 of the saddle halves 100, 200 adjusted far apart from each other and the front ends 101, 201 of the saddle halves 100, 200 adjusted far apart from each other. FIG. 4B shows the adjustable saddle 10 with the back ends 103, 203 of the saddle halves 100, 200 adjusted close together and the front ends 101, 201 of the saddle halves 100, 200 adjusted far apart from each other. The non-limiting exemplary adjustment configurations shown in FIGS. 3A-4B are for illustration purposes only and it will be understood that the back ends 103, 203 of the saddle halves 100, 200 can assume an infinite number of different positions throughout their adjustment range, and likewise the front ends 101, 201 of the saddle halves 100, 200 can also assume an infinite number of positions throughout their adjustment range. It will also be understood that the size and shape of any of the components of the chassis 300 and the saddle halves 100, 200 may be varied to achieve any saddle half 100, 200 adjustment range/span. For example, the size and shape of the chassis 300 components may be varied to achieve adjustment ranges/spans, including but not limited to: 0-10 cm, 0-15 cm, 0-30 cm, 5-15 cm, 10-20 cm, 15-30 cm, etc.

A wedge tool (not shown) may also be used to help facilitate adjustment of the front ends 101, 201 and the back ends 103, 203 of the saddle halves 100, 200 relative to each other. For example, the wedge tool may have a wedge shape that may be inserted or pressed in between the front ends 101, 201 and/or the back ends 103, 203 of the saddle halves 100, 200. The wedge tool may controllably split apart the saddle halves 100, 200 to achieve a desired spread distance and/or provide one or more reference adjustment angles for the saddle halves 100, 200 during setup of the adjustable saddle 10. In this manner, the wedge tool may be used to help facilitate positional adjustment of the saddle halves 100, 200.

FIGS. 5A-6B show various views of the adjustable saddle 10 with the foam padding and seat covers removed illustrating a first saddle half base 114 and a second saddle half base 214 corresponding to each saddle half 100, 200. The first and second saddle half bases 114, 214 may be formed of one or more rigid materials, including but not limited to: plastics, metals, carbon fiber, Zytel®, composite materials, or the like. Additionally, the first and second saddle half bases 114, 214 may be manufactured using 3D printing technology and may include dual density lattice structure such that different portions of the first and second saddle half bases 114, 214 may be softer or firmer.

The first and second saddle half bases 114, 214 may include apertures 130, 230 formed in the front ends 112, 212 of the first and second saddle half bases 114, 214. The apertures 130, 230 may be configured to retain and/or couple to suitable retainer nuts 132, 232 placed within the apertures 130, 230. The retainer nuts 132, 232 may be further configured to receive the first and second fasteners 301, 302 by any suitable method, such as complementary threading. In another embodiment (not shown), the apertures 130, 230 formed in the front ends 112, 212 of the first and second saddle half bases 114, 214 may also include angled slots to increase the range of pivotal and/or translational movement of the front ends 112, 212 of the first and second saddle half bases 114, 214.

The first and second saddle half bases 114, 214 may further include a first arcuate adjustment channel 120 and a second arcuate adjustment channel 220 formed in the back ends 110, 210 of the first and second saddle half bases 114, 214. The first arcuate adjustment channel 120 may be configured to receive the third fastener 303 therein. The first saddle half base 114 may be slidably positionable relative to the third fastener 303 positioned within the first arcuate adjustment channel 120 to allow pivotal attachment of the back end 110 of the first saddle half base 114 relative to the rear mounting assembly 330. Likewise, the second arcuate adjustment channel 220 may be configured to receive the fourth fastener 304 therein. The second saddle half base 214 may be slidably positionable relative to the fourth fastener 304 positioned within the second arcuate adjustment channel 220 to allow pivotal attachment of the back end 210 of the second saddle half base 214 to the rear mounting assembly 330.

The first and second arcuate adjustment channels 120, 220 may be configured to retain and/or couple to suitable retainer nuts 134 placed within the arcuate adjustment channels 120, 220. The retainer nuts 134 may be further configured to receive the third and fourth fasteners 303, 304 by any suitable method, such as complementary threading. The first and second arcuate adjustment channels 120, 220 may also be covered with inserts 122 to support and protect foam padding placed on top of the first and second saddle half bases 114, 214.

Figure 6A:
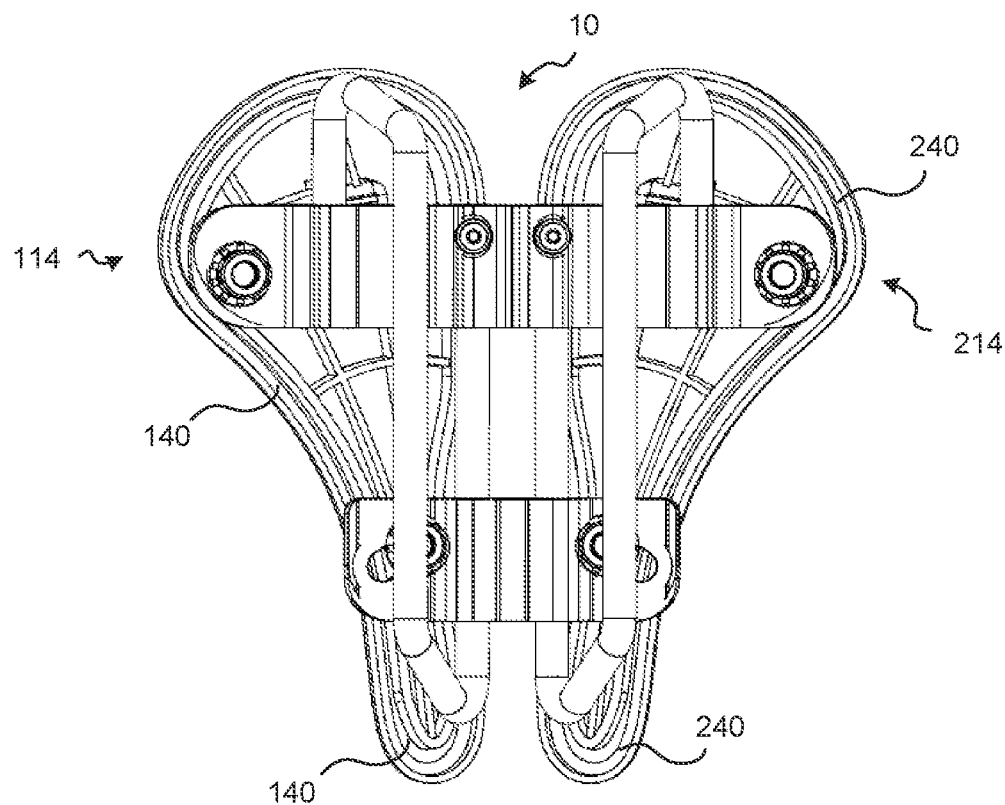
FIG. 6A illustrates a bottom view of the adjustable saddle of FIG. 5A.

FIG. 6A illustrates a bottom view of the adjustable saddle 10 without seat covers or foam padding. The first and second saddle half bases 114, 214 may include grooves 140, 240 formed around the bottom edge of each saddle half base 114, 214 that may be configured to facilitate coupling of the seat covers 102, 202 and/or their cords (not shown) to the first and second saddle half bases 114, 214 to help hold the seat covers 102, 202 in place.

Figure 6B:
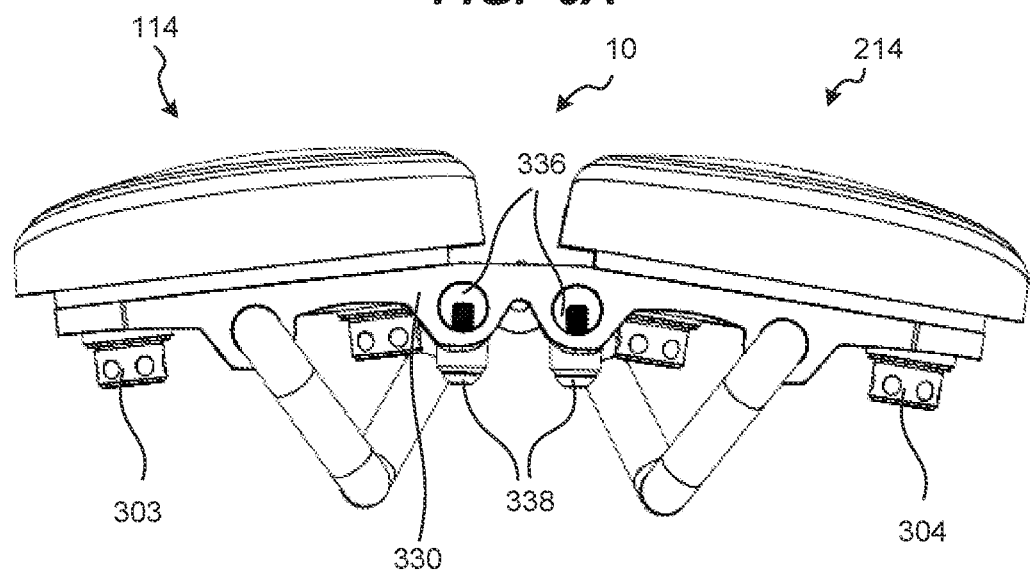
FIG. 6B illustrates a back view of the adjustable saddle of FIG. 5A.

FIG. 6B illustrates a back view of the adjustable saddle 10 without seat covers or foam padding. The rear mounting assembly 330 may include one or more rear attachment apertures 336 configured to receive one or more attachment accessories. The rear mounting assembly 330 may also include one or more attachment fasteners 338 to couple the one or more attachment accessories to the rear mounting assembly 330 and/or couple the rear mounting assembly 330 to the first and second rails 350, 370.

Figure 7A:
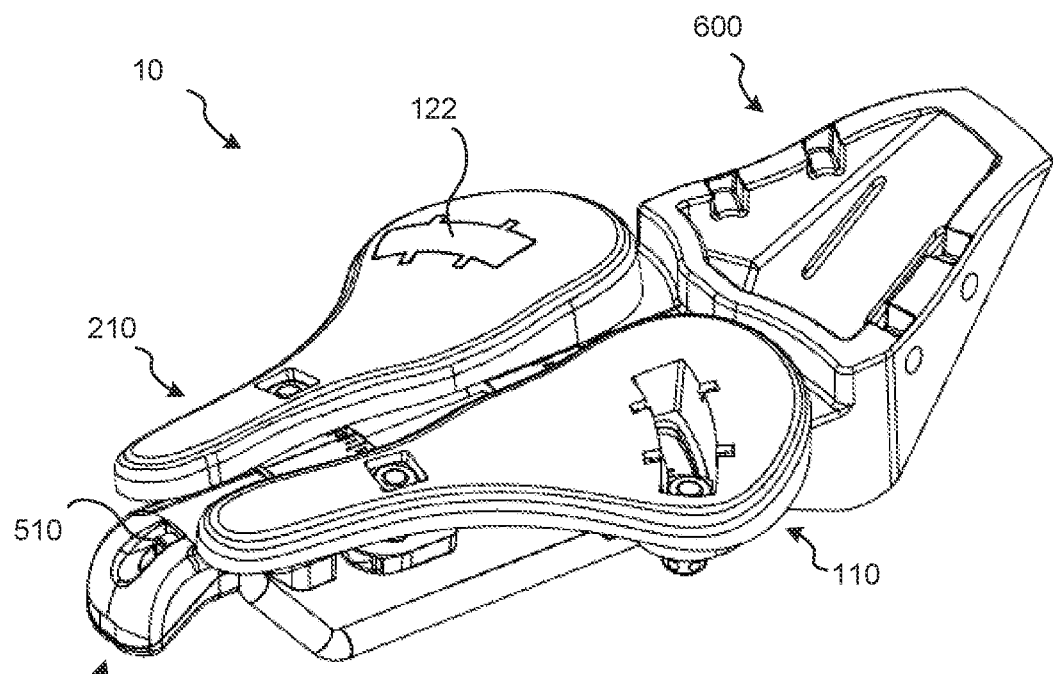
FIG. 7A illustrates an isometric view of the adjustable saddle of FIG. 5A with modular nose and rear wing piece attachments.
Figure 7B:
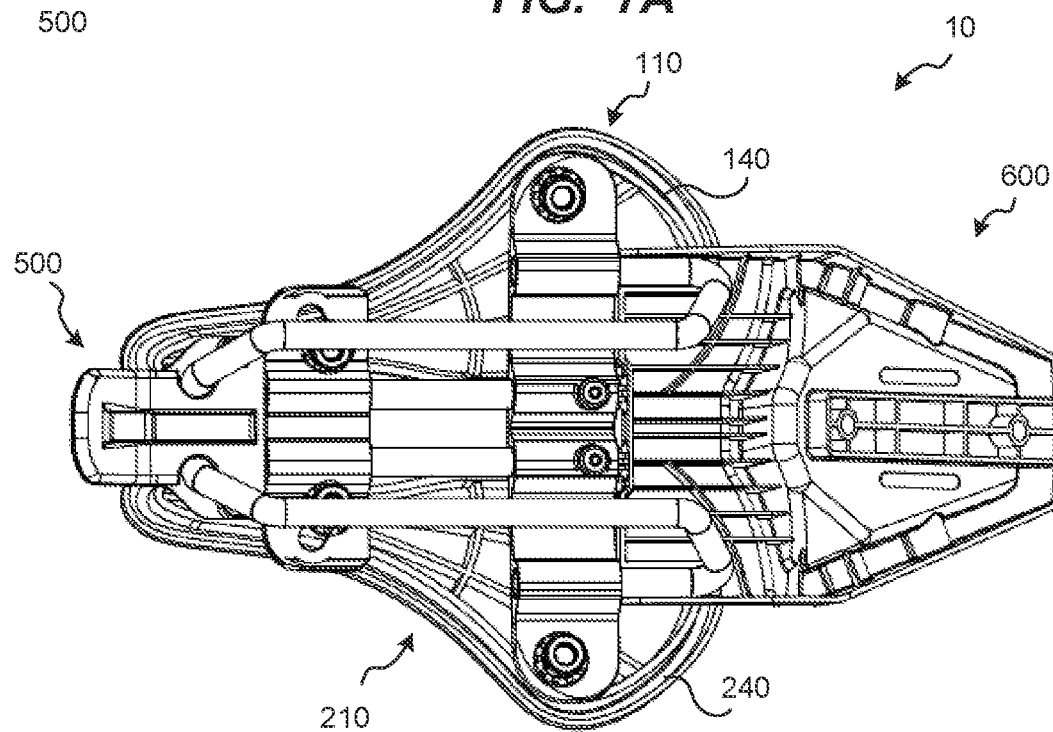
FIG. 7B illustrates a bottom view of the adjustable saddle of FIG. 7A.
Figure 8A:
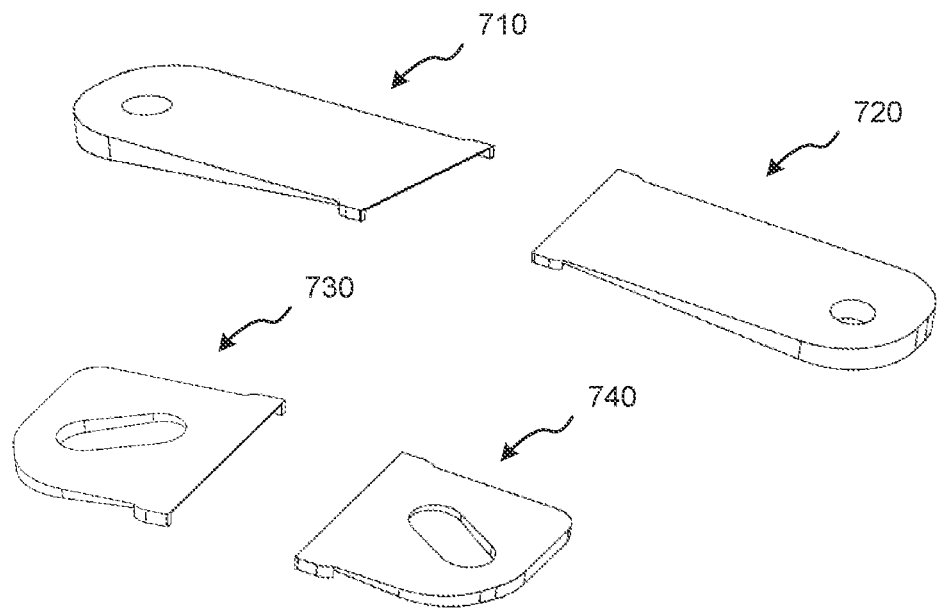
FIG. 8A illustrates an isometric view of example adjustment shims, according to one u embodiment of the present disclosure.
Figure 8B:
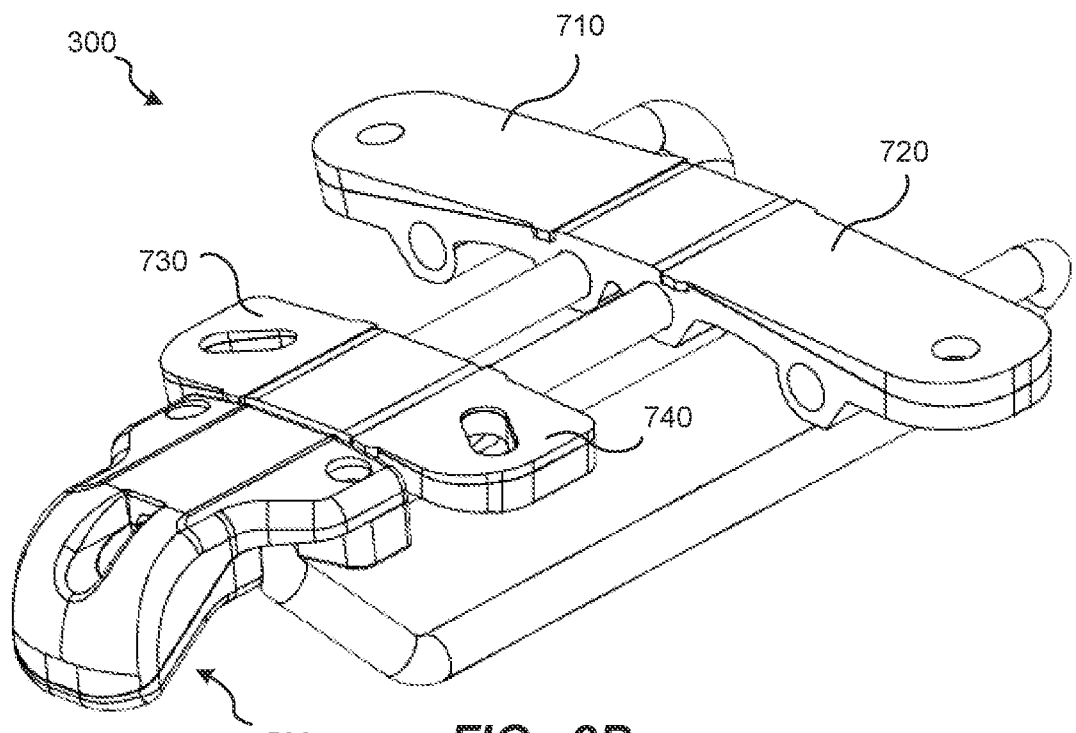
FIG. 8B illustrates an isometric view of a chassis coupled to the adjustment shims of FIG. 8A.

FIGS. 7A and 7B illustrate various views of the adjustable saddle 10 with a modular nose piece 500 attached to the front mounting assembly 310 and a rear tailpiece 600 attached to the rear mounting assembly 330. The modular nose piece 500 may act as a transition hook to hold a bike on a rail and/or facilitate transitions between different triathlon events. The modular nose piece 500 may be attached to the front mounting assembly 310 via a nose attachment screw 510 that may be threaded into the attachment aperture 314 of the front mounting assembly 310 (see FIG. 1). The rear tailpiece 600 may include various mounting assemblies for additional attachments, including but not limited to: water bottle brackets, water bottle cages, $CO_2$ cartridges, toolkits, spare parts, and the like.

FIGS. 8A-9A illustrate various adjustment shims 710, 720, 730, 740 that may be used in conjunction with any adjustable saddle of the present disclosure to adjust a height, slope, flatness, and/or angle of each saddle half base 114, 214. For example, at least one adjustment shim 710, 720, 730, 740 may be placed between at least one of the front and rear mounting assemblies 310, 330 and at least one of the first and second saddle half bases 114, 214 to adjust the height, slope, flatness, and/or angle associated with the at least one of the first and second saddle half bases 114, 214. In this manner, adjustment shims 710, 720, 730, 740 of varying angles may be used to adjust the side-to-side angle, or "flatness," of each saddle half base 114, 214. The adjustment shims 710, 720, 730, 740 may remain installed on the adjustable saddle to raise the front or the back of the adjustable saddle in place of, or in addition to, the use of a seat post mount to raise the front or the back of the adjustable saddle. The length of any fasteners used to fasten the saddle half bases 114, 214 to the chassis may also be adjusted to accommodate a particular thickness of a given adjustment shim 710, 720, 730, 740. In at least one embodiment, adjustable screws (not shown) may also be utilized to provide additional angle adjustments between each saddle half base 114, 214 and the front and/or rear mounting assemblies 310, 330 that each saddle half base 114, 214 rests on.

Moreover, any number or combination of adjustment shims 710, 720, 730, 740 may be used in any desired configuration to individually adjust the height, forward/backward angle, flatness, and side-to-side slope of each saddle half base 114, 214. In this manner, an individual may achieve any desired height, forward/backward angle, flatness, and side-to-side slope for each saddle half base 114, 214 and thereby achieve complete customization of a given adjustable saddle. Moreover, the width, length, slope, flatness, and shape of the front and rear mounting assemblies 310, 330 themselves may also be varied to individually adjust the height, forward/backward angle, flatness, and side-to-side slope of each saddle half base 114, 214.

Figure 9A:
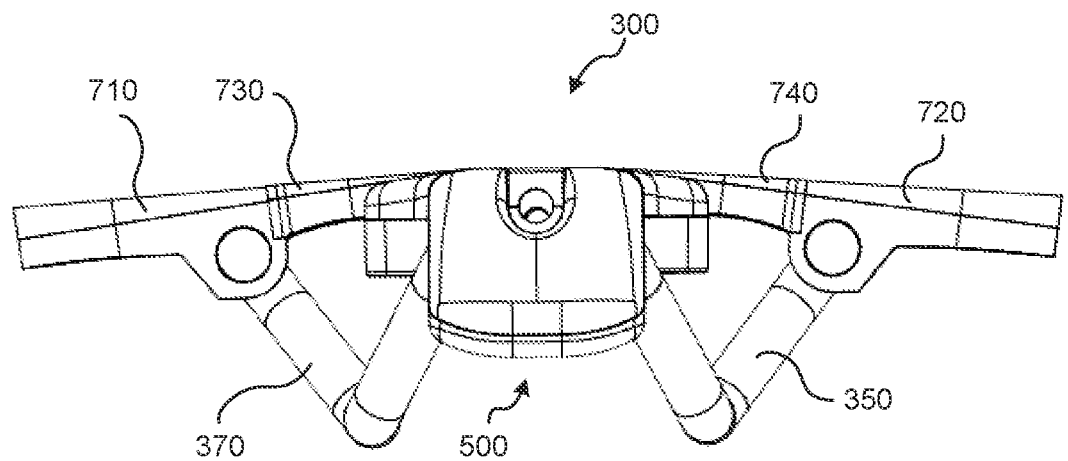
FIG. 9A illustrates a front view of the chassis of FIG. 8B.
Figure 9B:
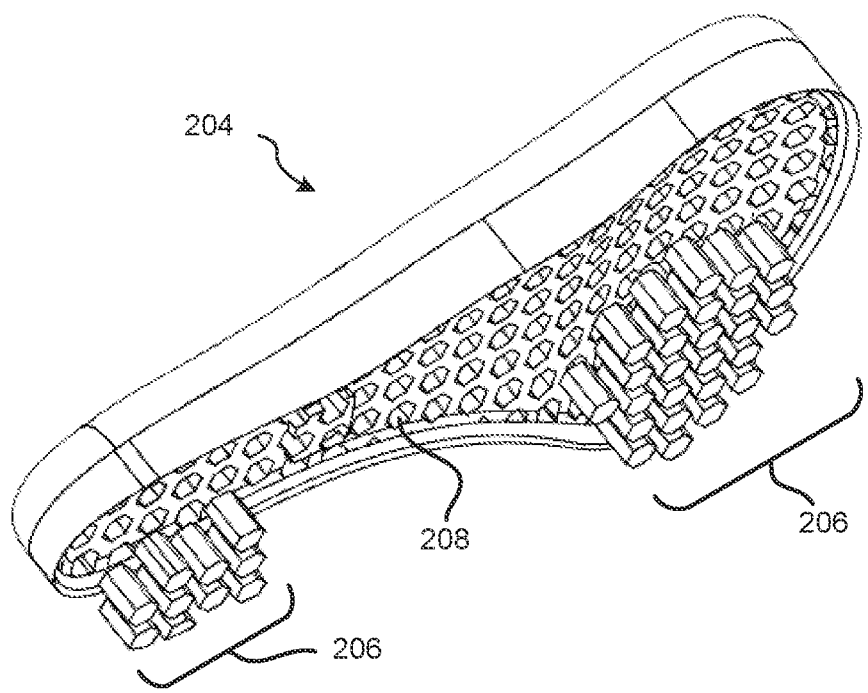
FIG. 9B illustrates an isometric view of example foam padding, according to one embodiment of the present disclosure.

FIG. 9B illustrates example foam padding 204 that may be used with any adjustable saddle of the present disclosure. The foam padding 204 material may be made to specification to achieve any desired firmness or softness. The foam padding 204 may also be varied in shape and thickness. In the embodiment shown in FIG. 9B, the foam padding 204 may include a plurality of honeycomb shaped apertures 208 and corresponding honeycomb shaped foam plugs 206. The firmness of the foam padding 204 may be fine-tuned by inserting the honeycomb shaped foam plugs 206 into the honeycomb shaped apertures 208 to achieve extra firmness in selected areas. This may allow a rider to fine tune the foam padding 204 based on advanced pressure mapping techniques to achieve a customized firmness/softness profile, avoid "hot-spots," and reduce weight by only utilizing the honeycomb shaped foam plugs 206 where they are needed.

In other embodiments (not shown), the foam padding 204 may include any suitable shape of foam plugs 206 and/or apertures 208 including, but not be limited to: square, rectangular, round, circular, triangular, oval, hexagonal, octagonal, block, box, spherical, cylindrical, pyramidal, trapezoidal, and the like.

It will be understood that the adjustable saddles described herein may be completely modular in nature. Thus, any of the individual parts, components, or accessories described herein may be available in a number of different colors, sizes, shapes, materials, etc., and may be mixed and matched in many different combinations to suit a particular preference. For example, differently shaped saddle half bases 114, 214 (not shown) may include a higher surface on their the back ends 110, 210 to accommodate individuals with medical conditions or individual who prefer a higher back surface to help keep their sit bones from sliding backward in the adjustable saddle 10 as they ride. In some embodiments, kits may be sold to entities (e.g., bike shops) which may include a plurality of different parts, components, and accessories of various different colors, sizes, shapes, materials, etc. The entity may utilize the components in the kit to build customized adjustable saddles according to the preferences of a given individual. Moreover, each saddle half 100, 200 may be quickly removed and swapped out for a different saddle while the chassis 300 remains mounted to the seat post 400. This allows the individual to quickly install new saddle halves 100, 200 with different colors, sizes, shapes, materials, etc.

Figure 10:
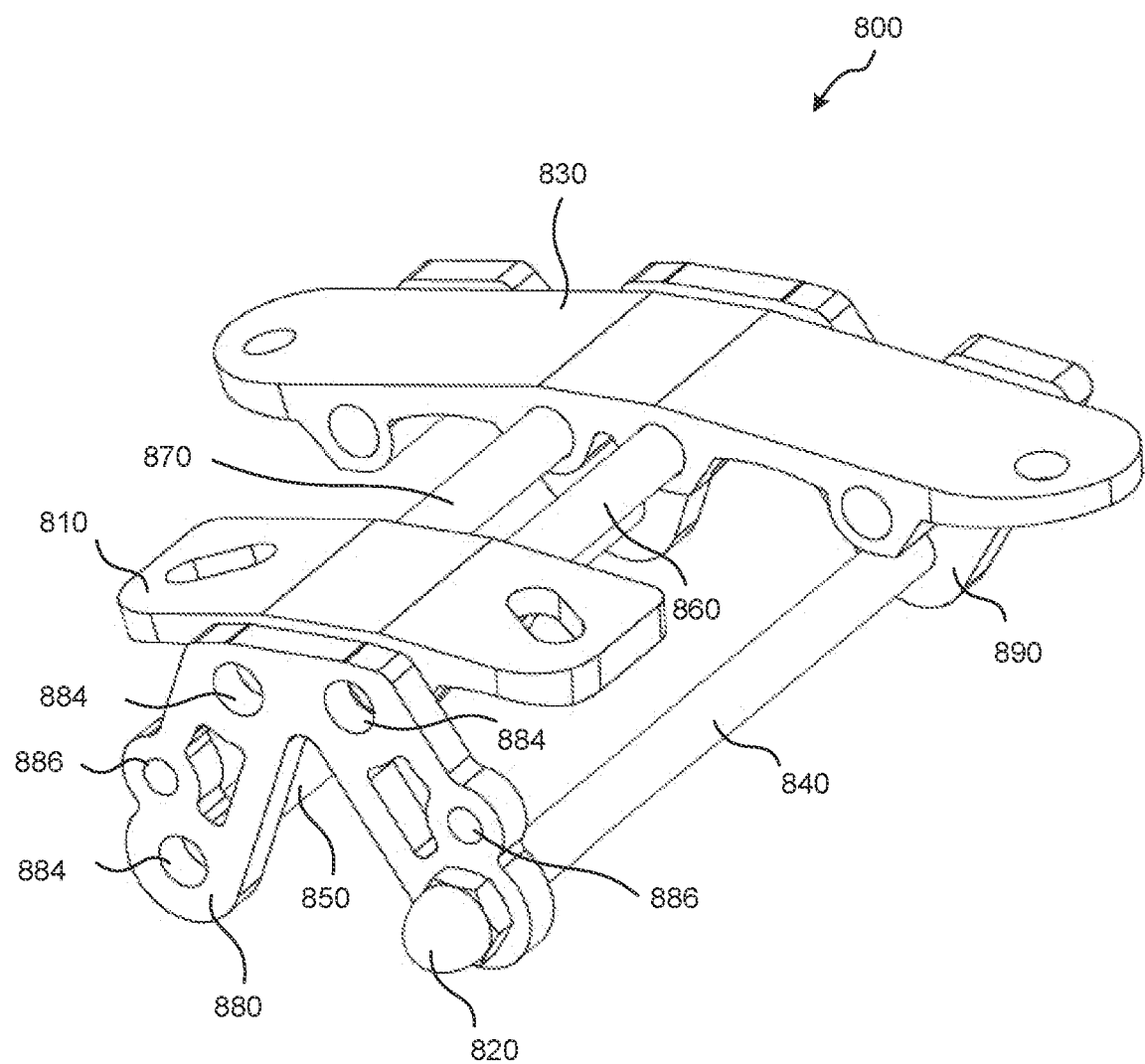
FIG. 10 illustrates an isometric view of a chassis, according to another embodiment of the present disclosure.
Figure 11A:
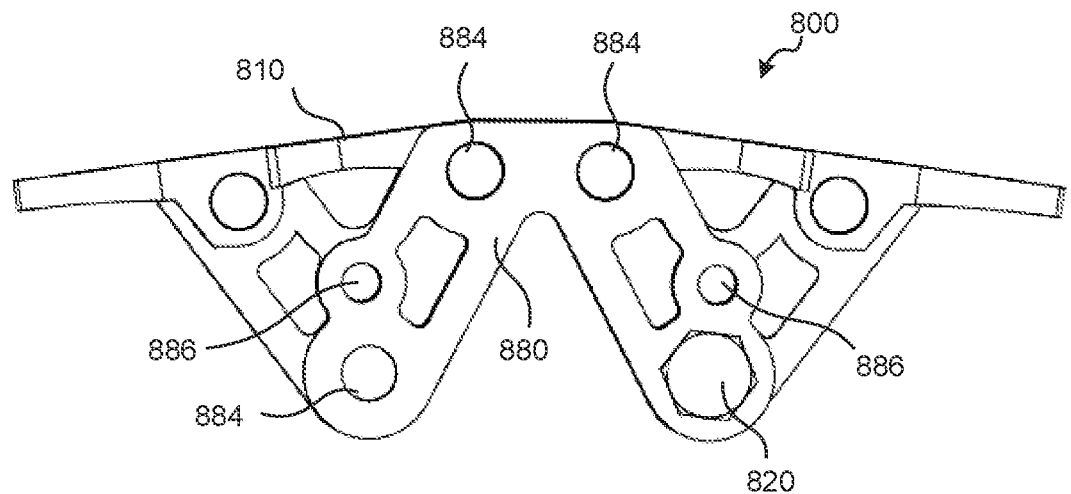
FIG. 11A illustrates a front view of the chassis of FIG. 10.
Figure 11B:
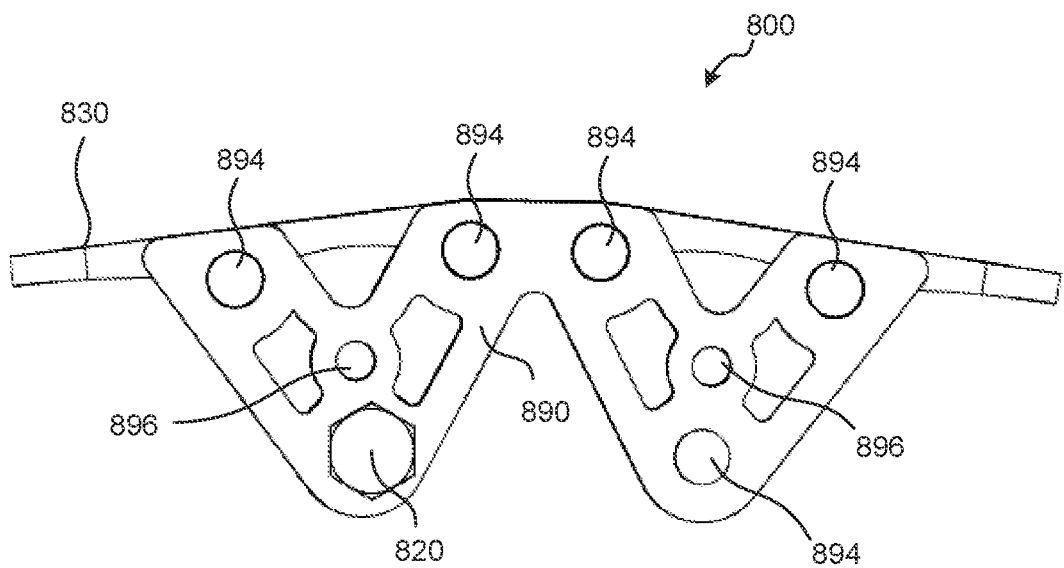
FIG. 11B illustrates a back view of the chassis of FIG. 10.

FIGS. 10-11B illustrate various views of a chassis 800, according to another embodiment of the present disclosure. The chassis 800 may generally include a front mounting assembly 810, a rear mounting assembly 830, a first lower rail 840, a second lower rail 850, a first upper rail 860, a second upper rail 870, a front rail bracket 880, and a back rail bracket 890. The front mounting assembly 810 and/or the rear mounting assembly 830 may be slidably attached to the first and second upper rails 860, 870 and/or held in place along the first and second upper rails 860, 870 by any suitable method such as frictional forces, retainer screws, and the like.

The first and second upper and lower rails 840, 850, 860, 870, front and back rail brackets 880, 890, and front and rear mounting assemblies 810, 830 may be formed from any suitable material, or combination of materials including, but not limited to: metals, metal alloys, anodized metals and alloys, steel, titanium, composite materials, carbon fiber, plastic materials, Zytel®, rubber materials, and the like.

In the embodiment shown in FIGS. 10-11B, the first and second upper rails 860, 870 and the first and second lower rails 840, 850 may generally be straight and have cylindrical shapes. However, in other embodiments the first and second upper and lower rails 840, 850, 860, 870 may be curved and/or have non-cylindrical shapes. Any or all of the first and second upper and lower rails 840, 850, 860, 870 may be varied in length to adjust the overall length of the chassis 800 to achieve any desired value. Moreover, the first and second upper and lower rails 840, 850, 860, 870 may be spaced apart from each other and/or angled with respect to each other in any manner to vary the height, forward/backward angle, and side-to-side slope of each saddle half.

The first and second upper and lower rails 840, 850, 860, 870 may be coupled to the front and back rail brackets 880, 890 by any suitable means including, but not limited to: integral formation, adhesive bonding (e.g., epoxy adhesives), detachable fasteners, quick release fasteners, and the like. In the embodiment shown in FIGS. 10-11B, the first and second upper and lower rails 840, 850, 860, 870 may be detachably coupled to the front and back rail brackets 880, 890 by one or more fasteners 820. In at least one embodiment, the one or more fasteners 820 may be mechanically threaded nuts that engage complementary threading that is coupled to, or formed on, the ends of the first and second upper and lower rails 840, 850, 860, 870 and which protrudes through one or more front rail apertures 884 formed in the front rail bracket 880 and one or more back rail apertures 894 formed in the back rail bracket 890.

The front rail bracket 880 may also include additional apertures, such as front mounting apertures 886. Likewise, the back rail bracket 890 may also include additional apertures, such as back mounting apertures 896. The front and back mounting apertures 886, 896 may be configured to receive one or more attachment accessories, as previously described herein.

The one or more front and back rail apertures 884, 894 may be spaced apart from each other and/or angled with respect to each other in any manner to vary the height, forward/backward angle, and side-to-side slope of each saddle half and/or individually vary the height, forward/backward angle, and side-to-side angle of each of each of the first and second upper and lower rails 840, 850, 860, 870.

Figure 12:
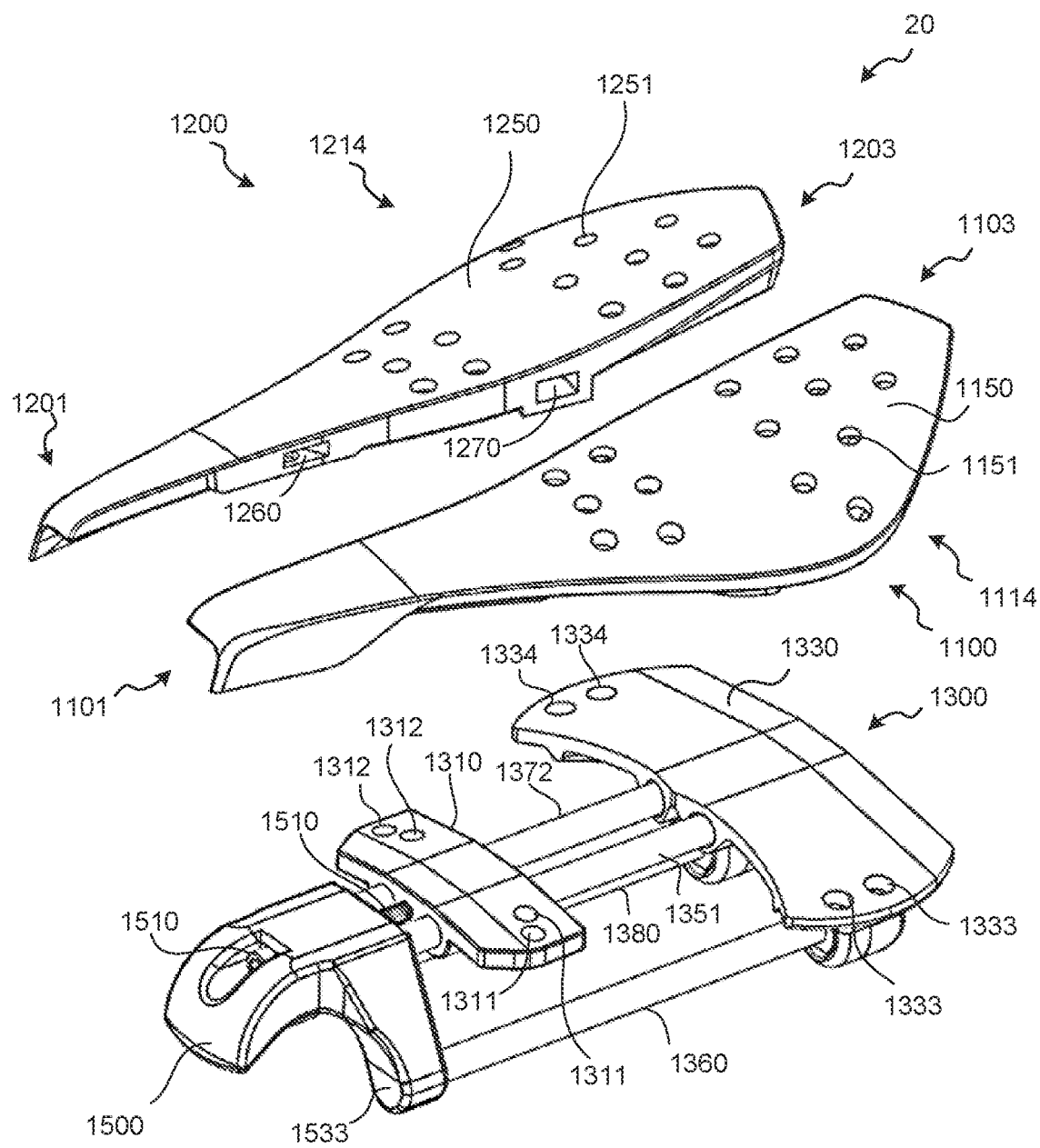
FIG. 12 illustrates an exploded view of an adjustable saddle including a chassis and two saddle half bases, according to another embodiment of the present disclosure.

FIG. 12 illustrates an exploded view of an adjustable saddle 20, according to another embodiment of the present disclosure. The adjustable saddle 20 may generally include a first saddle half 1100 including a first saddle half base 1114, a second saddle half 1200 including a second saddle half base 1214, and a chassis 1300. The first and second saddle half bases 1114, 1214 may be further covered in foam padding (not shown) and the foam padding may also be further covered with suitable seat covers (not shown) to help protect the foam padding from weathering, abrasion, and general wear. In at least one embodiment, the foam padding may be coupled to the first and second saddle half bases 1114, 1214 with a suitable adhesive and the seat covers may also be coupled to the foam padding with a suitable adhesive, as will be discussed in more detail below.

The first and second saddle half bases 1114, 1214 may be adjustably attached to the chassis 1300 via a first fastener, a second fastener, a third fastener, and a fourth fastener (not shown) in similar fashion to the adjustable saddle 10 shown in FIG. 1 and discussed previously. The first and second fasteners may be referred to as front fasteners that are configured to attach the front ends 1101, 1201 of the saddle halves 1100, 1200 to the chassis 1300. Likewise, the third and fourth fasteners may be referred to as rear fasteners configured to attach the back ends 1103, 1203 of the saddle halves 1100, 1200 to the chassis 1300.

Figure 13A:
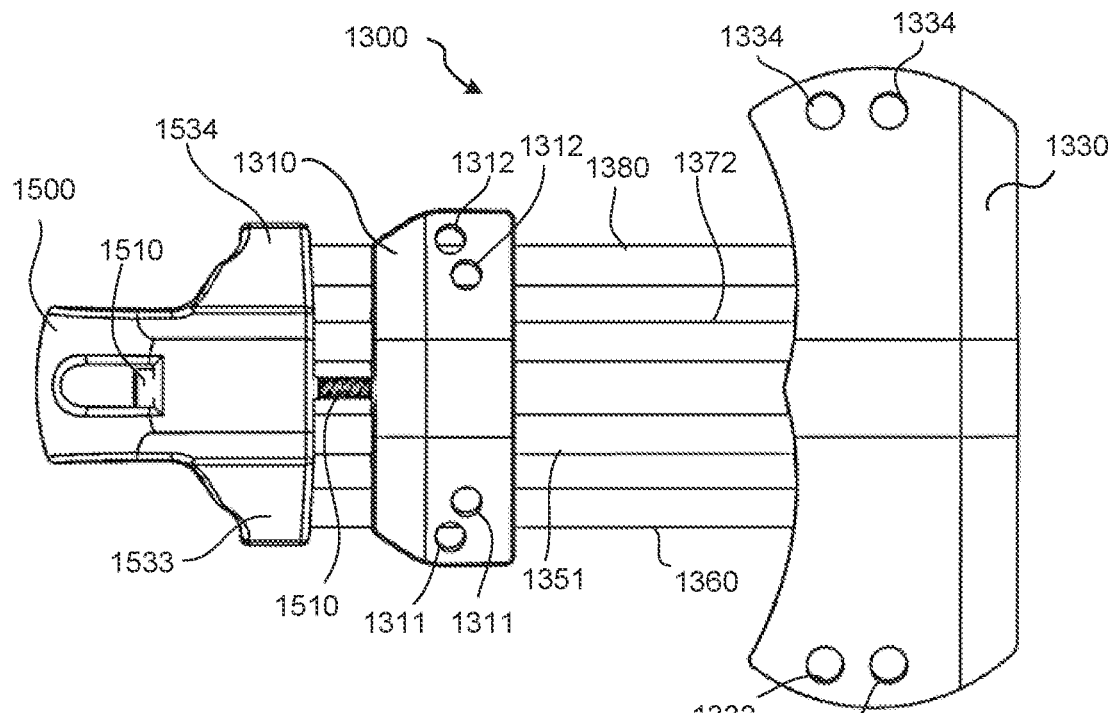
FIG. 13A illustrates a top view of the chassis shown in FIG. 12.
Figure 13B:
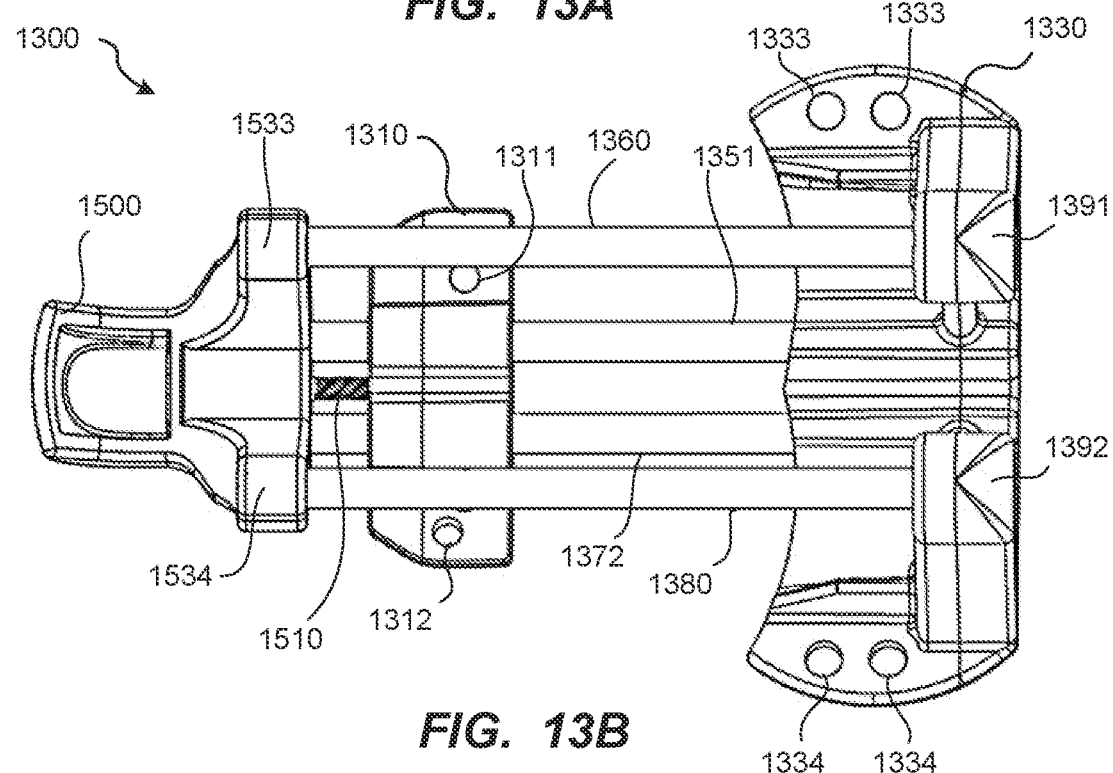
FIG. 13B illustrates a bottom view of the chassis shown in FIG. 12.
Figure 13C:
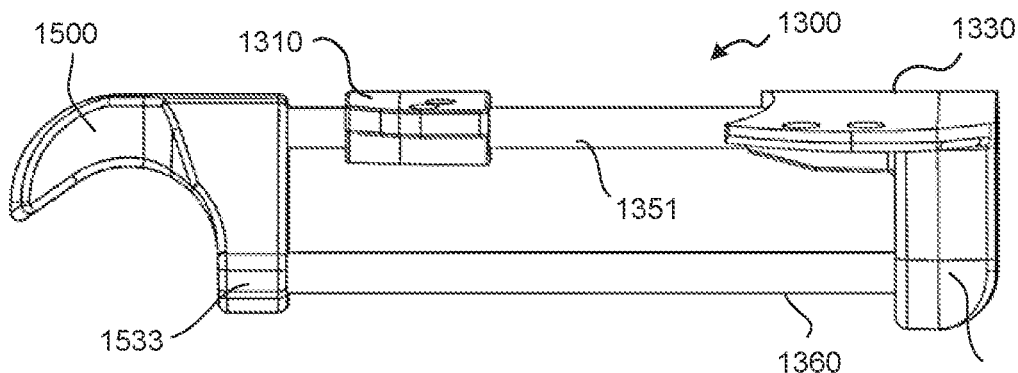
FIG. 13C illustrates a side view of the chassis shown in FIG. 12.

FIGS. 13A-13C illustrate various views of the chassis 1300 shown in FIG. 12. The chassis 1300 may generally include a nose piece 1500, a nose piece adjustment screw 1510, a front mounting assembly 1310, a rear mounting assembly 1330, a first lower rail 1360, a second lower rail 1380, a first upper rail 1351, and a second upper rail 1372.

The nose piece 1500, nose piece adjustment screw 1510, front mounting assembly 1310, rear mounting assembly 1330, first lower rail 1360, second lower rail 1380, first upper rail 1351, and second upper rail 1372 may be formed from any suitable material, or combination of materials including, but not limited to: metals, metal alloys, anodized metals and alloys, steel, titanium, composite materials, carbon fiber, plastic materials, Zytel®, rubber materials, and the like.

In at least one embodiment, the first and second upper and lower rails 1351, 1360, 1372, 1380 may generally be straight and have cylindrical shapes. However, in other embodiments (not shown) the first and second upper and lower rails 1351, 1360, 1372, 1380 may be curved and/or have non-cylindrical shapes. Any or all of the first and second upper and lower rails 1351, 1360, 1372, 1380 may be varied in length to adjust the overall length of the chassis 1300 to achieve any desired value. Moreover, the first and second upper and lower rails 1351, 1360, 1372, 1380 may be spaced apart from each other and/or angled with respect to each other in any manner to vary the height, forward/backward angle, and side-to-side slope of each saddle half. The first and second upper and lower rails 1351, 1360, 1372, 1380 may be coupled to the nose piece 1500 and the rear mounting assembly 1330 by any suitable means including, but not limited to: friction fit, integral formation, adhesive bonding (e.g., epoxy adhesives), detachable fasteners, quick release fasteners, and the like.

The front mounting assembly 1310 may include first apertures 1311 configured to receive the first fastener (not shown) to attach the front end 1101 of the first saddle half 1100 to the front mounting assembly 1310, as well as second apertures 1312 configured to receive the second fastener (not shown) to attach the front end 1201 of the second saddle half 1200 to the front mounting assembly 1310. Likewise, the rear mounting assembly 1330 may include third apertures 1333 configured to receive the third fastener (not shown) to attach the back end 1103 of the first saddle half 1100 to the rear mounting assembly 1330, as well as fourth apertures 1334 configured to receive the fourth fastener (not shown) to attach the back end 1203 of the second saddle half 1200 to the rear mounting assembly 1330.

The front mounting assembly 1310 may be slidably adjustable along the length of the first upper rail 1351 and the second upper rail 1372. This may be accomplished by turning the nose piece adjustment screw 1510 clockwise and/or counter clockwise to adjust the translational position of the front mounting assembly 1310 relative to the rear mounting assembly 1330 along the lengths of the first upper rail 1351 and the second upper rail 1372. In this manner, any distance between the front mounting assembly 1310 and the rear mounting assembly 1330 may be achieved. However, in other embodiments (not shown), the nose piece 1500 and front mounting assembly 1310 may be integrated together in a single piece such that the front mounting assembly 1310 may not be configured to move relative to the nose piece 1500. Moreover, in other embodiments (not shown), the nose piece 1500, the front mounting assembly 1310, and/or the rear mounting assembly 1330 may be integrally formed together as a single unified bracket.

In the embodiment shown in FIGS. 12-13C, the first and second apertures 1311, 1312 may be angled relative to each other to allow pivotal and/or translational adjustment of the front ends 1101, 1201 of the saddle halves 1100, 1200. However, it will be understood that in other embodiments contemplated herein, the first and second apertures 1311, 1312 may not be angled relative to each other and any number of first and second apertures 1311, 1312 may be used. Likewise, in the embodiment shown in FIGS. 12-13C, the third and fourth apertures 1333, 1334 may or may not be angled relative to each other to allow pivotal and/or translational adjustment of the back ends 1103, 1203 of the saddle halves 1100, 1200. Furthermore, in yet other embodiments (not shown), the third and fourth apertures 1333, 1334, may also comprise angled slots to allow pivotal and translational adjustment of the back ends 1103, 1203 of the saddle halves 1100, 1200 to increase the potential range of motion of the saddle halves 1100, 1200.

Figure 14A:
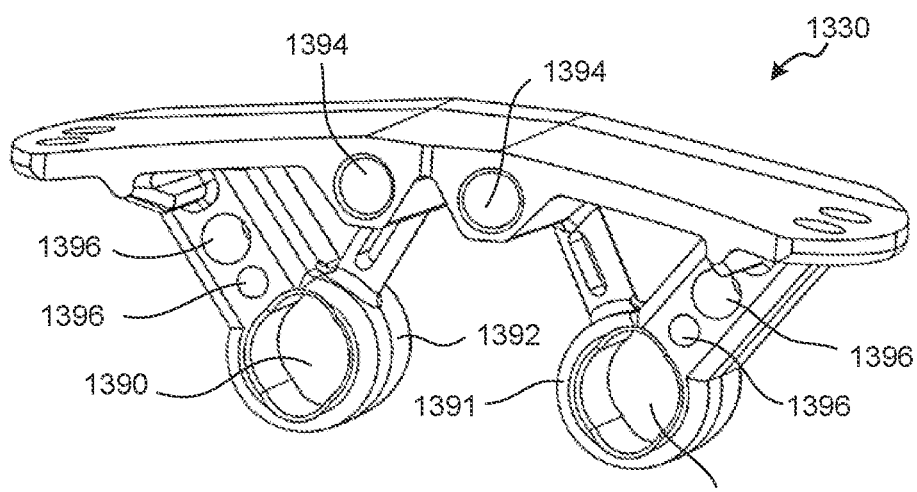
FIG. 14A illustrates an isometric front view of an example rear mounting assembly that may be used with the chassis shown in FIGS. 13A-13C.
Figure 14B:
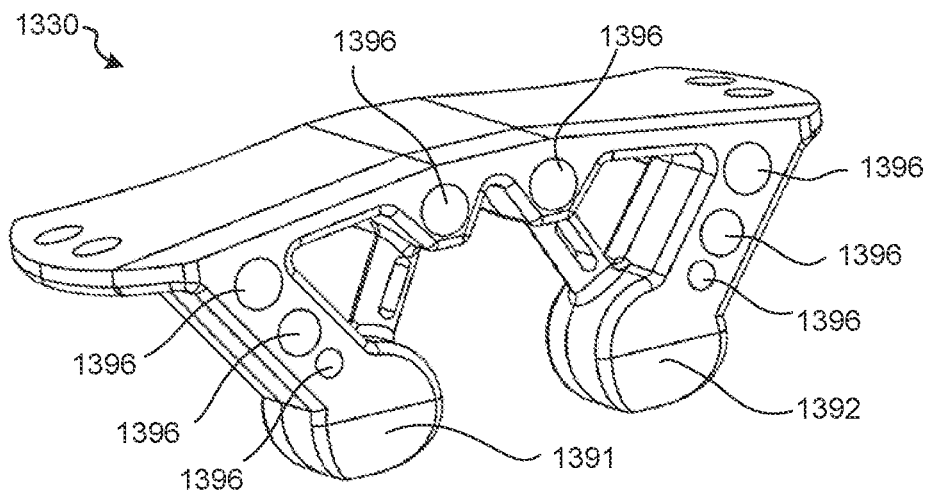
FIG. 14B illustrates an isometric rear view of the rear mounting assembly shown in FIG. 14A.

FIGS. 14A and 14B illustrate isometric front and back views of the rear mounting assembly 1330. The rear mounting assembly 1330 may include upper rail apertures 1394 configured to receive the first and second upper rails 1351, 1372 there in, as well as a first lower rail housing 1391 and a second lower rail housing 1392.

Figure 15:
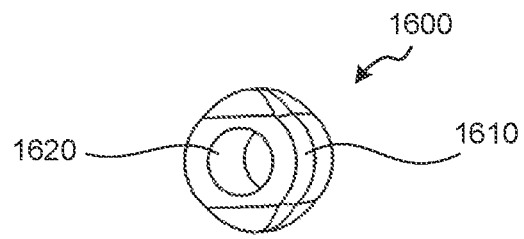
FIG. 15 illustrates an isometric view of an example flexible member that may be used with the rear mounting assembly shown in FIGS. 14A and 14B.

In at least one embodiment, each of the first lower rail housing 1391 and the second lower rail housing 1392 may further include flexible member chambers 1390 each configured to receive a first flexible member 1600 and a second flexible member 1600 therein (see FIG. 15). The flexible members 1600 may include an outer surface 1610 configured to engage an inner surface of the first or second lower rail housings 1391, 1392 as well as an aperture 1620 configured to engage one of the first and second lower rails 1360, 1380 therein. In at least one embodiment, the flexible members 1600 may be made of a flexible material (e.g., thermoplastic elastomer) which may provide shock absorption characteristics to the adjustable saddle 20, isolate the adjustable saddle 20 from road vibrations, and/or provide a "side-to-side" pivot motion of the adjustable saddle 20 as the rider pedals the bicycle. However, it will be understood that in other embodiments, the flexible members 1600 may also be made of rigid materials, so as to preclude shock absorption, isolation from road vibrations, and/or a "side-to-side" pivot/rocking motion as the rider pedals the bicycle. It will also be understood that the flexible members 1600 may be made of any material suitable to achieve a desired degree of resilience in order to fine tune the amount of "side-to-side" pivot/rocking motion and/or shock absorption properties imparted to the adjustable saddle, based on a durometer property of the material. This rocking movement allows a cyclist to perform a physiologically correct pedaling motion. As the pelvis has the freedom to move with the natural pedaling motion, discomfort or pain in the back, hips and pelvis may be reduced and pedaling may be more natural and comfortable. The rocking motion may adapt for differences in hip flexibility and skeletal geometry for a given rider. This dynamic saddle design may also compensate for discrepancies such as different leg lengths. The rocking motion may also allow for continuous change and variation in sitting positions reducing pain and discomfort. This dynamic motion may also help the spinal discs of the rider to align providing a more symmetrical load.

The rear mounting assembly 1330 may also include one or more rear attachment apertures 1396 configured to receive one or more attachment accessories, as discussed previously. In this manner, one or more rear tailpieces may be provided with various different styles of mounting assemblies for additional attachments, including but not limited to: water bottle brackets, water bottle cages, $CO_2$ cartridges, toolkits, spare parts, and the like. The rear mounting assembly 1330 may also include one or more attachment fasteners (not shown) to help couple the one or more attachment accessories to the rear mounting assembly 1330 and/or help couple the rear mounting assembly 1330 to the first upper rail 1351 and the second upper rail 1372.

Figure 16A:
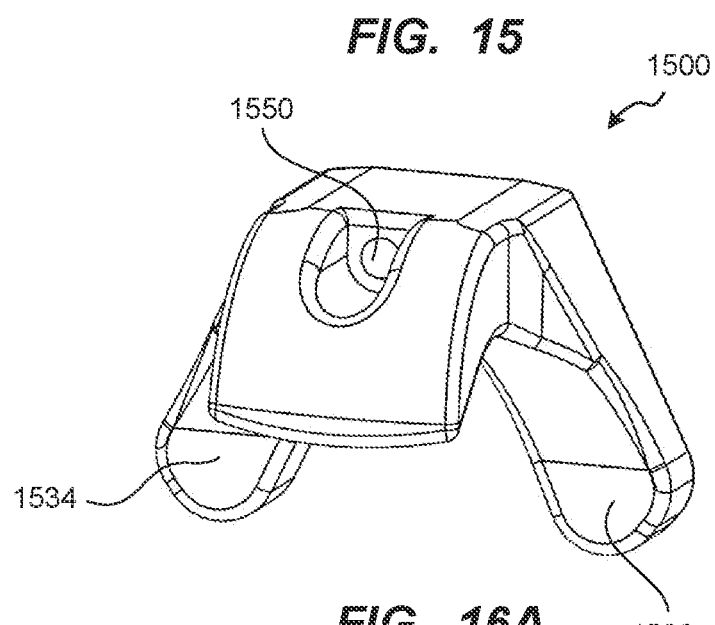
FIG. 16A illustrates an isometric front view of an example front mounting assembly that may be used with the chassis shown in FIGS. 13A-13C.
Figure 16B:
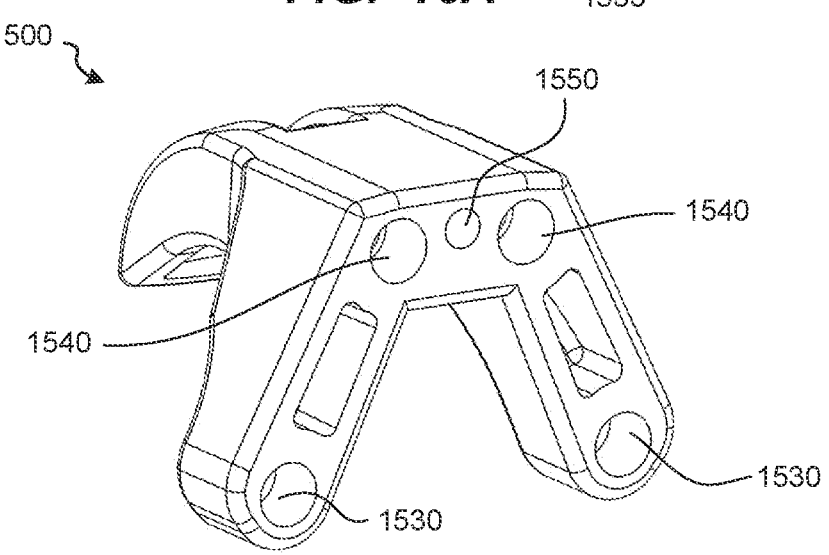
FIG. 16B illustrates an isometric rear view of the front mounting assembly shown in FIG. 16A.

FIGS. 16A and 16B illustrate isometric front and rear views of the nose piece 1500. The nose piece 1500 may be shaped to act as a transition hook to hold a bike on a rail and/or facilitate transitions between different triathlon events. As can be seen in FIGS. 12-13C, the nose piece 1500 may be attached to the front mounting assembly 1310 via a nose piece adjustment screw 1510 which may pass through an attachment aperture 1550 formed in the front mounting assembly 1310. The nose piece 1500 may also include upper rail apertures 1540 configured to receive the first and second upper rails 1351, 1372 there in, as well as a third lower rail housing 1533 and a second lower rail housing 1534 with lower rail apertures 1530 formed therein configured to receive the first and second lower rails 1360, 1380. In at least one embodiment (not shown), the third lower rail housing 1533 and the second lower rail housing 1534 may also be configured to house flexible members to further provide shock absorption characteristics to the adjustable saddle 20, isolate the adjustable saddle 20 from road vibrations, and/or provide a "side-to-side" pivot motion of the adjustable saddle 20 as the rider pedals the bicycle.

Figure 17:
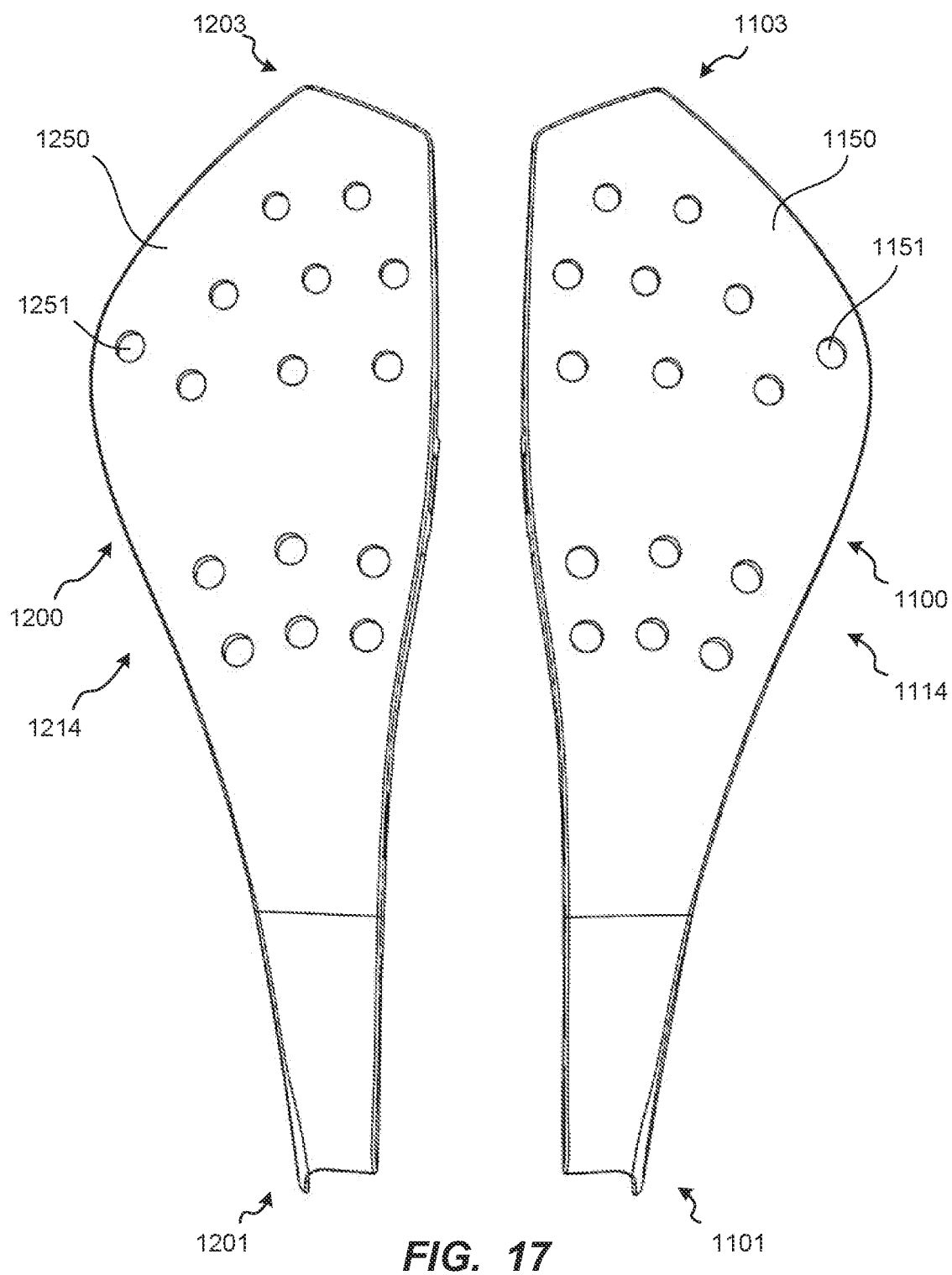
FIG. 17 illustrates a top view of the saddle half bases shown in FIG. 12.
Figure 18:
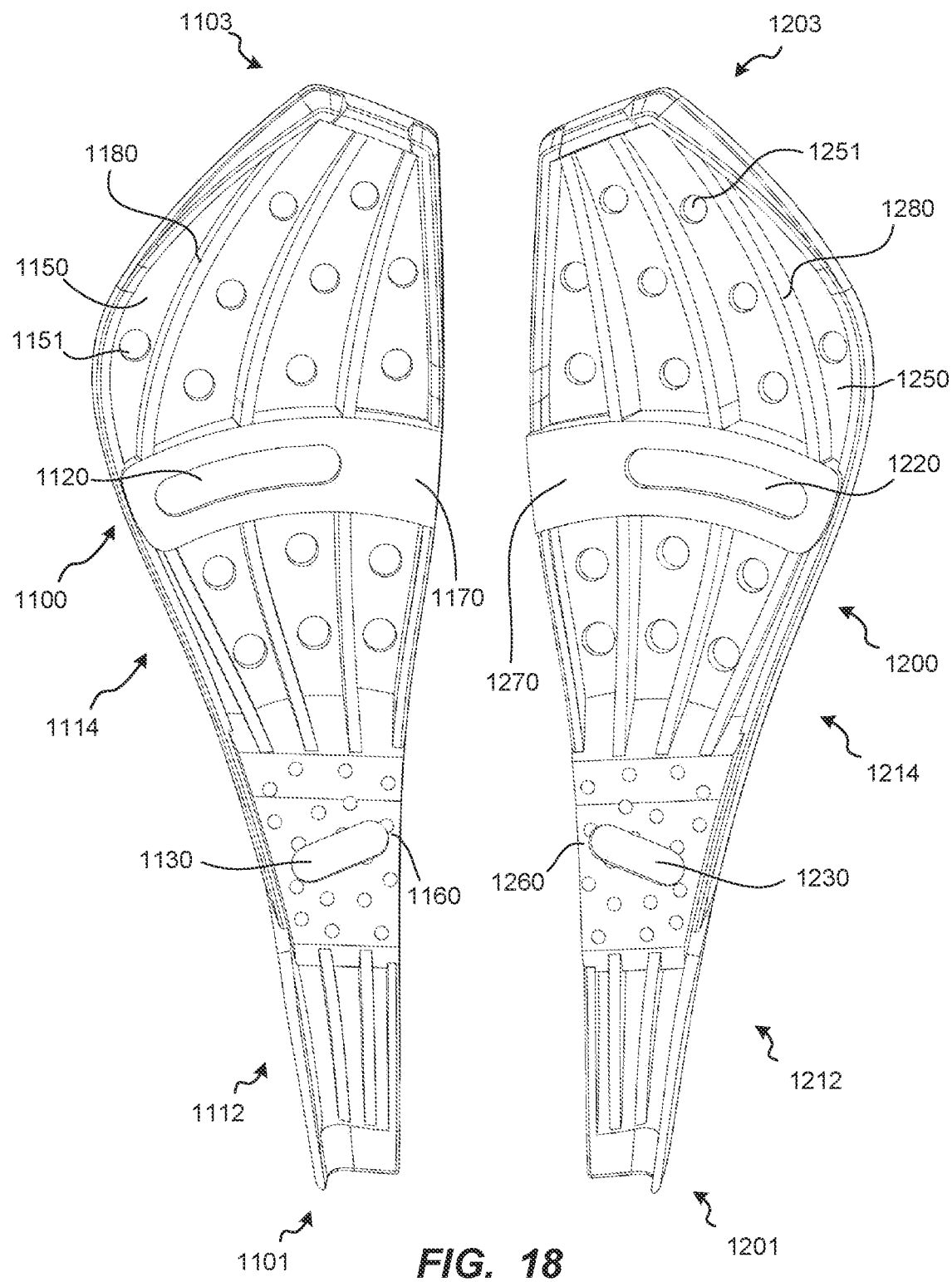
FIG. 18 illustrates a bottom view of the saddle half bases shown in FIG. 12.

FIGS. 17 and 18 show top and bottom views of the first saddle half base 1114 and the second saddle half base 1214, corresponding to each saddle half 1100, 1200, with foam padding and seat covers removed. The first and second saddle half bases 1114, 1214 may be formed of one or more rigid materials, including but not limited to: plastics, metals, carbon fiber, Zytel®, composite materials, or the like.

The first and second saddle half bases 1114, 1214 may include a first aperture 1130 and a second aperture 1230 formed in the front ends 1112, 1212 of the first and second saddle half bases 1114, 1214. In at least one embodiment, the first and second apertures 1130, 1230 may be angled slots allowing pivotal and/or translational adjustment of the front ends 1101, 1201 of the saddle halves 1100, 1200 relative to the front mounting assembly 1310. The apertures 1130, 1230 may include front retainer housings 1160, 1260 configured to retain and/or couple to suitable retainer nuts (not shown) that may be placed within the front retainer housings 1160, 1260. The retainer nuts may be configured to receive the first and second fasteners through the first and second apertures 1130, 1230 and couple to the first and second fasteners by any suitable method, such as complementary threading.

The first and second saddle half bases 1114, 1214 may further include a first arcuate adjustment channel 1120 and a second arcuate adjustment channel 1220 formed in the back ends of the first and second saddle half bases 1114, 1214. The first arcuate adjustment channel 1120 may be configured to receive the third fastener and the second arcuate adjustment channel 1220 may be configured to receive the fourth fastener. The first saddle half base 1114 may be slidably positionable relative to the third fastener positioned within the first arcuate adjustment channel 1120 to allow pivotal attachment of the back end of the first saddle half base 1114 relative to the rear mounting assembly 1330. Likewise, the second saddle half base 1214 may be slidably positionable relative to the fourth fastener positioned within the second arcuate adjustment channel 1220 to allow pivotal attachment of the back end 210 of the second saddle half base 1214 relative to the rear mounting assembly 1330. The first and second arcuate adjustment channels 1120, 1220 include rear retainer housings 1170, 1270 which may be configured to retain and/or couple to suitable retainer nuts (not shown) placed within the rear retainer housings 1170, 1270. The retainer nuts may be configured to receive the third and fourth fasteners through the first and second arcuate adjustment channels 1120, 1220 and couple to the third and fourth fasteners by any suitable method, such as complementary threading.

The first and second saddle half bases 1114, 1214 may include a plurality of longitudinal ribs 1180, 1280 that are configured to provide rigid support for the rider's weight. The first and second saddle half bases 1114, 1214 may also include a first skin 1150 and a second skin 1250 that cover the plurality of longitudinal ribs 1180, 1280. In at least one embodiment, the first and second skins 1150, 1250 may be made of a rigid material (e.g., plastic) and may be removably couplable to the plurality of longitudinal ribs 1180, 1280. For example, the first and second skins 1150, 1250 may be removably couplable to the plurality of longitudinal ribs 1180, 1280 via one or more snap features (not shown) that are configured to couple the first and second skins 1150, 1250 to the first and second saddle half bases 1114, 1214. However, in other embodiments, the first and second skins 1150, 1250 may be integrally formed with and/or coupled to the plurality of longitudinal ribs 1180, 1280. The first and second skins 1150, 1250 may also include one or more apertures 1151, 1251 formed in the surfaces of the first and second skins 1150, 1250. A first foam padding and a second padding (not shown) may also be coupled to the first and second skins 1150, 1250 respectively by any suitable means (e.g., adhesive). Moreover, the first foam padding and the second padding foam padding may be further covered by a first seat cover and a second seat cover. In this manner, the rider may easily and quickly customize his or her adjustable saddle 20 by simply removing the first and second skins 1150, 1250 with their corresponding foam paddings and seat covers and then replacing them with different first and second skins 1150, 1250 of their choice. This allows the rider to select an adjustable saddle configuration with first and second skins 1150, 1250 that can have any color, size, shape, material, etc.

Figure 19A:
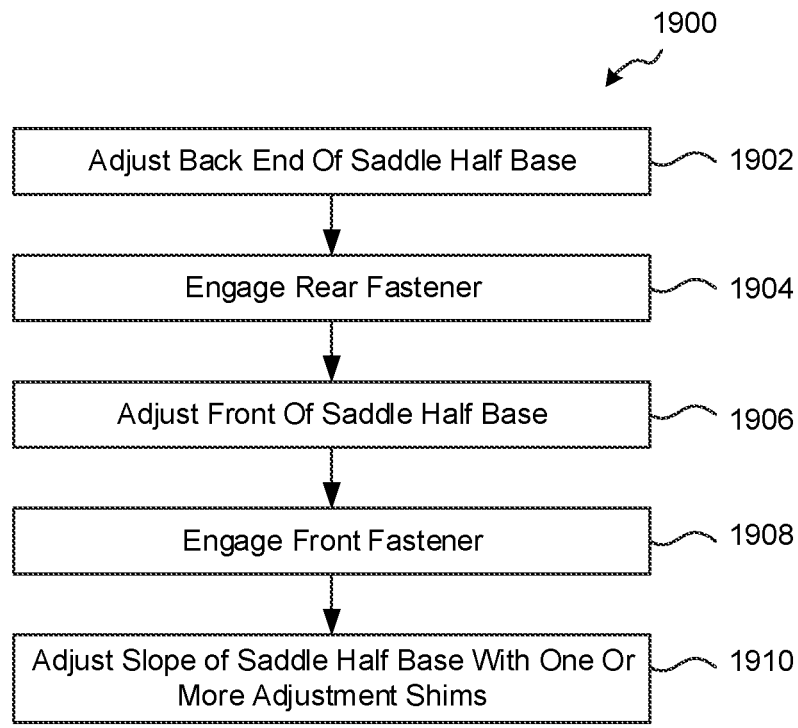
FIG. 19A is a flowchart illustrating a method of adjusting the adjustable saddles of the present disclosure.

FIG. 19A illustrates a flowchart of a method 1900 by which adjustable saddles of the present disclosure may be adjusted. The method 1900 may begin with a step 1902 in which a back end of a saddle half base may be adjusted. In this step, a back end of at least one saddle half base may be slidably, translationally, and/or pivotally positioned relative to a rear mounting assembly. The at least one saddle half base may have a back end with an arcuate adjustment channel formed therein which may be configured to receive a rear fastener. Additionally, in at least one embodiment, the rear mounting assembly may include multiple apertures configured to receive the rear fastener. In this manner, the back end of the at least one saddle half base may be attached to the rear mounting assembly at different locations along the rear mounting assembly to positionally translate the least one saddle half base relative to the rear mounting assembly.

Once the back end of the at least one saddle half base has been adjusted to a desired position, the method 1900 may proceed to a step 1904 in which the rear fastener may be engaged to prevent the back end of the at least one saddle half base from moving relative to the rear mounting assembly.

Once the back end of the at least one saddle half base has been adjusted and fastened in place, the method 1900 may proceed to a step 1906 in which a front end of the at least one saddle half base may be adjusted. In this step, the front end of the at least one saddle half base may be slidably, translationally, and/or pivotally positioned relative to a front mounting assembly. In at least one embodiment, the front mounting assembly may include at least one angled slot formed therein configured to receive a front fastener. In other embodiments, the front mounting assembly may include multiple apertures formed therein and configured to receive the front fastener and the at least one saddle half base may include at least one angled slot formed therein configured to receive the front fastener.

Once the front end of the at least one saddle half base has been adjusted to a desired position, the method 1900 may proceed to a step 1908 in which the front fastener may be engaged to prevent the front end of the at least one saddle half base from sliding relative to the front mounting assembly.

Alternatively, or in addition thereto, the method 1900 may include a step 1910 in which a height, angle, side-to side flatness, and/or front-to-back slope of the at least one saddle half base may be adjusted with one or more adjustment shims. The one or more adjustment shims may be used in conjunction with a chassis of the adjustable saddle to adjust the height, angle, side-to side flatness, and/or front-to-back slope of the at least one saddle half base. For example, at least one adjustment shim may be placed between at least one of the front and rear mounting assemblies and the at least one saddle half base to adjust the height, angle, side-to side flatness, and/or front-to-back slope of the at least one saddle half base. In this step, any number or combination of adjustment shims may be used in any desired configuration to individually adjust the height, angle, side-to side flatness, and/or front-to-back slope of the at least one saddle half base.

Figure 19B:
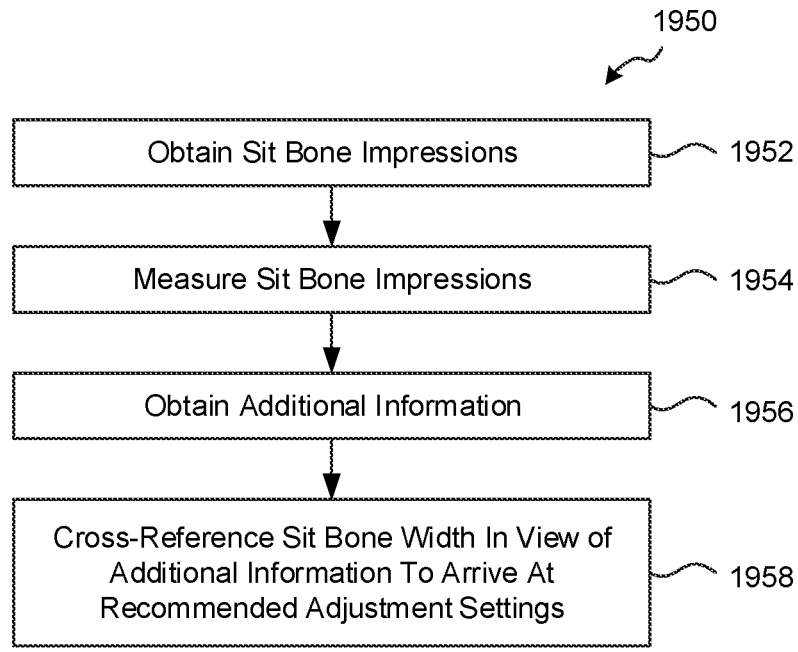
FIG. 19B is a flowchart illustrating a method of obtaining recommended adjustment settings for an individual.

FIG. 19B illustrates a flowchart of a method 1950 by which recommended adjustment settings for an individual may be obtained to facilitate an adjustment process. The method 1950 may begin with a step 1952 in which sit bone impressions may be obtained for an individual. The sit bone impressions may be obtained by seating the individual on top of a compressible material to form the sit bone impressions. In at least one embodiment, the compressible material may comprise compressible corrugated cardboard that is configured to form the sit bone impressions.

Once the sit bone impressions have been formed, the method 1950 may proceed to a step 1954 in which sit bone measurements may be obtained from the sit bone impressions. The sit bone impressions may be measured to obtain an approximate sit bone width for the individual.

Once the approximate sit bone measurements have been obtained from the sit bone impressions, the method may proceed to a step 1956 in which additional information from the individual may be obtained for use as additional input in formulating recommended adjustment settings for the individual. The additional information may include any relevant information including but not limited to: a preferred riding position of the individual (e.g., upright vs. race position, and/or every riding position in between), different bike applications (e.g., road bike, triathlon bike, mountain bike, police bike applications, etc.), a specific morphology or medical condition of the individual, a gender of the individual, and the like.

Once the additional information is obtained from the individual, the method 1950 may proceed to a step 1958 in which recommended adjustment settings may be obtained by cross-referencing the individuals approximate sit bone width, in view of the additional information obtained from the individual, to arrive at recommended adjustment settings for the individual.

Any methods disclosed herein may comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Figures 20A, 20B:
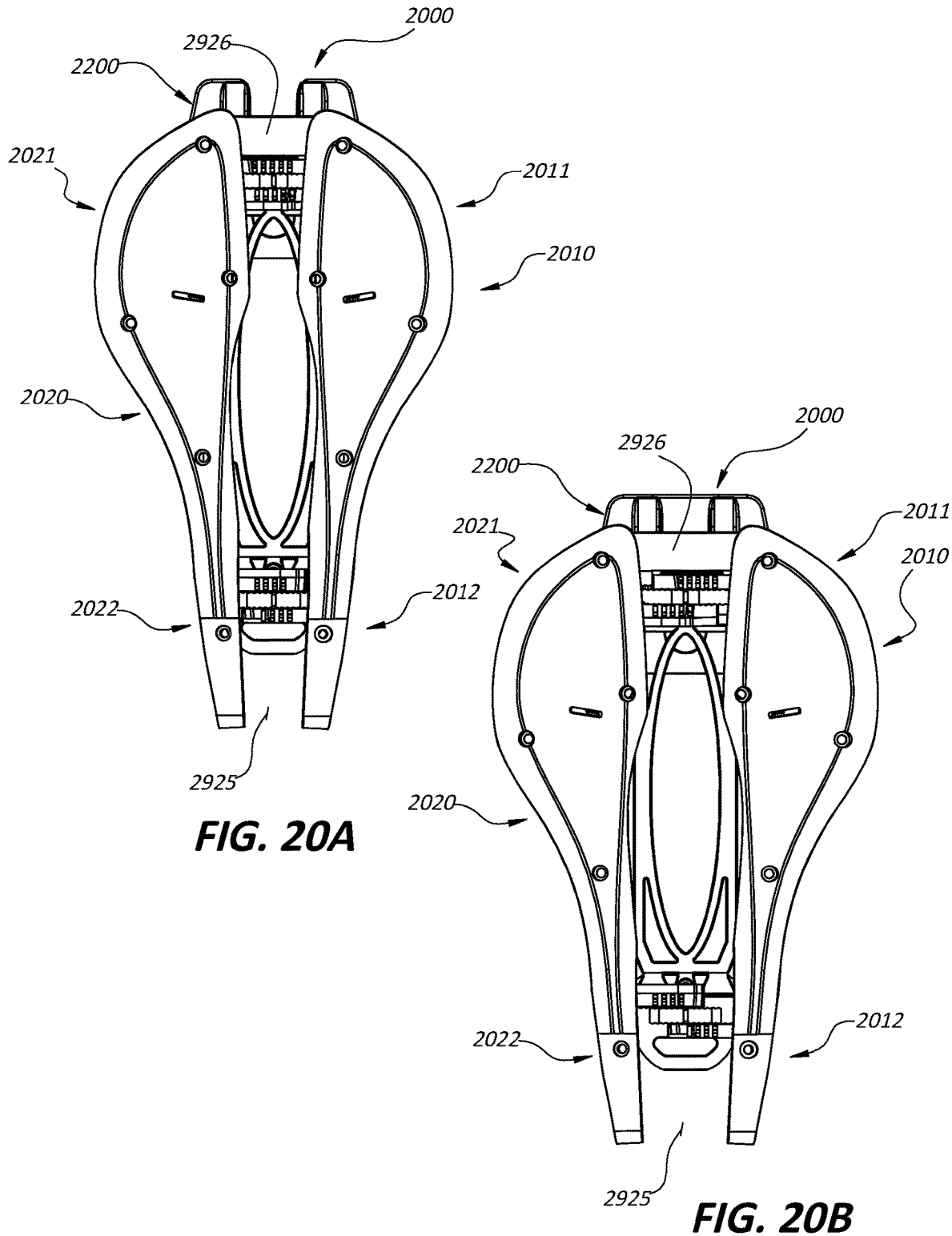
FIG. 20A is a top view of an adjustable saddle including a chassis and two saddle half bases, according to another embodiment of the present disclosure.
FIG. 20B is a top view of the adjustable saddle shown in FIG. 20A in an additional adjustment configuration.

FIGS. 20A and 20B illustrate various top views of the adjustable saddle 2000 in different exemplary adjustment configurations according to another embodiment. The adjustable saddle 2000 may include a first saddle half 2010, a second saddle half 2020, and a mounting frame 2200. The first saddle half 2010 may include a front section 2012 and a back section 2011. Additionally, the second saddle half 2020 may include a front section 2022 and back section 2021. The first saddle half 2010 and the second saddle half 2020 may be independently attachable to the mounting frame 2200. FIG. 20A shows the adjustable saddle 2000 with the spacing 2926 between the back section 2011 of the first saddle half 2010 and the back section 2021 of the second saddle half 2020 and the spacing 2925 between the front section 2012 of the first saddle half 2010 and the front section 2022 of the second saddle half 2020. FIG. 20B shows the adjustable saddle 2000 in an alternate configuration. In this configuration, the spacing 2926 between back section 2011 of the first saddle half 2010 and the back section 2021 of the second saddle half 2020 and the spacing 2925 between the front section 2012 of the first saddle half 2010 and the front section 2022 of the second saddle half 2020 may be adjusted far apart from each other. The non-limiting exemplary adjustment configurations shown in FIGS. 20A-20B are for illustration purposes only and it will be understood that the back section 2011 of the first saddle half 2010 and the back section 2021 of the second saddle half 2020 may assume an infinite number of different positions throughout their adjustment range, and likewise the front section 2012 of the first saddle half 2010 and the front section 2022 of the second saddle half 2020 may also assume an infinite number of positions throughout their adjustment range. It will also be understood that the size and shape of any of the components of the mounting frame 2200, the first saddle half 2010, and the second saddle half 2020 may be varied to achieve any spacing 2926 between the back section 2011 of the first saddle half 2010 and the back section 2021 of the second saddle half 2020 and the spacing 2925 between the front section 2012 of the first saddle half 2010 and the front section 2022 of the second saddle half 2020. For example, the size and shape of the mounting frame 2200 components and/or first saddle half 2010 and/or second saddle half 2020 components may be varied to achieve spacing 2925 and/or spacing 2926 between first saddle half 2010 and/or second saddle half 2020, including but not limited to a spacing range of: 0-10 cm, 0-15 cm, 0-30 cm, 5-15 cm, 10-20 cm, 15-30 cm, etc.

Figure 21A:
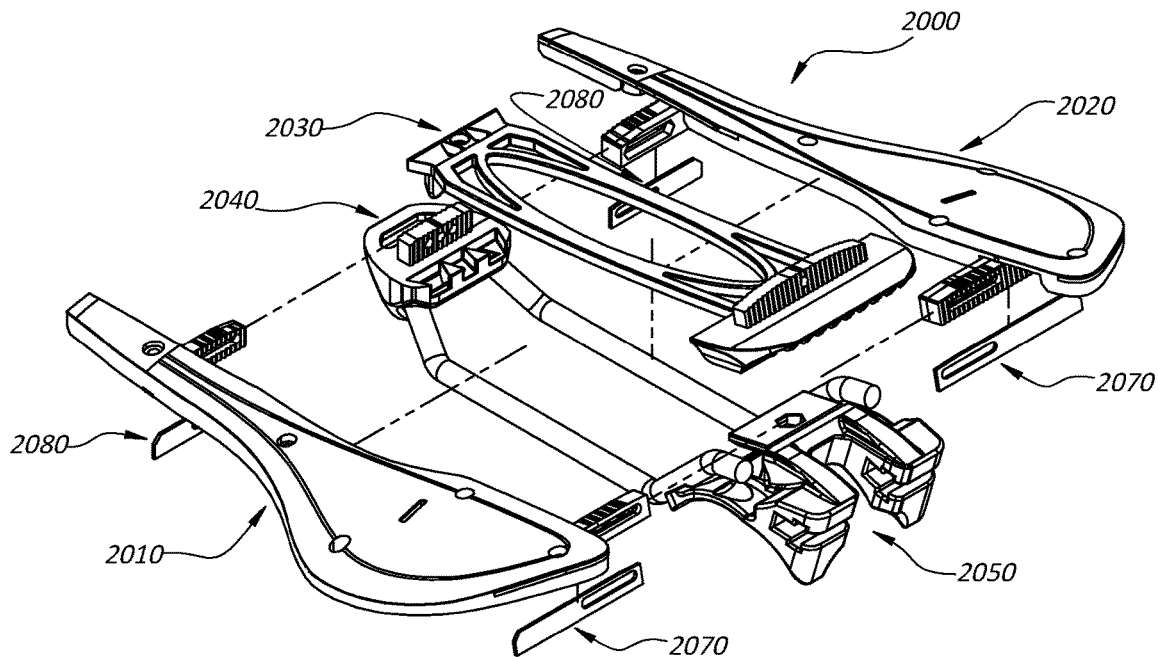
FIG. 21A is an exploded isometric view of the adjustable saddle shown in FIG. 20A.
Figure 21B:
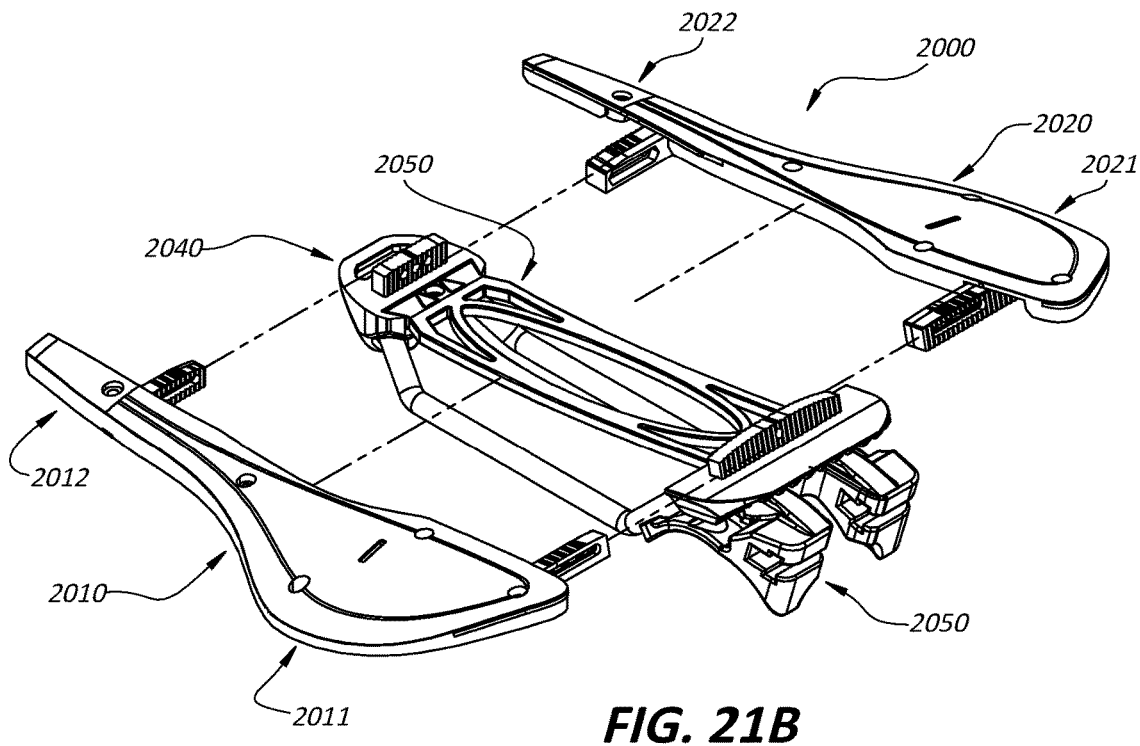
FIG. 21B is a partial exploded isometric view of the adjustable saddle shown in FIG. 20A.

FIG. 21A-21B illustrate an exploded view of the adjustable saddle 2000. In at least one embodiment, the mounting frame 2200 may include a front mounting assembly 2040 and a rear mounting assembly, a rear mounting assembly 2030, a rear mounting assembly 2050 and a rail portion 2060. Additionally, the first saddle half 2010 and second saddle half 2020 may be configured to include front flat washer 2080 which may facilitate securing the connections between the front section 2012 of the first saddle half 2010 and the front section 2022 of the second saddle half 2020 with the front mounting assembly 2040 and rear flat washer 2070 which may facilitate securing the connections between the back section 2011 of the first saddle half 2010 and the back section 2021 of the second saddle half 2020 with the rear mounting assembly 2030.

Figure 22A:
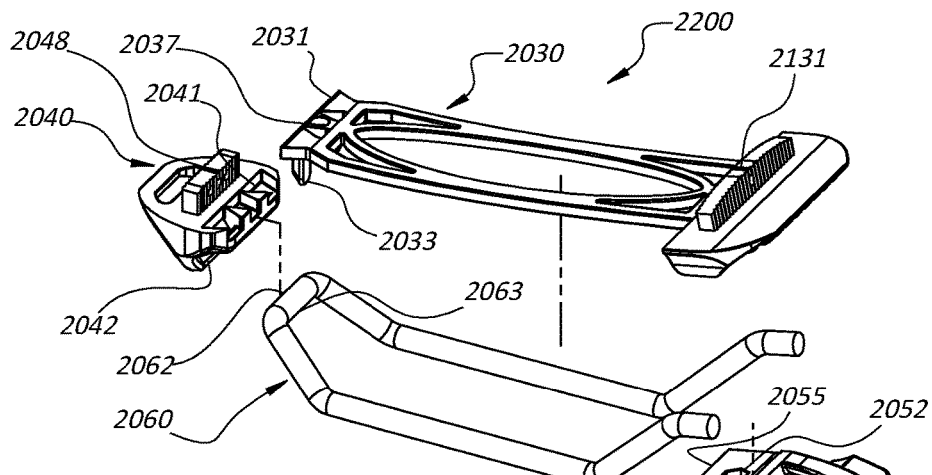
FIG. 22A is an exploded isometric view of the chassis shown in FIG. 21B.
Figure 22B:
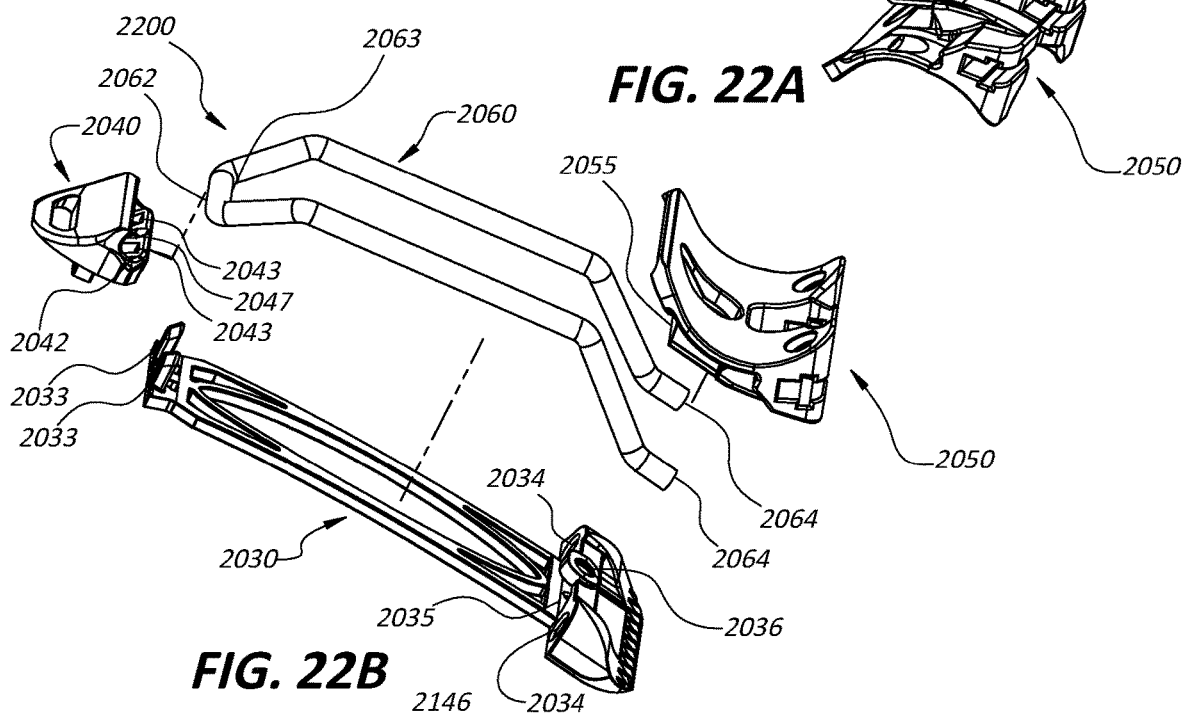
FIG. 22B is an exploded bottom isometric view of the chassis shown in FIG. 21B.

FIG. 22A-22B illustrate an exploded view of the of the mounting frame 2200 of adjustable saddle 2000 according to at least one embodiment. The front mounting assembly 2040 may include a slot 2042 to receive a front rail end 2062 of the rail portion 2060. After the front rail end 2062 is seated in the slot 2042, an interlocking feature 2031 of the rear mounting assembly 2030 may be engaged with a mating interlocking feature 2041 of the front mounting assembly 2040. In one embodiment, the interlocking feature 2041 may be designed to prevent forward-backward; side-to-side; or angular motion of the rear mounting assembly 2030 relative to the front mounting assembly 2040. After interlocking engagement between the front mounting assembly 2040 and the rear mounting assembly 2030, the tangs 2033 of the rear mounting assembly 2030 may be designed to engaged mating apertures 2043 in the front mounting assembly 2040 to prevent the rail portion 2060 from disengaging from the front mounting assembly 2040 by retaining the front rail end 2062 within the slot 2042. The rear mounting assembly may further include an aperture 2037 designed to facilitate engagement of a fastener (not shown) to secure the rear mounting assembly 2030 to the front mounting assembly 2040.

Figure 22C:
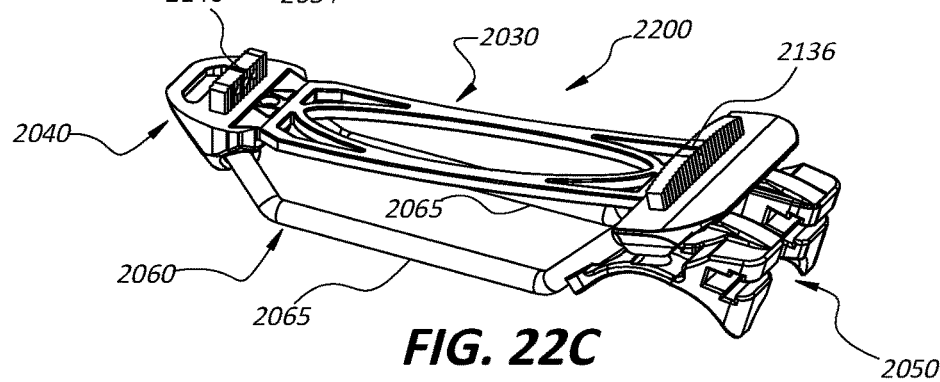
FIG. 22c is an isometric view of the chassis shown in FIG. 21B.

The rear mounting assembly 2030 may further include apertures 2034 to receive the rear rail ends 2064 of the rail portion 2060. The rear mounting assembly 2030 may further include an aperture 2035 configured to receive a tang 2055 of the rear mounting assembly 2050. The tang 2055 and the rear mounting assembly 2050 may be designed such that when the tang 2055 is fully engaged with the aperture 2035 of the rear mounting assembly 2030, the rail portion 2060 is secured to the rear mounting assembly 2030 and any relative motion between the rail portion 2060 and the rear mounting assembly 2030 is minimized. Additionally, the rear mounting assembly 2050 may include an aperture 2052 designed to facilitate engagement of a fastener (not shown) through the aperture 2052 into an aperture 2036 in the rear mounting assembly 2030 to secure the rear mounting assembly 2050 to the rear mounting assembly 2030. FIG. 22C shows an assembled mounting frame 2200 according to at least one embodiment.

Figure 23A:
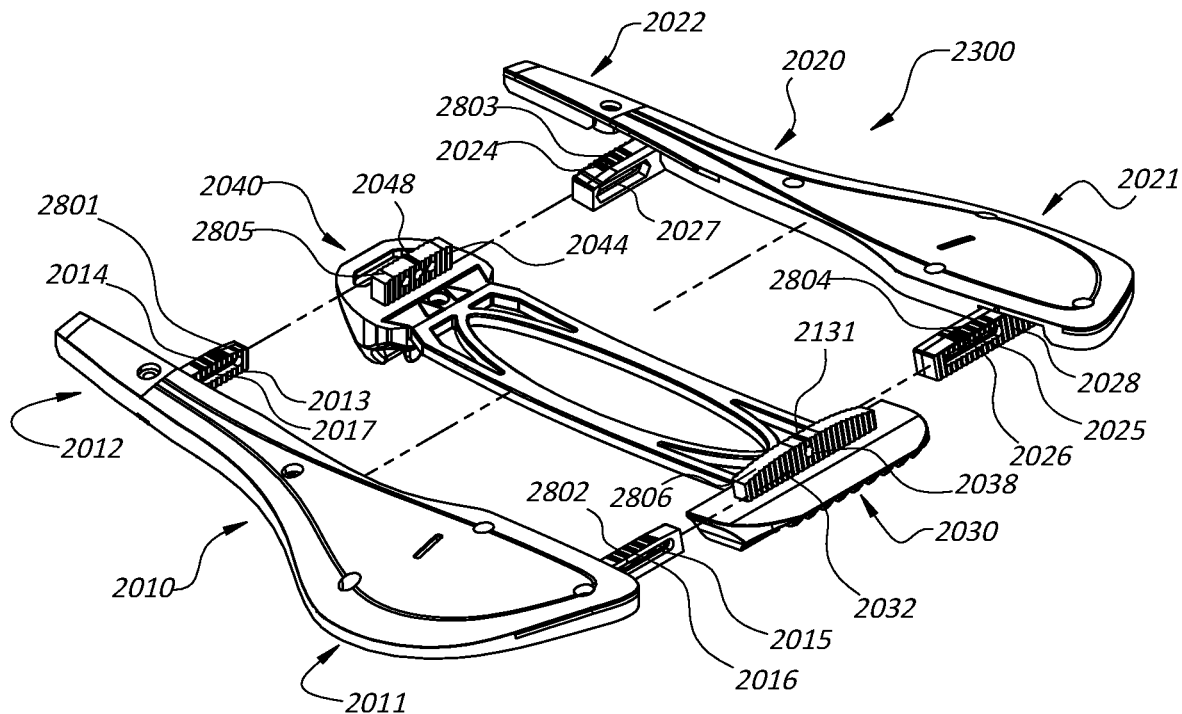
FIG. 23A is an exploded isometric view of the mounting frame assembly and two saddle half bases of the adjustable saddle shown in FIG. 20A.
Figure 23B:
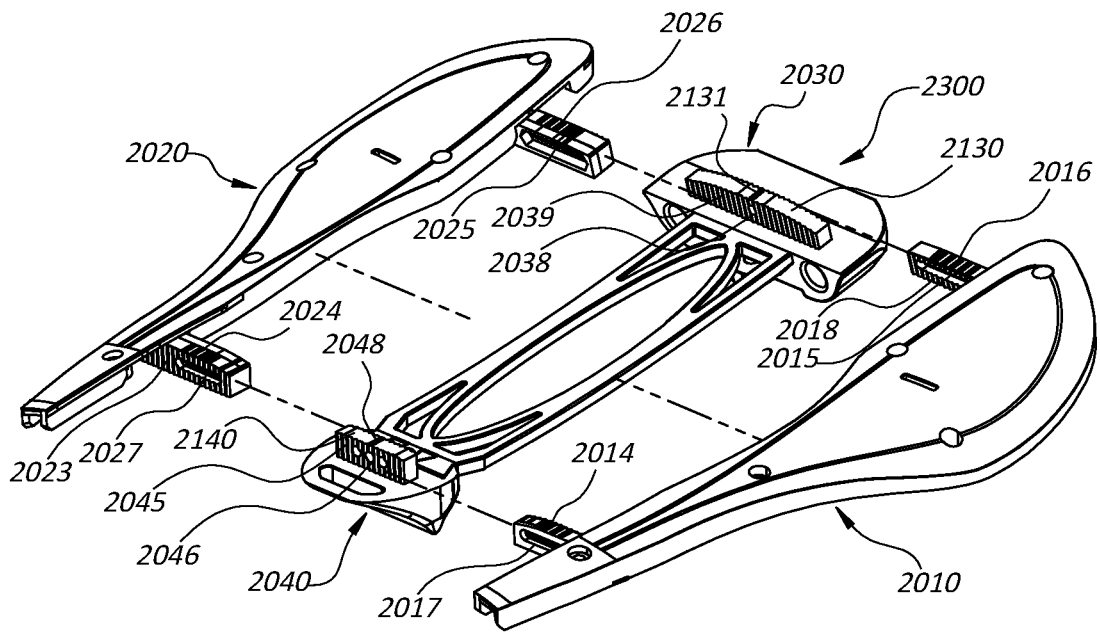
FIG. 23B is a second exploded isometric view of the mounting frame assembly and two saddle half bases of the adjustable saddle shown in FIG. 20A.

FIG. 23A-23B illustrate an exploded isometric view of the of the saddle mounting assembly 2300 of adjustable saddle 2000 according to at least one embodiment. The first saddle half 2010 may include a front section 2012 with a first attachment feature 2801 configured to be slidably adjustably coupled to the front mounting assembly 2040 and the front mounting assembly attachment feature 2805. The first saddle half 2010 may further include a back section 2011 with a second attachment feature 2802 configured to be slidably adjustably coupled to the rear mounting assembly 2030 and the rear mounting assembly attachment feature 2806. The second saddle half 2020 may include a second front section 2022 with a third attachment feature 2803 configured to be slidably adjustably coupled to the front mounting assembly 2040 and the front mounting assembly attachment feature 2805. The second saddle half 2020 may further include a second back end 2022 with a fourth attachment feature 2804 configured to be slidably adjustably coupled to the rear mounting assembly 2030 and the rear mounting assembly attachment feature 2806.

The first attachment feature 2801 may include a first locking interface 2013 designed to engagedly couple to a mating fifth locking interface 2045 of the front mounting assembly attachment feature 2805. The first attachment feature 2801 may further include an aperture 2017 to facilitate a fastener (not shown) to pass through and adjustment markings 2014.

The second attachment feature 2802 may include a second locking interface 2018 designed to engagedly couple to a mating sixth locking interface 2032 of the rear mounting assembly attachment feature 2806. The second attachment feature 2802 may further include an aperture 2015 to facilitate a fastener (not shown) to pass through and adjustment markings 2016.

The third attachment feature 2803 may include a third locking interface 2023 designed to engagedly couple to a mating seventh locking interface 2044 of the front mounting assembly attachment feature 2805. The third attachment feature 2803 may further include an aperture 2027 to facilitate a fastener (not shown) to pass through and adjustment markings 2024.

The fourth attachment feature 2804 may include a fourth locking interface 2028 designed to engagedly couple to a mating eighth locking interface 2039 of the rear mounting assembly attachment feature 2806. The fourth attachment feature 2804 may further include an aperture 2025 to facilitate a fastener (not shown) to pass through and adjustment marks 2026.

Each of the first locking interface 2013, the second locking interface 2018, the third locking interface 2023, the fourth locking interface 2028, the fifth locking interface 2045, the sixth locking interface 2032, the seventh locking interface 2044 and the eighth locking interface 2039 may comprise a plurality of ridges, as shown, or any other locking interfaces known in the art that can lock at different translational relative positions. The ridges may comprise an interlocking profile that may be generally square, rectangular, rounded, triangular or trapezoidal. The locking interfaces may be roughened surfaces, post/hole combinations, mating contours, etc. The locking interfaces may be designed so that the surfaces intermesh and prevent translation of the attachment features when in the intermeshed, locked position and allow translation when not intermeshed. A fastener may be engaged to maintain the locking interfaces in an intermeshed, locked position. Additionally, a fastener may be loosened to allow the attachment feature to slidably translate to a alternate intermeshed position. A fastener may then be re-engaged to maintain the locking interfaces in an alternate intermeshed, locked position.

The front mounting assembly attachment feature 2805 may include one or more apertures 2046. The apertures 2046, 2027 and 2017 may be designed to allow a first fastener (not shown) to pass through apertures 2046, 2027 and 2017 and be releasably securable to the first attachment feature 2801 and the third attachment feature 2803 relative to the front mounting assembly attachment feature 2805. Further the apertures 2027 and 2017 may be elongated to allow the first attachment feature 2801 and the third attachment feature 2803 respectively to be releasably securable while a first fastener (not shown) is in place through the apertures 2046, 2027 and 2017.

The rear mounting assembly attachment feature 2806 may include one or more apertures 2038. The apertures 2038, 2025 and 2015 may be designed to allow a second fastener (not shown) to pass through apertures 2038, 2025 and 2015 and be releasably securable to the second attachment feature 2802 and the fourth attachment feature 2804 relative to the rear mounting assembly attachment feature 2806. Further the apertures 2025 and 2015 may be elongated to allow the second attachment feature 2802 and the fourth attachment feature 2804 respectively to be releasably securable while a second fastener (not shown) is in place through the apertures 2038, 2025 and 2015.

In another embodiment, the apertures 2046 may be designed to allow a first fastener (not shown) to pass through aperture 2017 into aperture 2046 and be releasably securable to the first attachment feature 2801 relative to the front mounting assembly attachment feature 2805 and a second fastener (not shown) to pass through aperture 2027 into aperture 2046 and be releasably securable to the third attachment feature 2803 relative to the front mounting assembly attachment feature 2805. In this embodiment, the first attachment feature 2801 and the third attachment feature 2803 may be positioned and be releasably securable to the front mounting assembly attachment feature 2805 independently of each other. Additionally, the apertures 2038 may be designed to allow a third fastener (not shown) to pass through aperture 2015 into aperture 2038 and be releasably securable to the second attachment feature 2802 relative to the rear mounting assembly attachment feature 2806 and a fourth fastener (not shown) to pass through aperture 2025 into aperture 2038 and be releasably securable to the fourth attachment feature 2804 relative to the rear mounting assembly attachment feature 2806. In this embodiment, the second attachment feature 2802 and the fourth attachment feature 2804 may be releasably securable to the rear mounting assembly attachment feature 2806 independently of each other.

The front mounting assembly attachment feature 2805 may include an adjustment mark 2048 and the rear mounting assembly attachment feature 2806 may include an adjustment mark 2131. The adjustment markings 2014 on the first attachment feature 2801 may be used in conjunction with the adjustment mark 2048 to position the front section 2012. The adjustment markings 2016 on the second attachment feature 2802 may be used in conjunction with the adjustment mark 2131 to position the back section 2011. The adjustment markings 2024 on the third attachment feature 2803 may be used in conjunction with the adjustment mark 2048 to position the front section 2022. The adjustment marks 2026 on the fourth attachment feature 2804 may be used in conjunction with the adjustment mark 2131 to position the back section 2021.

Figure 24:
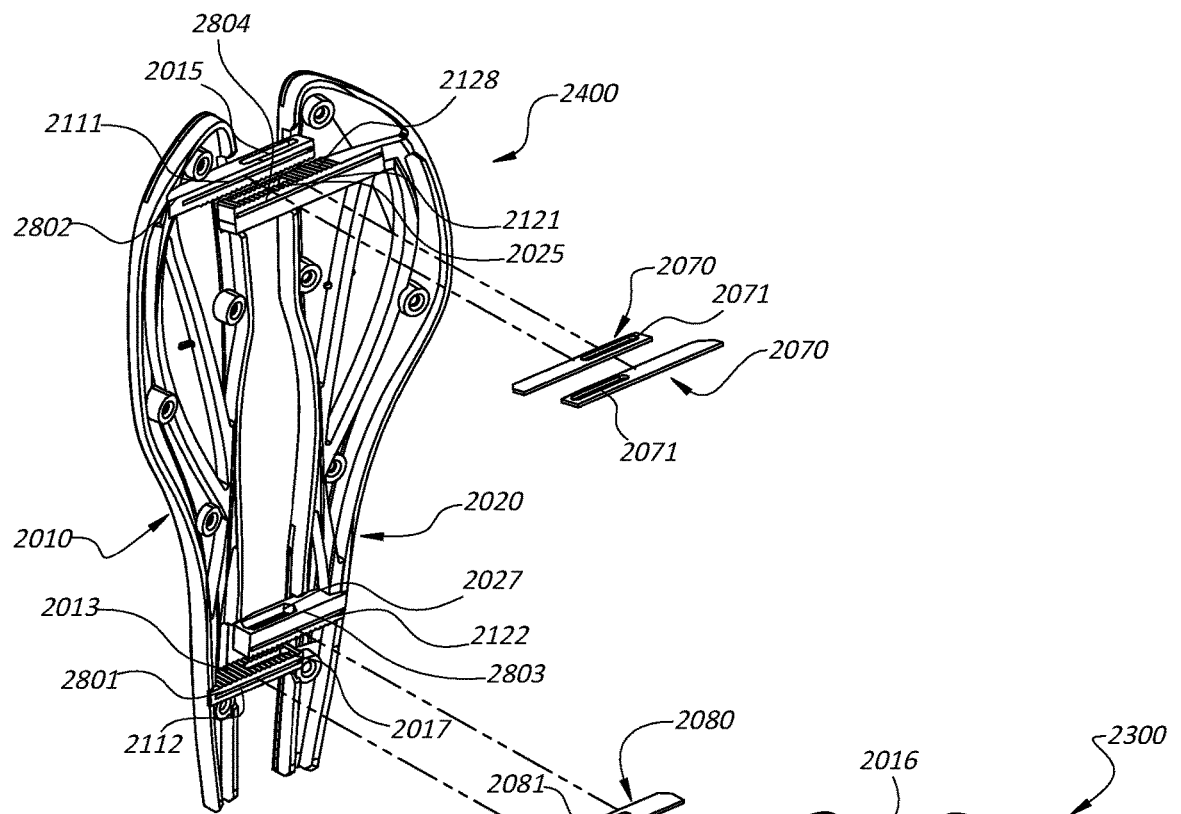
FIG. 24A is an exploded isometric view of the two saddle half bases and spacers of the adjustable saddle shown in FIG. 20A.

FIG. 24 is an exploded isometric view of a saddle subassembly 2400 of adjustable saddle 2000 according to at least one embodiment. A first saddle half 2010 may include a first attachment feature 2801 which may include a slot 2112 configured to receive a flat washer 2080 and may further include a second attachment feature 2802 which may include a slot 2111 configured to receive a flat washer 2070. Additionally, a second saddle half 2020 may include a third attachment feature 2803 which may include a slot 2122 configured to receive a flat washer 2080 and may further include a fourth attachment feature 2804 which may include a slot 2121 configured to receive a flat washer 2070. In at least one embodiment, the flat washer 2080 may include an aperture 2081 which may be configured to align with an aperture 2013 in a first attachment feature 2801 and an aperture 2015 in a second attachment feature 2802. Additionally, the flat washer 2070 may include an aperture 2071 which may be configured to align with an aperture 2027 in a third attachment feature 2803 and an aperture 2025 in a fourth attachment feature 2804.

Figure 25:
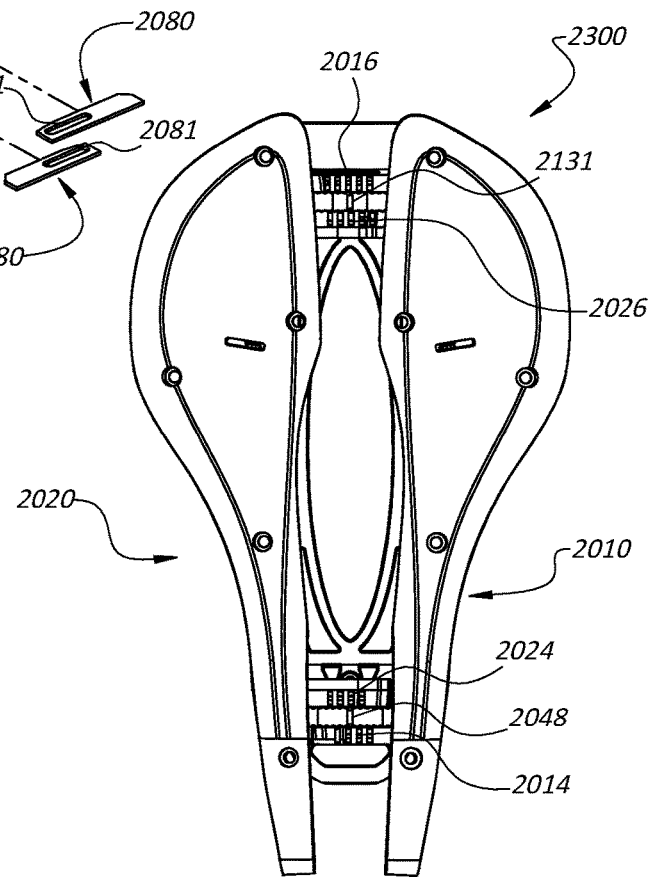
FIG. 25 is a top view of the mounting frame and two saddle half bases of the adjustable saddle shown in FIG. 23A.

FIG. 25 illustrates a top view of the of the saddle mounting assembly 2300 of adjustable saddle 2000 according to at least one embodiment. The slot 2112 in the first attachment feature 2801 and the slot 2122 in the third attachment feature 2803 may be configured such that the flat washer 2080 is visible from the top view after assembly. Further, the slot 2111 in the second attachment feature 2802; and the slot 2121 in the fourth attachment feature 2804 may be configured such that the flat washer 2070 is visible from the top view after assembly. The flat washer 2080 may be of a contrasting color to the first attachment feature 2801 and third attachment feature 2803 so that the flat washer 2080 provides better visualization of the adjustment marks 2014, 2024. Additionally, the flat washer 2070 may be of a contrasting color to the second attachment feature 2802 and fourth attachment feature 2804 so that the flat washer 2070 provides better visualization of the adjustment marks 2016, 2026.

Figure 26A:
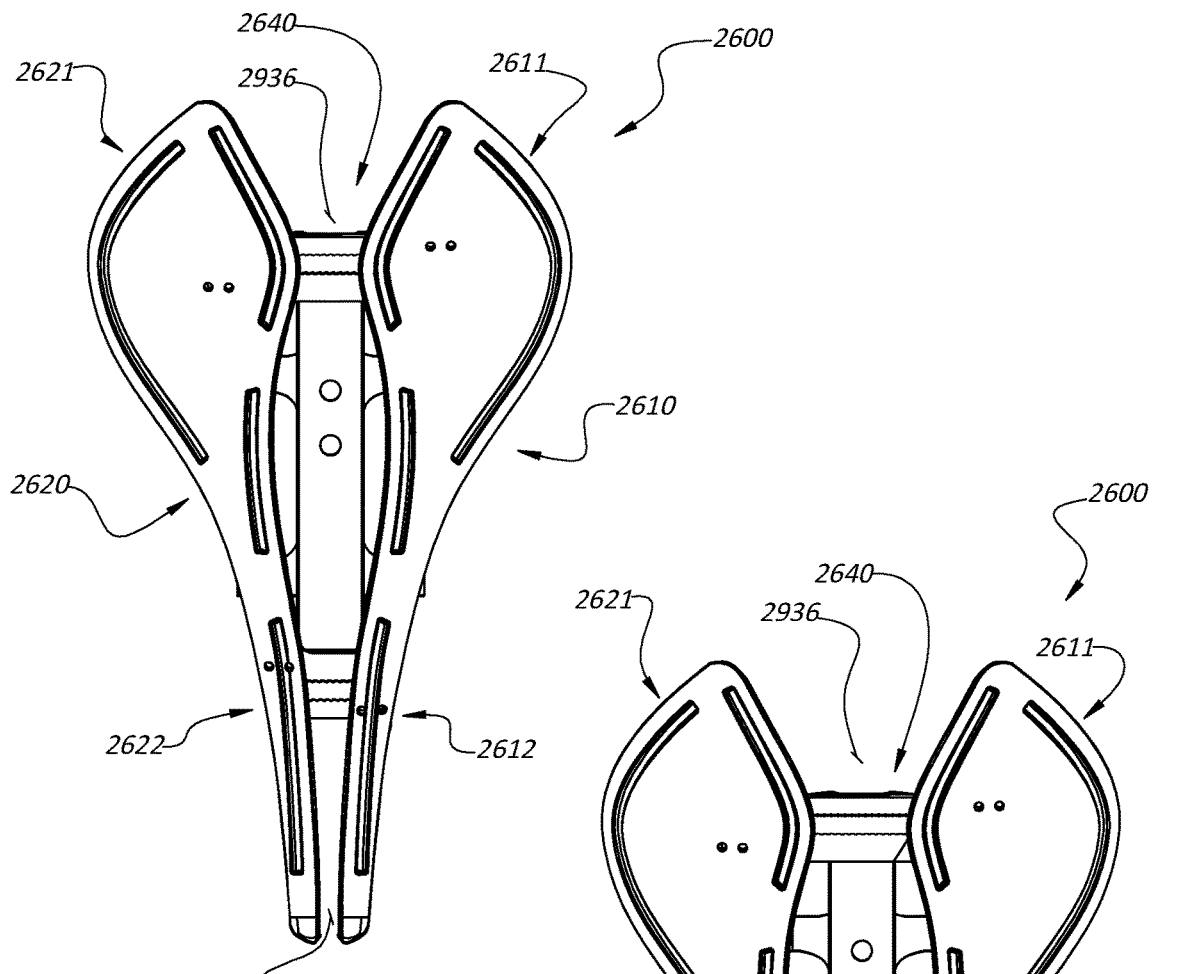
FIG. 26A is a top view of an adjustable saddle including a chassis and two saddle half bases, according to another embodiment of the present disclosure.
Figure 26B:
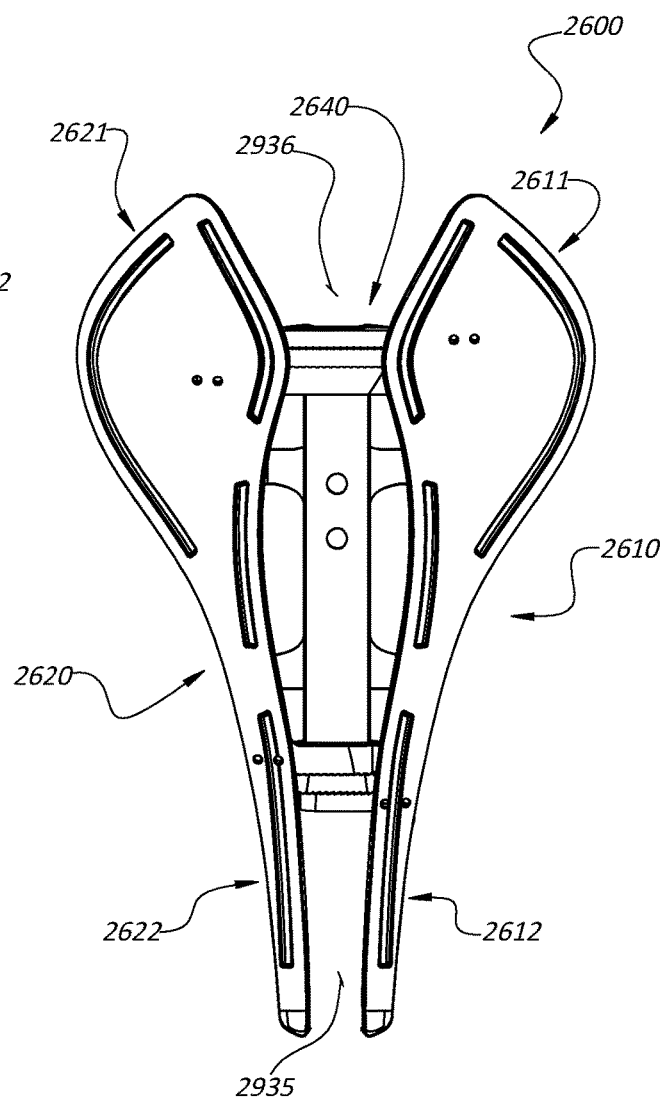
FIG. 26B is a top view of the adjustable saddle shown in FIG. 26A in an additional adjustment configuration.

FIGS. 26A and 26B illustrate various top views of the adjustable saddle 2600 in different exemplary adjustment configurations according to another embodiment. The adjustable saddle 2600 may include a first saddle half 2610, a second saddle half 2620, and a saddle mounting frame assembly 2640. The first saddle half 2610 may include a front section 2612 and a back section 2611. Additionally, the second saddle half 2620 may include a front section 2622 and back section 2621. First saddle half 2610 and second saddle half 2620 may be independently attachable to the saddle mounting frame assembly 2640. FIG. 26A shows the adjustable saddle 2600 with the spacing 2936 between the back section 2611 of the first saddle half 2610 and the back section 2621 of the second saddle half 2620 and the spacing 2935 between the front section 2612 of the first saddle half 2610 and the front section 2622 of the second saddle half 2620. FIG. 26B shows the adjustable saddle 2600 in an alternate configuration. In this configuration, the spacing 2936 between the back section 2611 of the first saddle half 2610 and the back section 2621 of the second saddle half 2620 and the spacing 2935 between the front section 2612 of the first saddle half 2610 and the front section 2622 of the second saddle half 2620 may be adjusted far apart from each other. The non-limiting exemplary adjustment configurations shown in FIGS. 26A-26B are for illustration purposes only and it will be understood that the back section 2611 of the first saddle half 2610 and the back section 2621 of the second saddle half 2620 can assume an infinite number of different positions throughout their adjustment range, and likewise the front section 2612 of the first saddle half 2610 and the front section 2622 of the second saddle half 2620 can also assume an infinite number of positions throughout their adjustment range. It will also be understood that the size and shape of any of the components of the saddle mounting frame assembly 2640 and the first saddle half 2610 and second saddle half 2620 may be varied to achieve any spacing 2935, 2936 between first saddle half 2610 and second saddle half 2620. For example, the size and shape of the saddle mounting frame assembly 2640 components and/or first saddle half 2610 and/or second saddle half 2620 components may be varied to achieve spacing 2935, 2936 between first saddle half 2610 and second saddle half 2620, including but not limited to a spacing range of: 0-10 cm, 0-15 cm, 0-30 cm, 5-15 cm, 10-20 cm, 15-30 cm, etc.

Figure 27A:
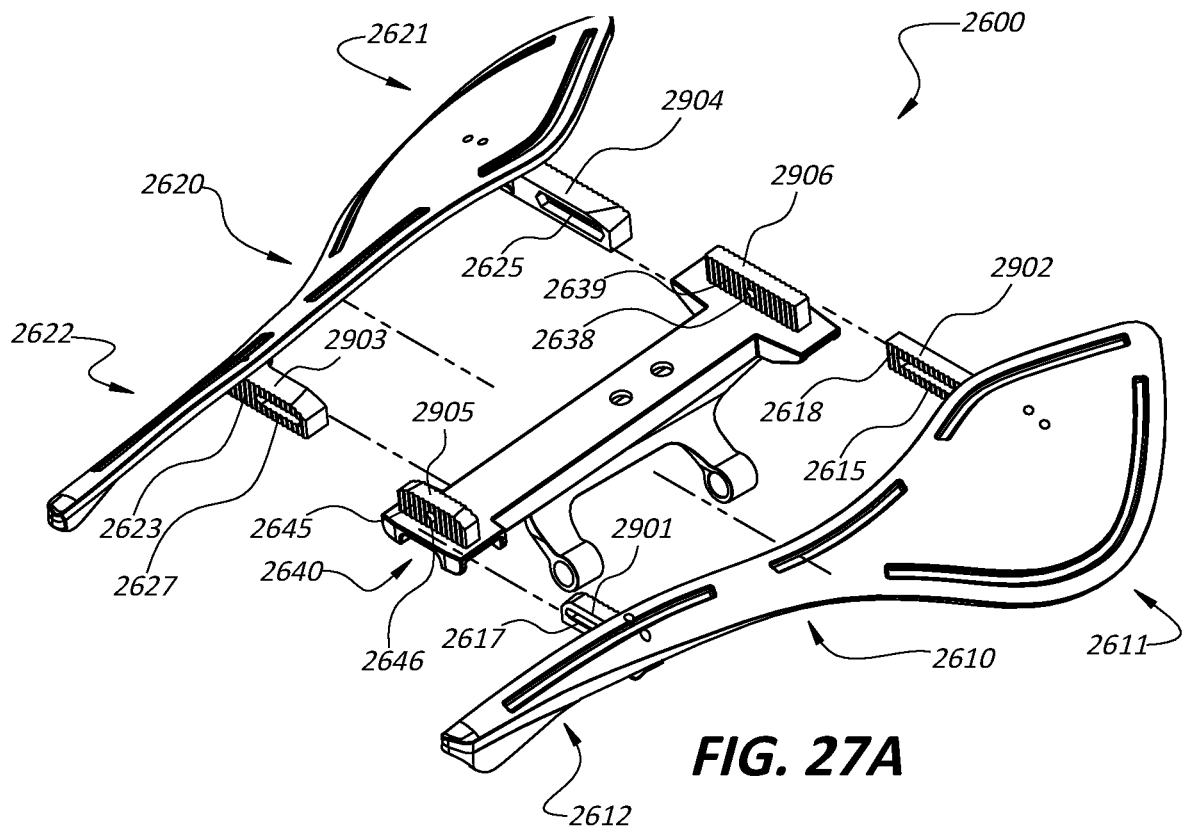
FIG. 27A is a partial exploded isometric view of the adjustable saddle shown in FIG. 26A.
Figure 27B:
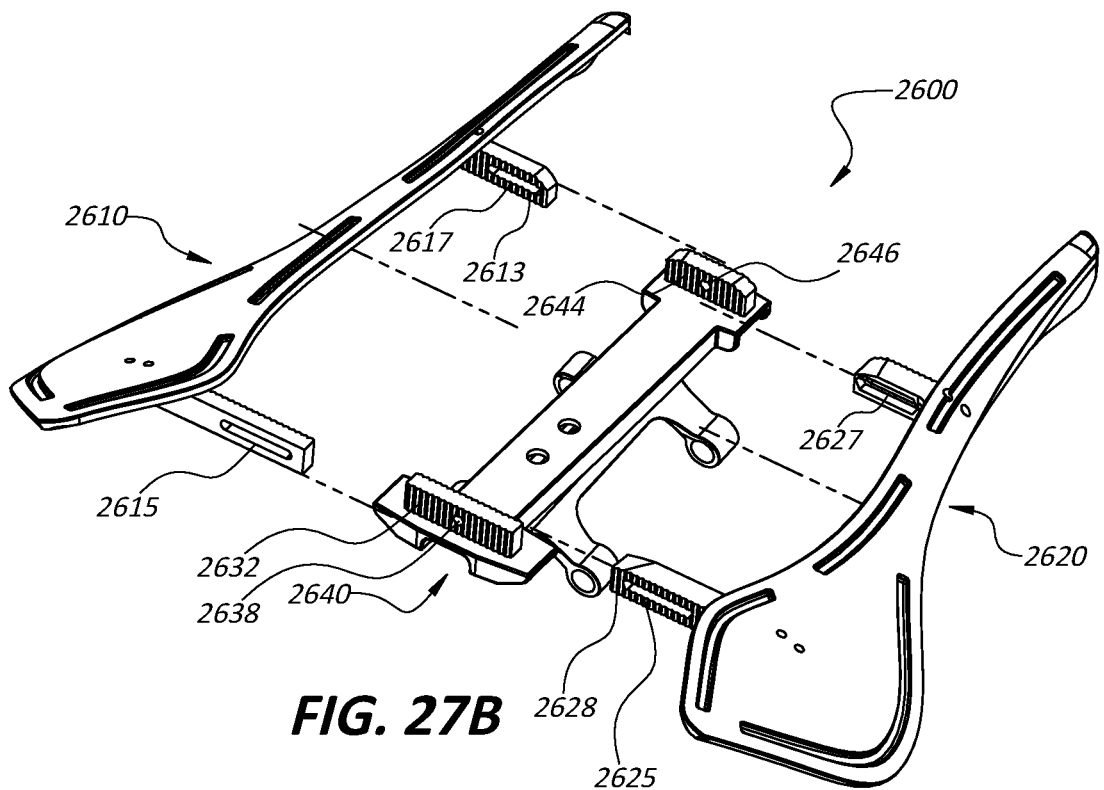
FIG. 27B is a second partial exploded isometric view of the adjustable saddle shown in FIG. 26A.

FIG. 27A-27B illustrate an exploded isometric view of the of adjustable saddle 2600 according to at least one embodiment. The first saddle half 2610 may include a front section 2612 with a first attachment feature 2901 configured to be releasably securable to the saddle mounting frame assembly 2640 and the front mounting assembly attachment feature 2905. The first saddle half 2610 may further include a back section 2611 with a second attachment feature 2902 configured to be releasably securable to the saddle mounting frame assembly 2640 and the rear mounting assembly attachment feature 2906. The second saddle half 2620 may include a front section 2622 with a third attachment feature 2903 configured to be releasably securable to the saddle mounting frame assembly 2640 and the front mounting assembly attachment feature 2905. The second saddle half 2620 may further include a back section 2621 with a fourth attachment feature 2904 configured to be releasably securable to the saddle mounting frame assembly 2640 and the rear mounting assembly attachment feature 2906.

The first attachment feature 2901 may include a first locking interface 2613 designed to be releasably securable to a mating fifth locking interface 2645 of the front mounting assembly attachment feature 2905. The first attachment feature 2901 may further include an aperture 2617 to facilitate a fastener (not shown) to pass through.

The second attachment feature 2902 may include a second locking interface 2618 designed to be releasably securable to a mating sixth locking interface 2632 of the rear mounting assembly attachment feature 2906. The second attachment feature 2902 may further include an aperture 2615 to facilitate a fastener (not shown) to pass through.

The third attachment feature 2903 may include a third locking interface 2623 designed to be releasably securable to a mating seventh locking interface 2644 of the front mounting assembly attachment feature 2905. The third attachment feature 2903 may further include an aperture 2627 to facilitate a fastener (not shown) to pass through.

The fourth attachment feature 2904 may include a fourth locking interface 2628 designed to be releasably securable to a mating eighth locking interface 2639 of the rear mounting assembly attachment feature 2906. The fourth attachment feature 2904 may further include an aperture 2625 to facilitate a fastener (not shown) to pass through.

The front mounting assembly attachment feature 2905 may include one or more apertures 2646. The apertures 2646, 2627 and 2617 may be designed to allow a first fastener (not shown) to pass through apertures 2646, 2627 and 2617 to releasably secure the positions of the first attachment feature 2901 and the third attachment feature 2903 relative to the front mounting assembly attachment feature 2905. Further the apertures 2627 and 2617 may be elongated to allow the first attachment feature 2901 and the third attachment feature 2903 respectively to be releasably securable while a first fastener (not shown) is in place through the apertures 2646, 2627 and 2617 but prior to securing the fastener.

The rear mounting assembly attachment feature 2906 may include one or more apertures 2638. The apertures 2638, 2625 and 2615 may be designed to allow a second fastener (not shown) to pass through apertures 2638, 2625 and 2615 to releasably secure the positions of the second attachment feature 2902 and the fourth attachment feature 2904 relative to the rear mounting assembly attachment feature 2906. Further the apertures 2625 and 2615 may be elongated to allow the second attachment feature 2902 and the fourth attachment feature 2904 respectively to be releasably securable while a second fastener (not shown) is in place through the apertures 2638, 2625 and 2615 but prior to securing the fastener.

In another embodiment, the apertures 2646 may be designed to allow a first fastener (not shown) to pass through aperture 2617 into aperture 2646 to releasably secure the position of the first attachment feature 2901 relative to the front mounting assembly attachment feature 2905 and a second fastener (not shown) to pass through aperture 2627 into aperture 2646 to releasably secure the position of the third attachment feature 2903 relative to the front mounting assembly attachment feature 2905. In this embodiment, the first attachment feature 2901 and the third attachment feature 2903 may be releasably securable to the front mounting assembly attachment feature 2905 independently of each other. Additionally, the apertures 2638 may be designed to allow a third fastener (not shown) to pass through aperture 2615 into aperture 2638 to releasably secure the position of the second attachment feature 2902 relative to the rear mounting assembly attachment feature 2906 and a fourth fastener (not shown) to pass through aperture 2625 into aperture 2638 to releasably secure the position of the fourth attachment feature 2904 relative to the rear mounting assembly attachment feature 2906. In this embodiment, the second attachment feature 2902 and the fourth attachment feature 2904 may be releasably securable to the rear mounting assembly attachment feature 2906 independently of each other.

FIG. 28A-28E illustrate various views of the of the saddle mounting frame assembly 2640 of adjustable saddle 2600 according to at least one embodiment. The saddle mounting frame assembly 2640 may include a saddle mounting frame 2670 including a front end 2656 with a front mounting assembly 2653, a back end 2655 with a rear mounting assembly 2654 and a central body 2651 with one or more apertures 2652. The saddle mounting frame assembly 2640 may further include a seat mounting base 2680 and a slidable mounting portion 2690. The saddle mounting frame 2670 may include a channel 2657 configured to slidably engage with the body 2681 of the seat mounting base 2680. Further, the seat mounting base may include an elongated aperture 2683 and a channel 2682 configured to slidably engage a slidable mounting portion 2690. The slidable mounting portion 2690 may include one or more apertures 2691. The apertures 2691, 2683 and 2652 may be configured so that a fastener (not shown) may be used to secure the positions of the saddle mounting frame 2670, seat mounting base 2680 and slidable mounting portion 2690 relative to each other. The seat mounting base 2680 may further comprise two or more rail apertures 2684 which may be configured to receive at least two parallel mounting rods (not shown) that may be used to slidably attach the seat mounting base to a standard seat mounting mechanism.

FIG. 28D shows an isometric view of the saddle mounting frame assembly 2640 adjusted to the rear most position in at least one embodiment. FIG. 28E shows an isometric view of the saddle mounting frame assembly 2640 adjusted to the forward most position in at least one embodiment.

Figure 29:
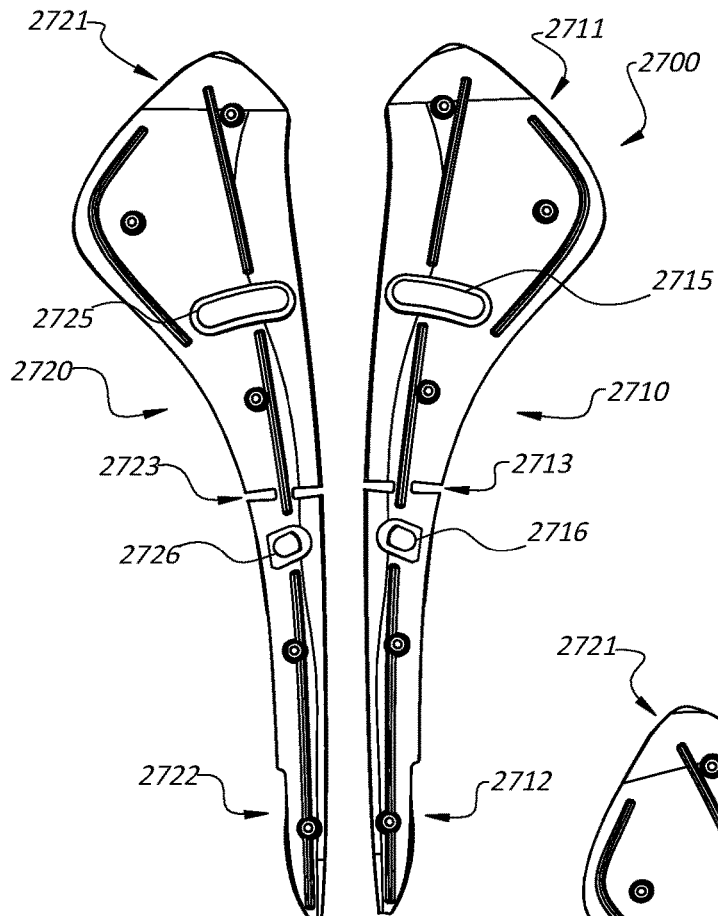
FIG. 29 is a top view of two flexible saddle half bases according to another embodiment of the present disclosure.
Figure 30:
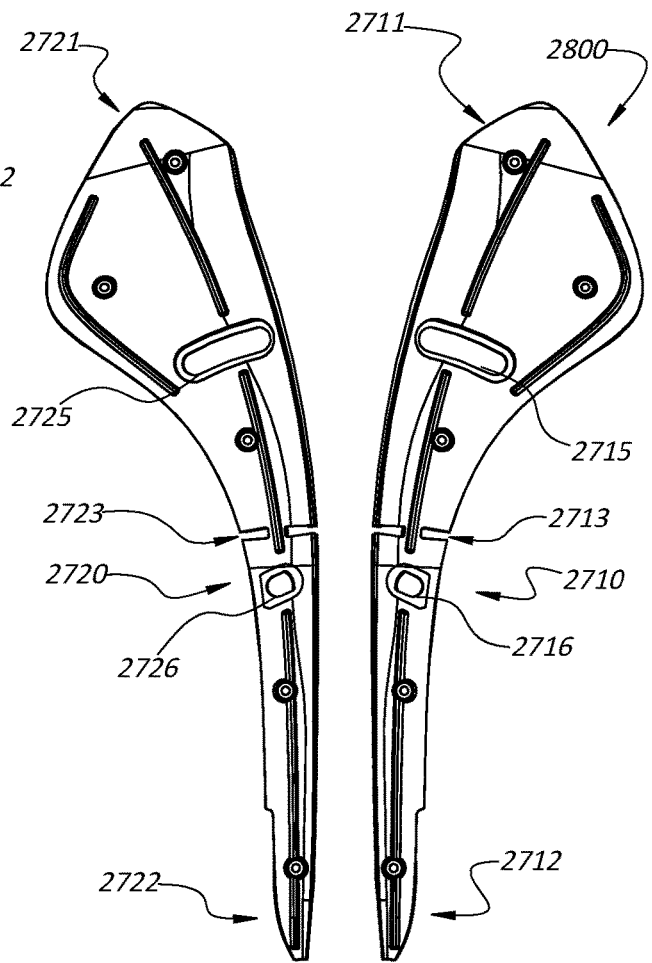
FIG. 30 is a top view of two flexible saddle half bases shown in FIG. 29 in an additional flexed configuration.
Figure 33A:
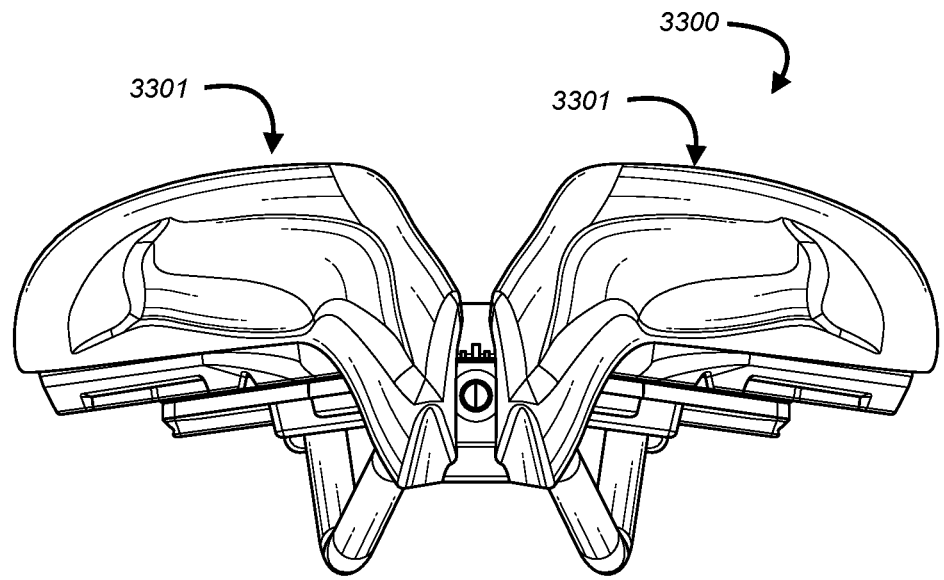
FIG. 33A is a front view of an adjustable saddle seat according to another embodiment of the present disclosure.
Figure 33B:
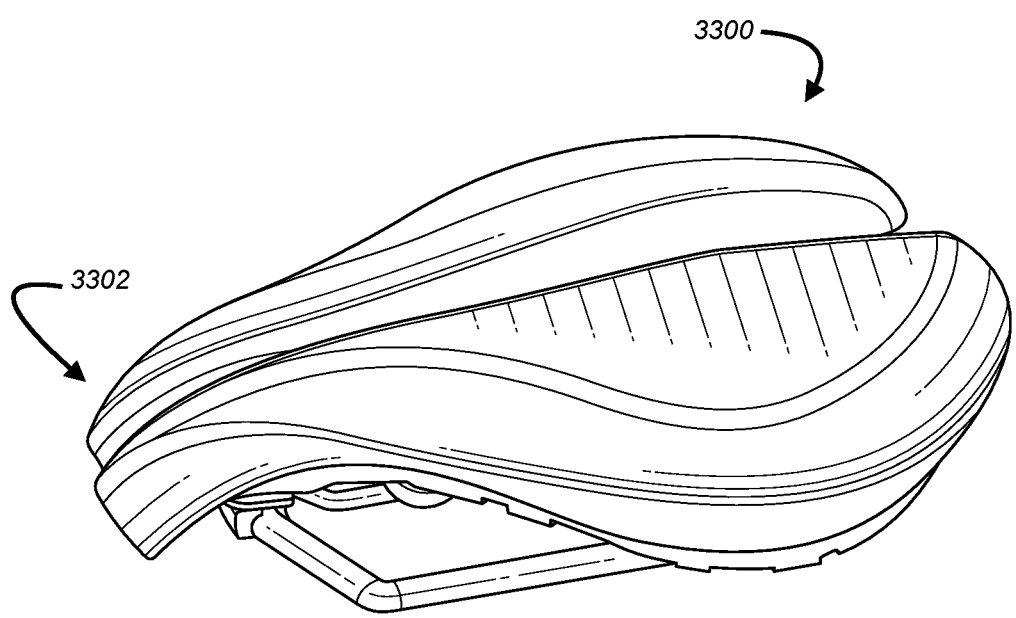
FIG. 33B is an isometric view of an adjustable saddle seat according to another embodiment of the present disclosure.

FIGS. 29 and 30 illustrate various top views of the adjustable saddle 2700 in different exemplary adjustment configurations according to another embodiment. The adjustable saddle 2700 may include a first saddle half 2710 and a second saddle half 2720. The first saddle half 2710 may include a first front section 2712, a first back section 2711 and a first flexural section 2713. Additionally, the second saddle half 2720 may include a second front section 2722, second back section 2721 and a second flexural section 2723. Each first saddle half 2710 and second saddle half 2720 may be independently attachable to a mounting frame (not shown). FIG. 29 shows the adjustable saddle 2700 with first saddle half 2710 and second saddle half 2720 in a neutral position. The design and material selection of the each of the first flexural section 2713 and second flexural section 2723 is configured so that each of the first flexural section 2713 and second flexural section 2723 acts as a living hinge, thus allowing the front section 2712 of first saddle half 2710 and front section 2722 of the second saddle half 2720 to be adjusted independently of the back section 2711 of first saddle half 2710 and back section 2721 of second saddle half 2720.

FIG. 30 shows the back section 2711 of first saddle half 2710; back section 2721 of second saddle half 2720; front section 2712 of first saddle half 2710; and front section 2722 of second saddle half 2720 in an alternate adjustment configuration flexed at the flexural section 2713, 2723. In this configuration, the back section 2711 of first saddle half 2710 and back section 2721 of second saddle half 2720 and the front section 2712 of first saddle half 2710 and front section 2722 of second saddle half 2720 may be adjusted far apart from each other. The non-limiting exemplary adjustment configurations shown in FIGS. 29 and 30 are for illustration purposes only and it will be understood that the back section 2711 of first saddle half 2710 and back section 2721 of second saddle half 2720 can assume an infinite number of different positions throughout their adjustment range, and likewise the front section 2712 of first saddle half 2710 and front section 2722 of second saddle half 2720 can also assume an infinite number of positions throughout their adjustment range. It will also be understood that the size and shape of any of the components of the first saddle half 2710 and second saddle half 2720 may be varied to achieve any spacing between the first saddle half 2710 and second saddle half 2720. For example, the size and shape of the first saddle half 2710 and second saddle half 2720 may be varied to achieve a spacing range, including but not limited to: 0-10 cm, 0-15 cm, 0-30 cm, 5-15 cm, 10-20 cm, 15-30 cm, etc.

In at least one embodiment, the first saddle half 2710 of the adjustable saddle 2700 may include a first aperture 2716 in the front section 2712 and a second aperture 2715 in the back section 2711. Further, the second saddle half 2720 of the adjustable saddle 2700 may include a third aperture 2726 in the front section 2722 and a fourth aperture 2725 in the back section 2721. The first aperture 2716 and third aperture 2726 may be angled slots that allow pivotal and translational adjustment of the front section 2712 of first saddle half 2710 and front section 2722 of second saddle half 2720. However, in other embodiments (not shown), the first aperture 2716 and third aperture 2726 may be circular shaped holes that allow pivotal adjustment of the front section 2712 of first saddle half 2710 and front section 2722 of second saddle half 2720. The second aperture 2715 and fourth aperture 2725 may be arcuate shaped holes that allow pivotal adjustment of the back section 2711 of first saddle half 2710 and back section 2721 of second saddle half 2720. However, in other embodiments (not shown), the second aperture 2715 and fourth aperture 2725 may also be angled slots that allow pivotal and translational adjustment of the back section 2711 of first saddle half 2710 and back section 2721 of second saddle half 2720.

FIG. 31A-31C illustrate various views of an adjustable saddle 3100 according to another embodiment. The adjustable saddle 3100 may include a first saddle half 3110, a second saddle half 3120. A first saddle half 3110 and a second saddle half 3120 may each be configured to be slidably adjustably coupled to a saddle mounting frame assembly 2640, mounting frame 2200, and/or saddle mounting assembly 2300 previously described. A first saddle half 3110 may further include a first front end 3112, a first back end 3111 and a first seat surface 3114. The first seat surface 3114 may further include a first depression 3115 configured to receive a sit bone. A second saddle half 3120 may further include a second front end 3122, a second back end 3121 and a second seat surface 3124. The second seat surface 3124 may further include a second depression 3125 configured to receive a sit bone.

The adjustable saddle 3100 may provide the ability to adjust the first front end 3112 and second front end 3122 independently. Additionally, the adjustable saddle 3100 may provide the ability to adjust the first back end 3111 and second back end 3121 independently. These adjustments may allow the separation of the first depression 3115 and the second depression 3125 to be customized to a given sit bone width and riding position to achieve maximum comfort.

The first depression 3115 and the second depression 3125 may be configured to reduce the point load and pressure at the sit bone and, therefore, may allow surrounding tissue to carry more load.

The first depression 3115 may taper inward from the first seat surface 3114 to the bottom of the first depression 3115. The first depression 3115 may comprise a contoured profile that may be between 1.5" and 5.0", or more specifically between 2.5" and 3.1", at a highest point and may be between 0.7" and 3.0", or more specifically between 1.2" and 2.0", at a widest point at the first seat surface 3114. The bottom of the first depression 3115 may comprise a profile that may be between 0.3" and 1.2", or more specifically between 0.4" and 1.0", at a highest point and may be between 0.1" and 1.0", or more specifically between 0.3" and 0.8", at a widest point. The bottom of the first depression 3115 may be between 0.1" and 1.0" deep, or more specifically, between 0.3" and 0.5" deep.

Additionally, the second depression 3125 may taper inward from the first seat surface 3124 to the bottom of the second depression 3125. The second depression 3125 may comprise a contoured profile that may be between 1.5" and 5.0", or more specifically between 2.5" and 3.1", at a highest point and may be between 0.7" and 3.0", or more specifically between 1.2" and 2.0", at a widest point at the second seat surface 3124. The bottom of the second depression 3125 may comprise a profile that may be between 0.3" and 1.2", or more specifically between 0.4" and 1.0", at a highest point and may be between 0.1" and 1.0", or more specifically between 0.3" and 0.8", at a widest point. The bottom of the second depression 3125 may be between 0.1" and 1.0" deep, or more specifically, between 0.3" and 0.5" deep.

FIG. 32A-32C illustrate various views of an adjustable saddle 3200 according to another embodiment. The adjustable saddle 3200 may include a first saddle half 3210, a second saddle half 3220. A first saddle half 3210 and a second saddle half 3220 may each be configured to be slidably adjustably coupled to a saddle mounting frame assembly 2640, mounting frame 2200, and/or saddle mounting assembly 2300 previously described. A first saddle half 3210 may further include a first front end 3212, a first back end 3211 and a first seat surface 3214. The first seat surface 3214 may further include a first depression 3215 configured to receive a sit bone. A second saddle half 3220 may further include a second front end 3222, a second back end 3221 and a second seat surface 3224. The second seat surface 3224 may further include a second depression 3225 configured to receive a sit bone.

The adjustable saddle 3200 may provide the ability to adjust the first front end 3212 and second front end 3222 independently. Additionally, the adjustable saddle 3200 may provide the ability to adjust the first back end 3211 and second back end 3221 independently. These adjustments may allow the separation of the first depression 3215 and the second depression 3225 to be customized to a given sit bone width and riding position to achieve maximum comfort.

The first depression 3215 and the second depression 3225 may be configured to reduce the point load and pressure at the sit bone and, therefore, may allow surrounding tissue to carry more load.

FIG. 33A-38B show an adjustable saddle 3300 that may be designed to minimize abrasion contact points for extreme hours in the saddle. In addition to being adjustable, it may have a unique shape designed to be comfortable in a Triathlon/Time Trial-Aerodynamic Position 3703 and when switching to a more upright riding position such as a Road Rider-Relaxed Position 3702 or 3704. The curved seat surface 3301 may be curved and may generally curve downwards toward the front end 3302 to minimize soft tissue contact in Triathlon/Time Trial-Aerodynamic Position 3703. The saddle 3300 may also generally curve downwards towards the back end 3303 which may allow adjustment over the apex curve 3306 and relieve arm pressure in a more upright position such as a Road Rider-Relaxed Position 3702 or 3704. Adjustment of the adjustable saddle 3300 may be tuned based on the amount of arm pressure and desired riding position.

While other saddles may curve upward toward the back of the saddle or may be flat, it will be appreciated that the curved seat surface 3301 of the adjustable saddle 3300 may extend from the front end 3320 to the back end 3303 and may comprise an apex curve 3306 in the approximate rear ⅔ of the saddle and curve downward in both directions (toward the front end 3302 and back end 3303) from the apex curve 3306. Arm pressure may result from a rider having to hold one's body on a saddle with a downward curve towards the front. Without a rider's arms providing a counter-force, a rider may slide off the front of the saddle. According to another embodiment of the present disclosure, the adjustable saddle 3300 may include a downward curve towards the front end 3302 for riding in a Triathlon/Time Trial-Aerodynamic Position 3703 to reduce soft tissue pressure/contact between a rider and a saddle. This configuration results in minimal pressure on the arms in the Triathlon/Time Trial-Aerodynamic Position 3703. The pressure increases when moving to a more upright position such as a Road Rider-Relaxed Position 3702 or 3704, wherein the hands may be on the hoods or the tops of the bars.

The apex curve 3306 on the adjustable saddle 3300, may allow a rider to shift slightly backward on the adjustable saddle 3300 and relieve the arm pressure since the body support is on or behind the apex curve 3306 and not on the downward curve towards the front end 3302. Other saddles may curve up towards the back, resulting in constant arm pressure to keep a rider from sliding forward on the saddle when in a more upright position such as a Road Rider-Relaxed Position 3702 or 3704. Some other saddles may be designed with a dip or a downward curve in the center of the saddle, meaning the saddle curves upward towards the front of the saddle from the center dip and upward towards the back from the dip in the saddle. This center dip or pocket can be acceptable while riding in an upright position such as a Road Rider-Relaxed Position 3702 or 3704, but may put significant pressure on the soft tissue in a Triathlon/Time Trial-Aerodynamic Position 3703 since the front of the saddle curves upward.

Figure 34:
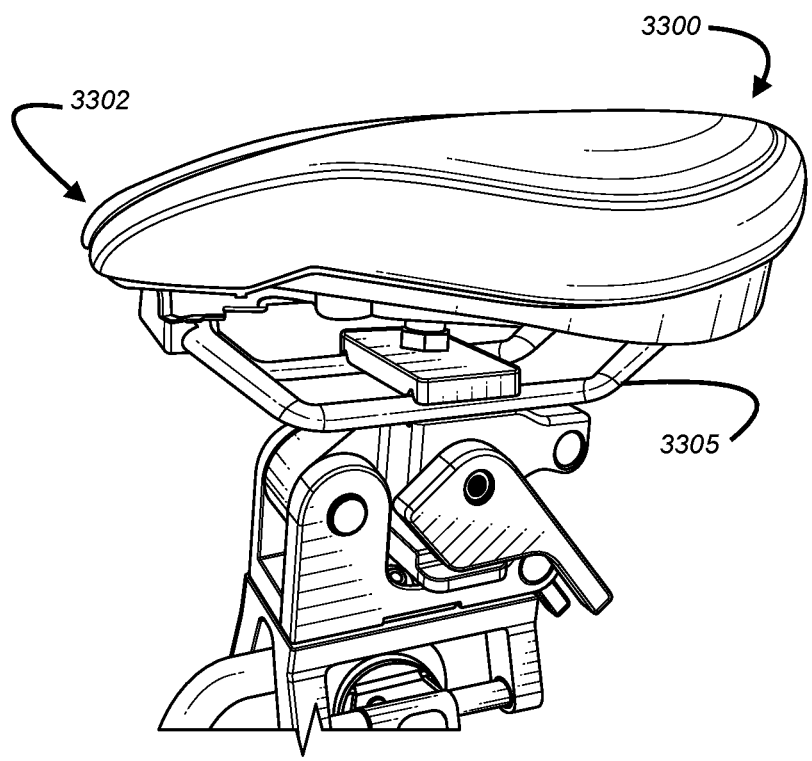
FIG. 34 is an isometric view of an adjustable saddle seat and mounting frame assembly according to another embodiment of the present disclosure.
Figure 35:
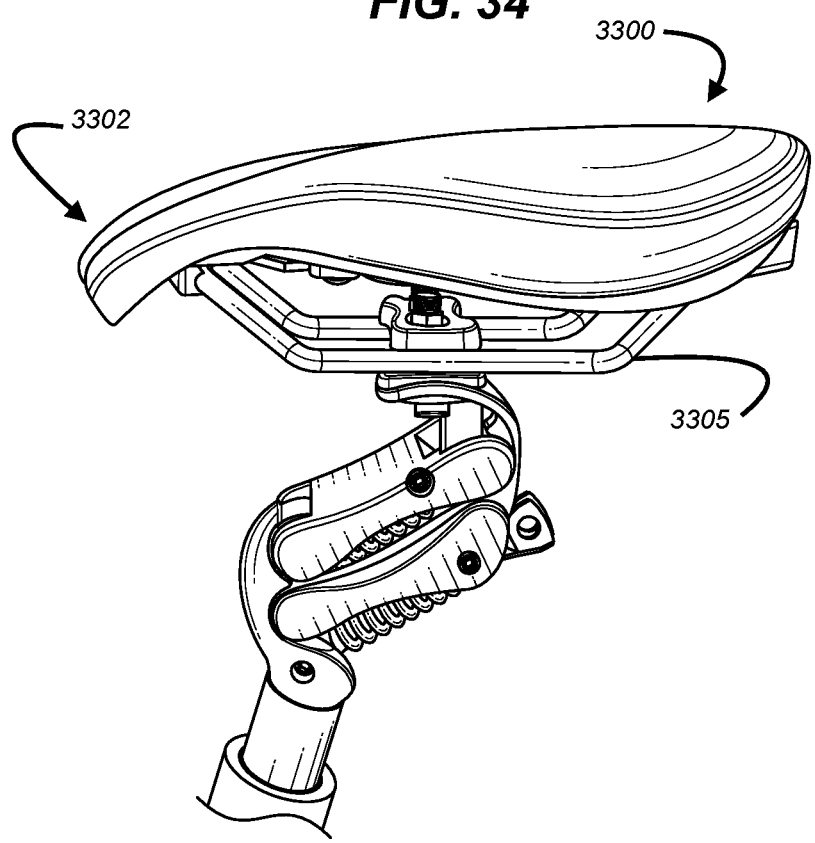
FIG. 35 is a side view of an adjustable saddle seat and mounting frame assembly according to another embodiment of the present disclosure.
Figure 36:
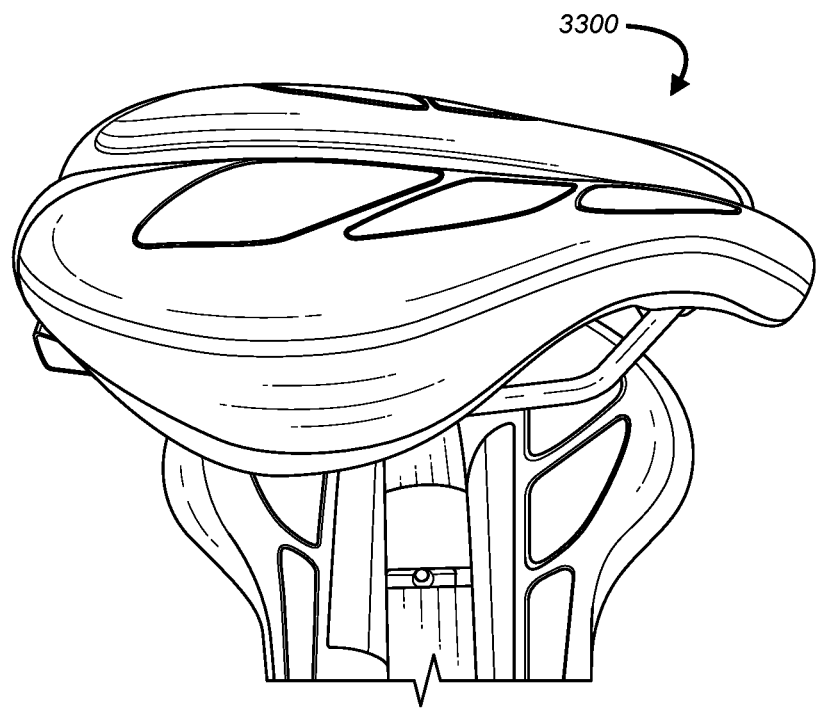
FIG. 36 is a side perspective view of an adjustable saddle and a partial top view of an adjustable saddle according to another embodiment of the present disclosure.
Figure 37A:
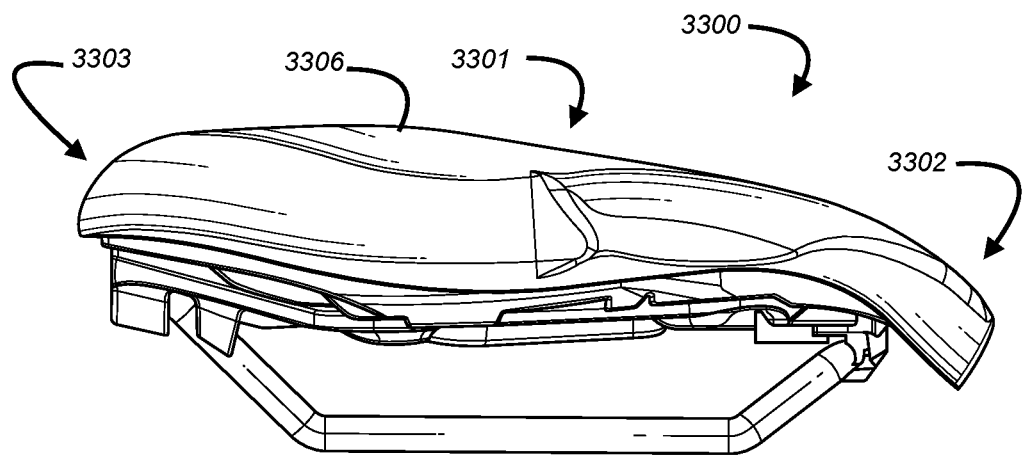
FIG. 37A is a right-side view of an adjustable saddle seat according to another embodiment of the present disclosure.
Figure 37B:
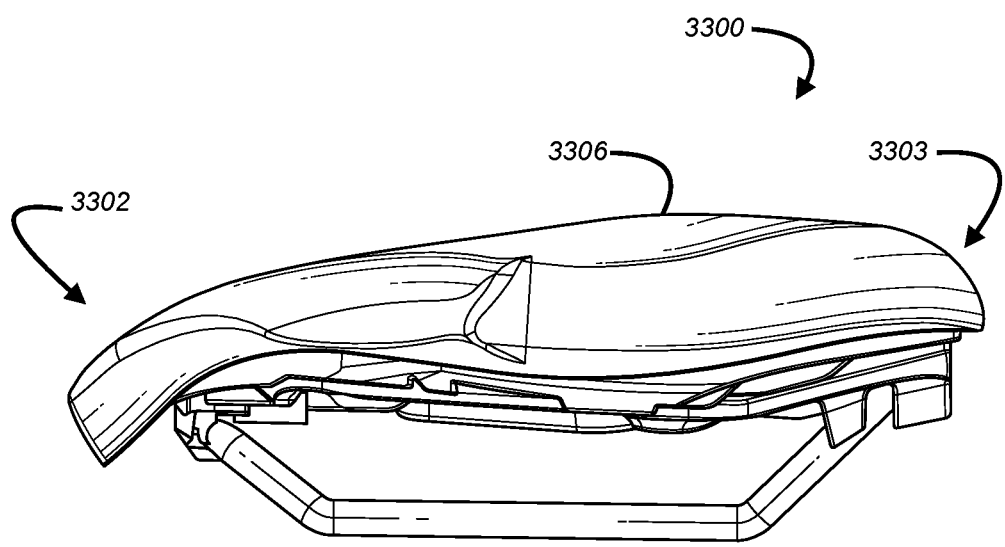
FIG. 37B is a left-side view of an adjustable saddle seat according to another embodiment of the present disclosure.
Figure 38A:
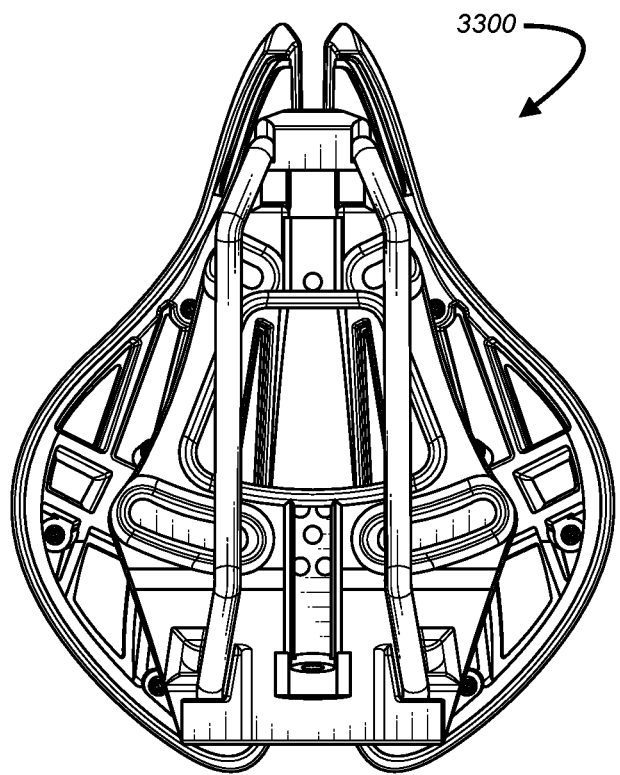
FIG. 38A is a bottom view of an adjustable saddle seat according to another embodiment of the present disclosure.
Figure 38B:
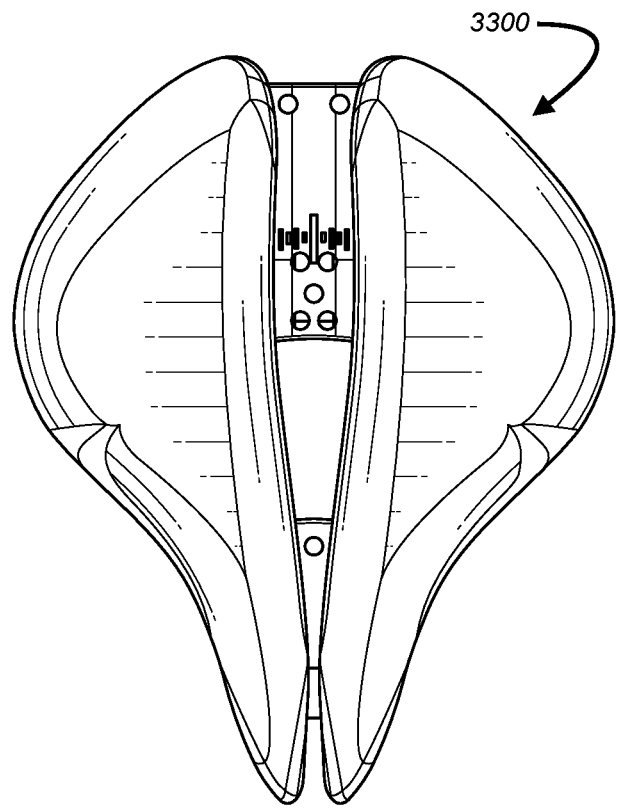
FIG. 38B is a top view of an adjustable saddle seat according to another embodiment of the present disclosure.
Figure 39:
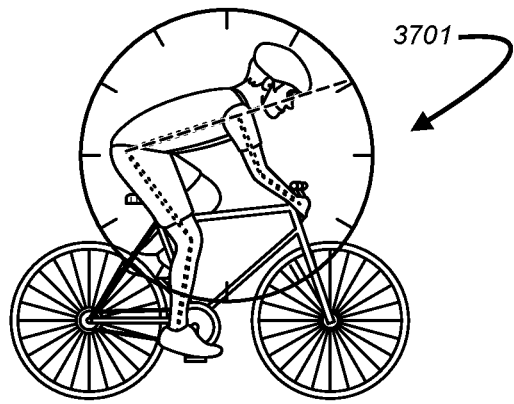
FIG. 39 is an illustration of various riding positions of a cyclist.
Figure 39:
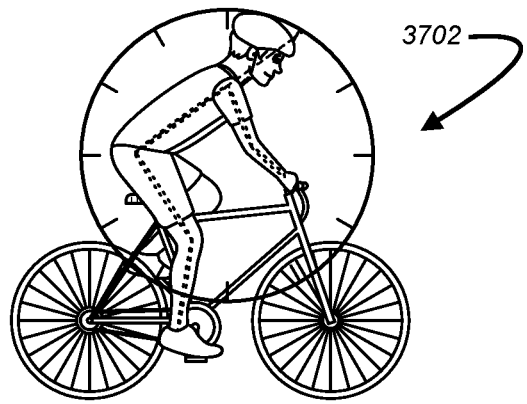
Figure 39:
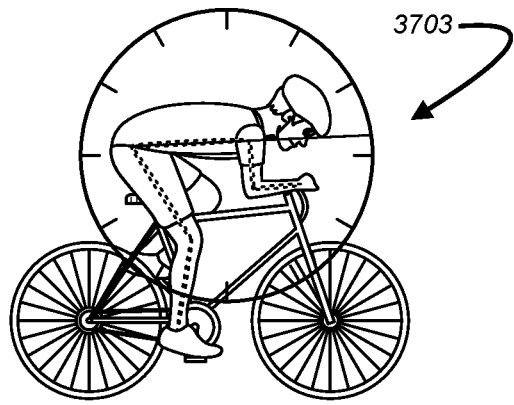
Figure 39:
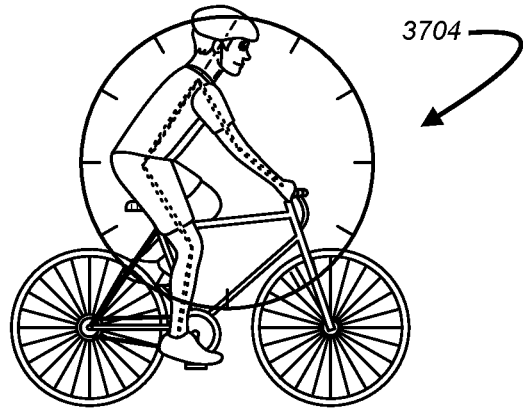

FIG. 34 shows an adjustable saddle 3300 with rail portion 3305 slidably attached to an exemplary seat mounting mechanism. FIG. 35 shows an adjustable saddle 3300 with rail portion 3305 slidably attached to a second exemplary seat mounting mechanism. The bicycle frames and mounting hardware of FIGS. 34 and 35 are merely exemplary; in alternative embodiments, the adjustable saddle 3300 may be secured to a more conventional bicycle frame, which may provide adjustable, spring-loaded, and/or stationary mounting of the adjustable saddle 3300.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily referring to the same embodiment.

Similarly, it will be appreciated that in the above description of embodiments, various features are sometimes grouped together in a single embodiment, figure, or description for the purpose of streamlining the disclosure. This method of disclosure, however, is not to be interpreted as reflecting an intention that any claim in this or any application claiming priority to this application require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Only elements recited in means-plus-function format are intended to be construed in accordance with 35 U.S.C. § 112 Para. 6. It will be apparent to those having skill in the art that changes may be made to the details of the above-described embodiments without departing from the underlying principles of the disclosure.

While specific embodiments and applications of the present disclosure have been illustrated and described, it is to be understood that the disclosure is not limited to the precise configuration and components disclosed herein. Various modifications, changes, and variations which will be apparent to those skilled in the art may be made in the arrangement, operation, and details of the methods and systems of the present disclosure herein without departing from the spirit and scope of the disclosure.

What is claimed is:

1. An adjustable saddle, comprising:
   a mounting frame comprising:
      a front mounting assembly comprising:
         a first plurality of front mounting assembly ridges formed on a first surface of the front mounting assembly; and
         a third plurality of front mounting assembly ridges formed on a third surface of the front mounting assembly; and
      a rear mounting assembly comprising:
         a second plurality of rear mounting assembly ridges formed on a second surface of the rear mounting assembly; and
         a fourth plurality of rear mounting assembly ridges formed on a fourth surface of the rear mounting assembly;
   a first saddle half comprising a first saddle half base comprising:
      a first front end comprising a first attachment feature configured to be slidably adjustably coupled to the front mounting assembly, the first attachment feature comprising a first plurality of attachment feature ridges; and
      a first back end comprising a second attachment feature configured to be slidably adjustably coupled to the rear mounting assembly, the second attachment feature comprising a second plurality of attachment feature ridges; and
   a second saddle half comprising a second saddle half base comprising:
      a second front end comprising a third attachment feature configured to be slidably adjustably coupled to the front mounting assembly, the third attachment feature comprising a third plurality of attachment feature ridges; and
      a second back end comprising a fourth attachment feature configured to be slidably adjustably coupled to the rear mounting assembly, the fourth attachment feature comprising a fourth plurality of attachment feature ridges;
   wherein:
      the first attachment feature of the first saddle half base is releasably securable to the front mounting assembly by selectively intermeshing the first plurality of attachment feature ridges with the first plurality of front mounting assembly ridges in a first locked position to obstruct movement of the first front end of the first saddle half base relative to the front mounting assembly;
      the third attachment feature of the second saddle half base is releasably securable to the front mounting assembly by selectively intermeshing the third plurality of attachment feature ridges with the third plurality of front mounting assembly ridges in a second locked position to obstruct movement of the second front end of the second saddle half base relative to the front mounting assembly;
      the second attachment feature of the first saddle half base is releasably securable to the rear mounting assembly by selectively intermeshing the second plurality of attachment feature ridges with the second plurality of rear mounting assembly ridges in a third locked position to obstruct movement of the first back end of the first saddle half base relative to the rear mounting assembly; and
      the fourth attachment feature of the second saddle half base is releasably securable to the rear mounting assembly by selectively intermeshing the fourth plurality of attachment feature ridges with the fourth plurality of rear mounting assembly ridges in a fourth locked position to obstruct movement of the second back end of the second saddle half base relative to the rear mounting assembly and secure a position of the second saddle half base relative to the first saddle half base.

2. The adjustable saddle of claim 1, wherein each of the first saddle half and the second saddle half comprises a dual density lattice structure.

3. The adjustable saddle of claim 1, wherein each of the first attachment feature, the second attachment feature, the third attachment feature, and the fourth attachment feature comprises a locking interface configured to mate with a corresponding locking interface of the front mounting assembly or the rear mounting assembly.

4. The adjustable saddle of claim 3, wherein:
each of the first attachment feature, the second attachment feature, the third attachment feature, and the fourth attachment feature comprises a first hole;
each of the front mounting assembly and the rear mounting assembly comprises a second hole; and
the first holes and the second holes cooperate to receive fasteners that secure each locking interface and corresponding locking interface in a locked configuration.

5. An adjustable saddle, comprising:
a front mounting assembly;
a rear mounting assembly;
a saddle mounting frame;
a seat mounting base that is configured to be secured to a bicycle frame and slidably adjustably coupled to the saddle mounting frame along a longitudinal centerline of the seat mounting base;
at least one vertically oriented locking fastener configured to secure a selected position of the saddle mounting frame relative to the seat mounting base;
a first saddle half comprising a first saddle half base comprising:
a first front end configured to be slidably adjustably coupled to the front mounting assembly; and
a first back end configured to be slidably adjustably coupled to the rear mounting assembly; and
a second saddle half comprising a second saddle half base comprising:
a second front end configured to be slidably adjustably coupled to the front mounting assembly; and
a second back end configured to be slidably adjustably coupled to the rear mounting assembly;
wherein the saddle mounting frame is centrally mounted to the seat mounting base along the longitudinal centerline between the first saddle half base and the second saddle half base.

6. The adjustable saddle of claim 5, wherein the saddle mounting frame comprises:
a slidable mounting portion;
a channel that slidably engages the seat mounting base; and
a plurality of apertures configured to receive the at least one vertically oriented locking fastener to secure the slidable mounting portion to the saddle mounting frame, thereby locking the selected position of the saddle mounting frame with respect to the seat mounting base.

7. The adjustable saddle of claim 6, wherein the seat mounting base comprises a slot that receives the at least one vertically oriented locking fastener securing the slidable mounting portion to the saddle mounting frame.

8. The adjustable saddle of claim 6, wherein the seat mounting base comprises at least two generally parallel mounting rods.

9. An adjustable saddle, comprising:
a mounting frame comprising:
a front mounting assembly; and
a rear mounting assembly;
a first saddle half comprising a first saddle half base comprising:
a first front end comprising a first attachment feature configured to be slidably adjustably coupled to the front mounting assembly; and
a first back end comprising a second attachment feature configured to be slidably adjustably coupled to the rear mounting assembly; and
a second saddle half comprising a second saddle half base comprising:
a second front end comprising a third attachment feature configured to be slidably adjustably coupled to the front mounting assembly; and
a second back end comprising a fourth attachment feature configured to be slidably adjustably coupled to the rear mounting assembly;
wherein the first attachment feature and the third attachment feature are releasably securable to the front mounting assembly and the second attachment feature, and the fourth attachment feature are releasably securable to the rear mounting assembly to secure a position of the second saddle half base relative to the first saddle half base; and
wherein:
at least one of the first attachment feature, the second attachment feature, the third attachment feature, and the fourth attachment feature comprises a first locking interface;
at least one of the front mounting assembly and the rear mounting assembly comprises a second locking interface; and
the first locking interface and the second locking interface are configured to slidably translate relative to each other and intermesh with each other along a limited number of predetermined discrete locking positions.

10. The adjustable saddle of claim 9, wherein:
the first locking interface comprises a first plurality of attachment feature ridges; and
the second locking interface comprises a second plurality of mounting assembly ridges.

11. The adjustable saddle of claim 9, wherein:
the first locking interface comprises a first hole;
the second locking interface comprises a second hole; and
the first hole and the second hole cooperate to receive a fastener to secure the first locking interface and the second locking interface in a locked configuration relative to each other at a selected one of the limited number of predetermined discrete locking positions.

12. An adjustable saddle, comprising:
a mounting frame comprising at least one mounting assembly, wherein the at least one mounting assembly comprises:
a first plurality of mounting assembly ridges disposed on a first side of the at least one mounting assembly; and
a second plurality of mounting assembly ridges disposed on a second side of the at least one mounting assembly, opposite the first plurality of mounting assembly ridges;
a first saddle half base comprising at least one first attachment feature configured to be slidably adjustably coupled to the at least one mounting assembly, wherein the at least one first attachment feature comprises a first plurality of attachment feature ridges; and
a second saddle half base comprising at least one second attachment feature configured to be slidably adjustably coupled to the at least one mounting assembly, wherein the at least one second attachment feature comprises a second plurality of attachment feature ridges;
wherein:
the at least one first attachment feature and the at least one second attachment feature are releasably securable to the at least one mounting assembly to secure a position of the first saddle half base and the second saddle half base relative to each other;

the first saddle half base and the second saddle half base are configured to linearly translate with respect to each other as the at least one first attachment feature and the at least one second attachment feature are slidably positioned along the at least one mounting assembly;

the first plurality of attachment feature ridges and the first plurality of mounting assembly ridges intermesh with each other to provide a first plurality of different discrete locking positions for the first saddle half base relative to the at least one mounting assembly; and the second plurality of attachment feature ridges and the second plurality of mounting assembly ridges intermesh with each other to provide a second plurality of different discrete locking positions for the second saddle half base relative to the at least one mounting assembly.

13. The adjustable saddle of claim 12, wherein:

the first plurality of different discrete locking positions comprises a first limited number of predetermined discrete locking positions; and the second plurality of different discrete locking positions comprises a second limited number of predetermined discrete locking positions.

14. The adjustable saddle of claim 12, wherein:

the at least one first attachment feature comprises a first hole;

the at least one second attachment feature comprises a second hole; and the at least one mounting assembly comprises a third hole;

wherein the third hole cooperates with at least one of the first hole and the second hole to receive a fastener and secure the at least one mounting assembly a locked configuration relative to at least one of the first saddle half base and the second saddle half base.

15. An adjustable saddle, comprising:

a front mounting assembly;

a rear mounting assembly;

a saddle mounting frame comprising a single channel formed therein that defines an inferior surface of the single channel;

a seat mounting base that is configured to be secured to a bicycle frame and slidably adjustably coupled to the saddle mounting frame, wherein a body of the seat mounting base is configured to slidably engage within the single channel formed in the saddle mounting frame to slidably adjustably couple the saddle mounting frame to the seat mounting base via planar surface engagement of a superior surface of the body with the inferior surface of the single channel formed in the saddle mounting frame;

a first saddle half comprising a first saddle half base comprising:
- a first front end configured to be slidably adjustably coupled to the front mounting assembly; and
- a first back end configured to be slidably adjustably coupled to the rear mounting assembly; and a second saddle half comprising a second saddle half base comprising:
- a second front end configured to be slidably adjustably coupled to the front mounting assembly; and
- a second back end configured to be slidably adjustably coupled to the rear mounting assembly.

16. The adjustable saddle of claim 15, wherein the saddle mounting frame comprises:

a slidable mounting portion; and a plurality of apertures configured to receive at least one vertically oriented locking fastener to secure the slidable mounting portion to the saddle mounting frame, thereby locking a selected position of the saddle mounting frame with respect to the seat mounting base.

17. The adjustable saddle of claim 16, wherein the seat mounting base further comprises an elongated aperture configured to receive the at least one vertically oriented locking fastener therethrough to secure the slidable mounting portion to the saddle mounting frame.

* * * * *